(12) United States Patent
Hama et al.

(10) Patent No.: US 10,717,888 B2
(45) Date of Patent: Jul. 21, 2020

(54) INK COMPOSITION, INK SET, RECORDING METHOD, AND INK JET RECORDING APPARATUS

(71) Applicant: Seiko Epson Corporation, Tokyo (JP)

(72) Inventors: Shintaro Hama, Shiojiri (JP); Ryosuke Teramoto, Matsumoto (JP); Kiyomi Kumamoto, Shiojiri (JP); Tetsuya Aoyama, Shiojiri (JP); Tomohiro Aruga, Matsumoto (JP); Kazuma Tsutsumi, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/037,147

(22) Filed: Jul. 17, 2018

(65) Prior Publication Data

US 2019/0023927 A1    Jan. 24, 2019

(30) Foreign Application Priority Data

Jul. 18, 2017  (JP) .................................. 2017-139310
Mar. 27, 2018 (JP) .................................. 2018-060503

(51) Int. Cl.
*C09D 11/40* (2014.01)
*B41M 5/00* (2006.01)
(Continued)

(52) U.S. Cl.
CPC ................ *C09D 11/40* (2013.01); *B41J 2/01* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322;
(Continued)

(56) References Cited

U.S. PATENT DOCUMENTS 4,648,884 A * 3/1987 Koci .................. C09B 67/0073
                                                                8/402
2006/0219131 A1  10/2006 Matsumoto et al.
(Continued)

FOREIGN PATENT DOCUMENTS

JP   2005-008868 A    1/2005
JP   2008-297542 A   12/2008
(Continued)

*Primary Examiner* — Manish S Shah
(74) *Attorney, Agent, or Firm* — Harness, Dickey & Pierce, P.L.C.

(57) ABSTRACT

An ink composition contains dyes A and B. Dye A has a width at a half height of the largest peak in the absorption spectrum between 380 nm and 780 nm that is 50 nm or less. Dye B has a corresponding width at the half height that is 70 nm or more. Dye A is present in an amount of 40% by mass or more and 90% by mass or less of the total mass of the dyes.

12 Claims, 6 Drawing Sheets

(51) Int. Cl.
  *B41J 2/01* (2006.01)
  *C09D 11/328* (2014.01)
  *C09D 11/033* (2014.01)
  *C09D 11/38* (2014.01)
(52) U.S. Cl.
  CPC .......... *C09D 11/033* (2013.01); *C09D 11/328* (2013.01); *C09D 11/38* (2013.01)
(58) Field of Classification Search
  CPC ... C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
  See application file for complete search history.

(56) References Cited

U.S. PATENT DOCUMENTS

| | | | |
|---|---|---|---|
| 2008/0043079 A1* | 2/2008 | Ikeda | C09D 11/328 347/100 |
| 2008/0274284 A1 | 11/2008 | Fujimoto et al. | |
| 2009/0049624 A1* | 2/2009 | Aizawa | C08K 5/0041 8/541 |
| 2009/0285990 A1 | 11/2009 | Nishino et al. | |
| 2011/0128332 A1 | 6/2011 | Maeda et al. | |
| 2014/0292911 A1* | 10/2014 | Kajimoto | B41J 2/16535 347/29 |

FOREIGN PATENT DOCUMENTS

| | | |
|---|---|---|
| JP | 2009-299027 A | 12/2009 |
| JP | 2011-111609 A | 6/2011 |
| JP | 2014-028908 A | 2/2014 |

* cited by examiner

INK COMPOSITION, INK SET, RECORDING METHOD, AND INK JET RECORDING APPARATUS

BACKGROUND

1. Technical Field

The present invention relates to an ink composition, an ink set, a recording method, and an ink jet recording apparatus.

2. Related Art

Ink jet recording, a process by which high-definition images can be recorded by supplying ink to a printhead and ejecting droplets of the ink from the printhead to place them on a recording medium, such as paper, has been making rapid progress in various fields. During this time, many studies have been conducted to improve the resulting images.

For example, JP-A-2008-297542 and JP-A-2009-299027 disclose magenta ink jet inks. Magenta inks are poor in fastness on an image compared with cyan and yellow inks, and the disclosed magenta inks are intended to provide an ink jet ink that produces an image good in color strength, lightfastness, resistance to gases, and stability in color. These magenta inks use an anthrapyridone dye, which is good in fastness on an image such as lightfastness and resistance to gases, in combination with an azo dye, which is good in color strength.

These inks offer improved color strength and weatherability by virtue of the combination of dyes, but the resulting images are poor in the reproduction of dark tones. An image with poor dark tone reproduction looks rough (grainy) and is not smooth in tone.

SUMMARY

An advantage of some aspects of the invention is that an ink composition, an ink set, a recording method, and an ink jet recording apparatus are provided that produce an image good in color strength, dark tone reproduction, and resistance to gases.

The following describes some aspects or exemplary applications of the invention.

Application 1

An ink composition according to an aspect of the invention contains dye A, having the width at half height of the largest peak in the absorption spectrum between 380 nm and 780 nm is 50 nm or less, and at least one dye B, having the corresponding width at half height is 70 nm or more. Dye A is present in an amount of 40% by mass or more and 90% by mass or less of the total mass of the dyes.

In the aspect of Application 1, two types of dyes with different natures are combined in certain proportions: dye A, having the aforementioned width at half height is 50 nm or less and which exhibits high chroma and good resistance to gases, and at least one dye B, having the corresponding width at half height is broad and which is good in dark tone reproduction. By virtue of this, the ink composition produces an image good in color strength, dark tone reproduction (graininess), and resistance to gases.

Application 2

In the above application, dyes A and B may have their wavelength of highest absorbance of the largest peak between 500 nm and 600 nm.

In this application, two types of dyes having their wavelength of highest absorbance of the largest peak between 500 nm and 600 nm are combined in certain proportions. By virtue of this, the ink composition produces an image good in color strength, dark tone reproduction, and resistance to gases.

Application 3

In the applications above, dye A can be a compound represented by general formula (1).

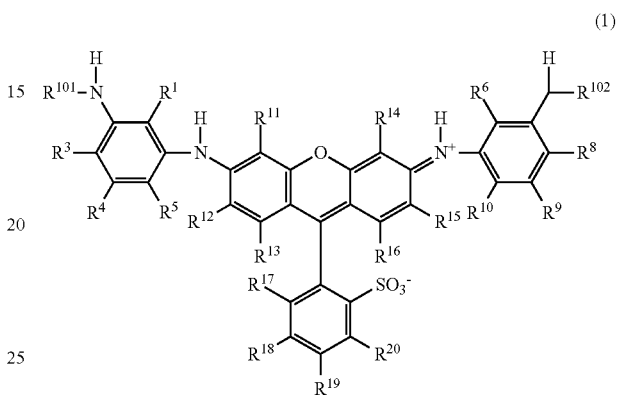

(1)

In general formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or substituent. $R^{101}$ and $R^{102}$ each independently represent a substituted or unsubstituted alkyl group, substituted or unsubstituted aryl group, substituted or unsubstituted heterocyclic group, substituted or unsubstituted alkylsulfonyl group, substituted or unsubstituted arylsulfonyl group, substituted or unsubstituted alkoxycarbonyl group, substituted or unsubstituted aryloxycarbonyl group, substituted or unsubstituted carbamoyl group, substituted or unsubstituted monoalkylaminocarbonyl group, substituted or unsubstituted dialkylaminocarbonyl group, substituted or unsubstituted monoarylaminocarbonyl group, substituted or unsubstituted diarylaminocarbonyl group, or substituted or unsubstituted alkylarylaminocarbonyl group.

In this application, the compound of general formula (1), used as dye A and good in color strength and resistance to gases, is combined with dye B in certain proportions. By virtue of this, the ink composition produces an image better in resistance to gas, as well as being good in color strength and dark tone reproduction.

Application 4

In the above application, $R^1$, $R^3$, $R^5$, $R^6$, $R^8$, and $R^{10}$ in the compound represented by general formula (1) can each independently represent an alkyl group having 1 to 6 carbon atoms.

In this application, by virtue of $R^1$, $R^3$, $R^5$, $R^6$, $R^8$, and $R^{10}$ each independently being an alkyl group having 1 to 6 carbon atoms, the ink composition is better in color strength, dark tone reproduction, and resistance to gases.

Application 5

In the above applications, the at least one dye B can be one or more selected from anthrapyridone dyes, reactive dyes, and azo dyes.

In this application, the at least one dye B is one or more selected from anthrapyridone dyes, reactive dyes, and azo dyes and is combined with dye A in certain proportions. By virtue of this, the ink composition produces an image better in color strength, dark tone reproduction, and resistance to gases.

Application 6

In the above applications, the ink composition can further contain a water-soluble organic solvent, at least one surfactant, and water.

In this application, by virtue of further containing a water-soluble organic solvent, at least one surfactant, and water, the ink composition is good in ease of loading and stability during continuous printing, particularly when the printing process is prolonged by using a continuous-supply ink container.

Application 7

In the above application, the water-soluble organic solvent can be an alkylbetaine present in an amount of 0.1% by mass or more and 3.0% by mass or less of the total mass of the ink.

In this application, by virtue of the water-soluble organic solvent being an alkylbetaine present in an amount of 0.1% by mass or more and 3.0% by mass or less of the total mass of the ink, the ink composition is better in stability during continuous printing owing to controlled precipitation at the gas-liquid interface, particularly when the printing process is by using a continuous-supply ink container, and produces a print improved in image fastness.

Application 8

In the above applications, the surfactant can be an acetylene glycol surfactant having an HLB of 4 or less.

In this application, by virtue of the surfactant being an acetylene glycol surfactant having an HLB of 4 or less, the ink composition is good in ease of initial loading and stability during continuous printing, particularly when the printing process is prolonged by using a continuous-supply ink container.

Application 9

In the above applications, the ink composition can further contain, as the at least one surfactant, one or more selected from alkylene oxide adducts of acetylene glycols having 12 or more backbone carbon atoms and acetylene glycols having 10 or more backbone carbon atoms.

In this application, the ink composition is better in ease of initial loading and stability during continuous printing.

Application 10

In the above applications, dyes A and B can be present in the ink composition in a total amount of 0.5% by mass or more and 4.0% by mass or less.

In this application, by virtue of dyes A and B being present in the ink composition in a total amount of 0.5% by mass or more and 4.0% by mass or less, the ink composition produces an image better in color strength, dark tone reproduction, and resistance to gases.

Application 11

An ink set according to an aspect of the invention includes a cyan ink, a magenta ink, and a yellow ink. The cyan ink contains one or more dyes selected from a first cyan dye represented by general formula (C-1), a second cyan dye represented by general formula (C-2), a third cyan dye represented by general formula (C-3), C.I. Direct Blue 199, and C.I. Direct Blue 86. The magenta ink is an ink composition according to any one of Applications 1 to 10. The yellow ink contains one or more dyes selected from a first yellow dye represented by general formula (Y-1), a second yellow dye represented by general formula (Y-2), C.I. Direct Yellow 86, and C.I. Direct Yellow 132.

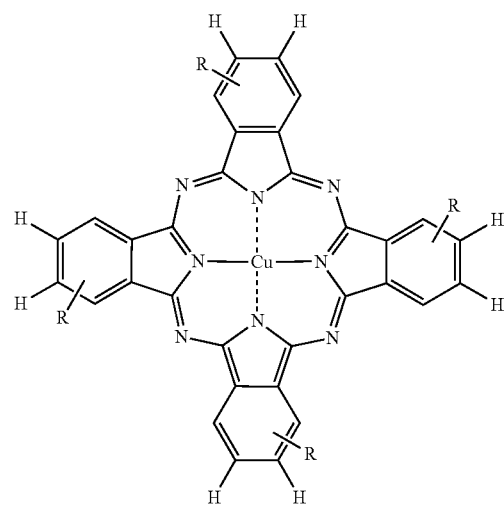

(C-1)

In general formula (C-1), R represents $SO_2(CH_2)_3SO_3Na$.

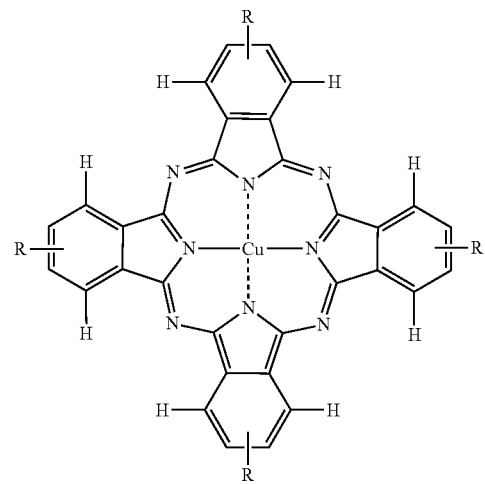

(C-2)

In general formula (C-2), two Rs represent $SO_2(CH_2)_3SO_3Li$, and the other two represent $SO_2(CH_2)_3SO_2NHCH_2(OH)CH_3$.

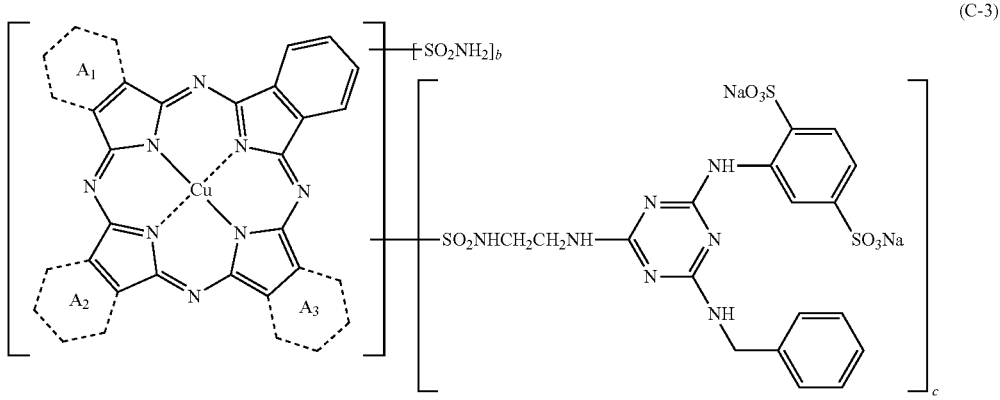

(C-3)

In general formula (C-3), rings $A_1$ to $A_3$, drawn with broken lines, each independently represent a benzene ring or six-membered nitrogen-containing aromatic heterocycle condensed to the porphyrazine ring. The number of nitrogen-containing aromatic heterocycles averages more than 0.00 and 3.00 or less, and the rest is a benzene ring or rings. b averages 0.00 or more and less than 3.90. c averages 0.10 or more and less than 4.00. b plus c averages 1.00 or more and less than 4.00.

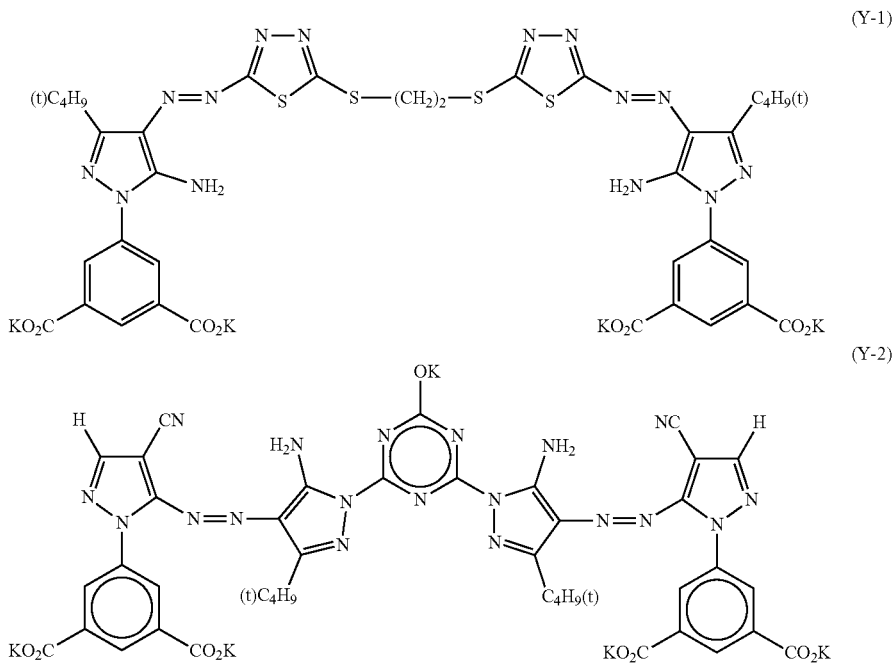

In the aspect of Application 11, an ink composition according to an above application is used as a magenta ink. By virtue of this, the ink set produces an image good in color strength, dark tone reproduction (graininess), and resistance to gases. Moreover, by virtue of an ink composition according to an above application used as a magenta ink, this ink set produces images good in color strength, dark tone reproduction (graininess), and resistance to gases, even when the printing process is prolonged by using continuous-supply ink containers.

Application 12

A recording method according to an aspect of the invention includes ejecting an ink composition according to any one of Applications 1 to 10 from a printhead and making a record by applying the ink composition to a recording medium.

In the aspect of Application 12, a record is made using an ink composition according to an above application. By virtue of this, the recording method produces an image good in color strength, dark tone reproduction, and resistance to gases.

Application 13

An ink jet recording apparatus according to an aspect of the invention includes an ink container capable of containing an ink composition according to any one of Applications 1 to 10, a printhead that ejects the ink composition, and an ink supply channel through which the ink composition is supplied from the ink container to the printhead.

In the aspect of Application 13, the ink jet recording apparatus produces an image good in color strength, dark tone reproduction (graininess), and resistance to gases by virtue of the use of an ink composition according to an above application. Moreover, by virtue of the use of an ink composition according to an above application, the ink jet recording apparatus produces images good in color strength, dark tone reproduction (graininess), and resistance to gases even, when the printing process is prolonged by using a continuous-supply ink container.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Figure 1:
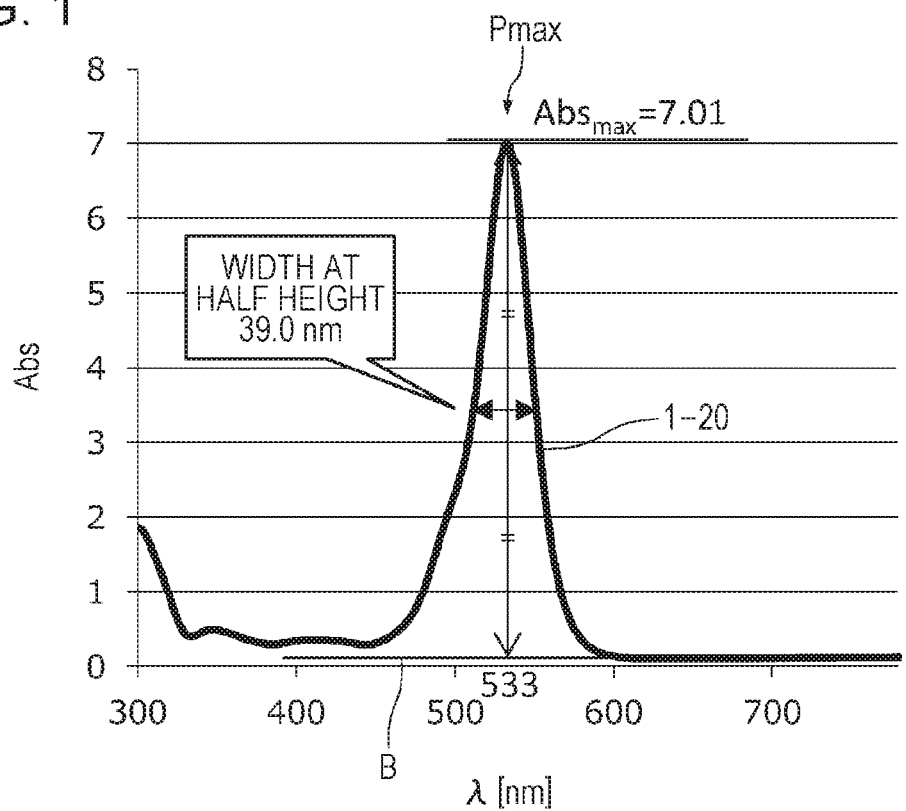
FIG. 1 is an absorption spectrum of the compound of general formula (1-20) (100 ppm on a solid basis).

The following describes preferred embodiments of the invention (hereinafter referred to as "embodiments"). The following embodiments are descriptions of examples of the invention. The invention is not limited to these embodiments and includes variations implemented within the gist of the invention. Not all the structural elements described below are essential for the invention.

The following describes an ink composition, a recording method, and an ink jet recording apparatus according to embodiments in the order of the ink composition, an ink set, the structure of an ink jet recording apparatus capable of using the ink set, and the recording method.

1. Ink Composition

An ink composition according to an embodiment of the invention contains dye A, having the width at half height of the largest peak in the absorption spectrum between 380 nm and 780 nm is 50 nm or less, and dye B, having the corresponding width at half height is 70 nm or more. Dye A is present in an amount of 40% by mass or more and 90% by mass or less of the total mass of the dyes.

As used herein, the term "absorption spectrum of a dye" refers to an ultraviolet-visible absorption spectrum measured using an ultraviolet-visible spectrophotometer.

As used herein, the term "largest peak of an absorption spectrum" refers to the peak (maximum) of an ultraviolet-visible absorption spectrum measured using an ultraviolet-visible spectrophotometer if the spectrum has only one peak in the wavelength range scanned, or the peak with the highest apex absorbance (Abs) if the spectrum has multiple peaks.

That is, the term "largest peak of the absorption spectrum between 380 nm and 780 nm" means that an ultraviolet-visible absorption spectrum measured using an ultraviolet-visible spectrophotometer has its largest peak between 380 nm and 780 nm or, more specifically, that the ultraviolet-visible absorption spectrum has the apex of its largest peak between 380 nm and 780 nm. The wavelength at which the apex of the peak occurs is referred to as the "wavelength of absorption maximum" or "wavelength of highest absorbance" for the substance or "$\lambda_{max}$." If an ultraviolet-visible absorption spectrum herein has multiple peaks, the wavelength at which the peak with the highest apex absorbance occurs is also referred to as the "wavelength of highest absorbance" for the substance.

As used herein, the term "width at half height of the largest peak of an absorption spectrum" refers to the width (nm) of the largest peak at the absorbance half the highest from the baseline at the wavelength of absorption maximum ($\lambda$max).

The following describes an ink composition (hereinafter also simply referred to as "ink") according to an embodiment, in terms of essential and optional ingredients thereof, by providing an example in which the ink composition is used as an ink composition for ink jet recording.

1.1. Dye A

An ink composition according to this embodiment contains dye A, which is a dye having the width at half height of the largest peak in the absorption spectrum between 380 nm and 780 nm is 50 nm or less. Dye A, having the width at half height of the largest peak in the absorption spectrum between 380 nm and 780 nm is 50 nm or less, is high in chroma and good in color strength, particularly at wavelengths of high lightness, by virtue of the width at half height being 50 nm or less. Dye A also tends to be unlikely to lose its color and is good in resistance to gases compared with existing dyes because the absorbance at the largest peak tends to be high owing to the width at half height being 50 nm or less. Combining dye A with dye B, described hereinafter, in appropriate amounts into an ink composition therefore gives an ink composition that produces an image good in color strength, dark tone reproduction (graininess), and resistance to gases. That is, images recorded using an ink composition according to this embodiment are good in color strength, dark tone reproduction, and resistance to gases by virtue of complementary effects of dyes A and B.

The amount of dye A in the ink composition according to this embodiment relative to the total mass of dyes (100% by mass) is 40% by mass or more, preferably 50% by mass or more, more preferably 60% by mass or more, and is 90% by mass or less, preferably 80% by mass or less, more preferably 70% by mass or less. By virtue of containing such an amount of dye A, the ink composition produces an image good in color strength, dark tone reproduction, and resistance to gases.

Dye A in the ink composition according to this embodiment is preferably present in an amount of 0.2% by mass or more of the total mass of the ink composition, more preferably 0.6% by mass or more, even more preferably 1.2% by mass or more. Moreover, dye A in the ink composition according to this embodiment is preferably present in an amount of 3.0% by mass or less of the total mass of the ink composition, more preferably 2.4% by mass or less, even more preferably 1.8% by mass or less. When containing such an amount of dye A, the ink composition produces an image better in color strength, dark tone reproduction, and resistance to gases.

Furthermore, the total amount of dyes A and B in the ink composition according to this embodiment is preferably 0.5% by mass or more, more preferably 1.0% by mass or more, even more preferably 2.0% by mass or more of the total mass of the ink composition, and is preferably 5.0% by mass or less, more preferably 4.0% by mass or less, even more preferably 3.0% by mass or less of the total mass of the ink composition. When containing such an amount of dyes A and B in total, the ink composition produces an image better in color strength, dark tone reproduction, and resistance to gases.

For dye A, the wavelength of highest absorbance of the largest peak is preferably between 500 nm and 600 nm. That is, it is preferred that the apex of the largest peak for dye A is located between 500 nm to 600 nm. Using such a dye A in combination with dye B, described hereinafter, in certain proportions makes images the ink composition produces excellent in color strength, dark tone reproduction, and resistance to gases.

Dye A in the ink composition according to this embodiment, having the width at half height of the largest peak in the absorption spectrum between 380 nm to 780 nm is 50 nm or less, is preferably a compound represented by general formula (1).

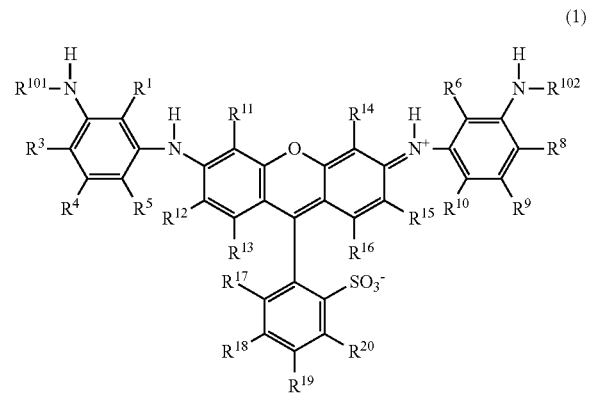

(1)

In general formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or substituent. $R^{101}$ and $R^{102}$ each independently represent a substituted or unsubstituted alkyl group, substituted or unsubstituted aryl group, substituted or unsubstituted heterocyclic group, substituted or unsubstituted alkylsulfonyl group, substituted or unsubstituted arylsulfonyl group, substituted or unsubstituted alkoxycarbonyl group, substituted or unsubstituted aryloxycarbonyl group, substituted or unsubstituted carbamoyl group, substituted or unsubstituted monoalkylaminocarbonyl group, substituted or unsubstituted dialkylaminocarbonyl group, substituted or unsubstituted monoarylaminocarbonyl group, substituted or unsubstituted diarylaminocarbonyl group, or substituted or unsubstituted alkylarylaminocarbonyl group.

When dye A in the ink composition according to this embodiment is a compound represented by general formula (1), the ink composition is better in color strength and resistance to gases.

The following describes the compound represented by general formula (1). This description of the compound of general formula (1) is based on a citation of paragraphs 0015 to 0084 of JP-A-2016-41801.

Prior to that, the following provides specific examples of substituents the compound of general formula (1) can have, which are defined as substituent set A.

Substituent Set A

The substituents constituting substituent set A include a halogen atom and alkyl, aralkyl, alkenyl, alkynyl, aryl, heterocyclic, cyano, hydroxyl, nitro, alkoxy, aryloxy, silyloxy, heterocyclic oxy, acyloxy, carbamoyloxy, alkoxycarbonyloxy, aryloxycarbonyloxy, amino, acylamino, aminocarbonylamino, alkoxycarbonylamino, aryloxycarbonylamino, sulfamoylamino, alkyl- and aryl-sulfonylamino, mercapto, alkylthio, arylthio, heterocyclic thio, sulfamoyl, alkyl- and aryl-sulfinyl, alkyl- and aryl-sulfonyl, acyl, aryloxycarbonyl, alkoxycarbonyl, carbamoyl, aryl- and heterocyclic azo, imido, phosphino, phosphinyl, phosphinyloxy, phosphinylamino, silyl, and ionic hydrophilic groups. These substituents may have a substituent, for example one selected from substituent group A.

Examples of halogen atoms include a fluorine, chlorine, bromine, and iodine atom.

Examples of alkyl groups include substituted and unsubstituted linear, branched, or cyclic alkyl groups and also encompass cycloalkyl and bicycloalkyl groups and even tricyclo and other framework having a greater number of cyclic structures. This concept applies to any alkyl group in the substituents described hereinafter (e.g., one in an alkoxy or alkylthio group).

Preferred alkyl groups include those having 1 to 30 carbon atoms, such as methyl, ethyl, n-propyl, i-propyl, t-butyl, n-octyl, eicosyl, 2-chloroethyl, 2-cyanoethyl, and 2-ethylhexyl. Preferred cycloalkyl groups include substituted and unsubstituted cycloalkyl groups having 3 to 30 carbon atoms, such as cyclohexyl, cyclopentyl, and 4-n-dodecylcyclohexyl. Preferred bicycloalkyl groups include substituted and unsubstituted bicycloalkyl groups having 5 to 30 carbon atoms, or, in other words, monovalent groups obtained by removing a hydrogen atom from a bicycloalkane of 5 to 30 carbon atoms, such as bicyclo[1,2,2]heptan-2-yl and bicyclo[2,2,2]octan-3-yl.

Examples of aralkyl groups include substituted and unsubstituted aralkyl groups, preferably those having 7 to 30 carbon atoms, such as benzyl and 2-phenethyl.

Examples of alkenyl groups include substituted and unsubstituted linear, branched, or cyclic alkenyl groups and also encompass cycloalkenyl and bicycloalkenyl groups.

Preferred alkenyl groups include substituted and unsubstituted alkenyl groups having 2 to 30 carbon atoms, such as vinyl, allyl, prenyl, geranyl, and oleyl. Preferred cycloalkenyl groups include substituted and unsubstituted cycloalkenyl groups having 3 to 30 carbon atoms, or, in other words, monovalent groups obtained by removing a hydrogen atom from a cycloalkene of 3 to 30 carbon atoms, such as 2-cyclopentene-1-yl and 2-cyclohexene-1-yl. Examples of bicycloalkenyl groups include substituted and unsubstituted bicycloalkenyl groups. Among these are preferred substituted and unsubstituted bicycloalkenyl groups having 5 to 30 carbon atoms, or, in other words, monovalent groups obtained by removing a hydrogen atom from a bicycloalkene having a double bond, such as bicyclo[2,2,1]hept-2-en-1-yl and bicyclo[2,2,2]oct-2-en-4-yl.

Preferred alkynyl groups include substituted and unsubstituted alkynyl groups having 2 to 30 carbon atoms, such as ethynyl, propargyl, and trimethylsilylethynyl.

Preferred aryl groups include substituted and unsubstituted aryl groups having 6 to 30 carbon atoms, such as phenyl, p-tolyl, naphthyl, m-chlorophenyl, and o-hexadecanoylaminophenyl.

Preferred heterocyclic groups include monovalent groups obtained by removing a hydrogen atom from a five- or six-membered substituted and unsubstituted aromatic or nonaromatic heterocycle, more preferably five- or six-membered aromatic heterocyclic groups having 3 to 30 carbon atoms, such as 2-furyl, 2-thienyl, 2-pyrimidinyl, and 2-benzothiazolyl. An example of a nonaromatic heterocyclic group is morpholinyl.

Preferred alkoxy groups include substituted and unsubstituted alkoxyl groups having 1 to 30 carbon atoms, such as methoxy, ethoxy, isopropoxy, t-butoxy, n-octyloxy, and 2-methoxyethoxy.

Preferred aryloxy groups include substituted and unsubstituted aryloxy groups having 6 to 30 carbon atoms, such as phenoxy, 2-methylphenoxy, 4-t-butylphenoxy, 3-nitrophenoxy, and 2-tetradecanoylaminophenoxy.

Preferred silyloxy groups include substituted and unsubstituted silyloxy groups having 0 to 20 carbon atoms, such as trimethylsilyloxy and diphenylmethylsilyloxy.

Preferred heterocyclic oxy groups include substituted and unsubstituted heterocyclic oxy groups having 2 to 30 carbon atoms, such as 1-phenyltetrazole-5-oxy and 2-tetrahydropyranyloxy.

Preferred acyloxy groups include formyloxy, substituted and unsubstituted alkylcarbonyloxy groups having 2 to 30 carbon atoms, and substituted and unsubstituted arylcarbonyloxy groups having 6 to 30 carbon atoms, such as acetyloxy, pivaloyloxy, stearoyloxy, benzoyloxy, and p-methoxyphenylcarbonyloxy.

Preferred carbamoyloxy groups include substituted and unsubstituted carbamoyloxy groups having 1 to 30 carbon atoms, such as N,N-dimethylcarbamoyloxy, N,N-diethylcarbamoyloxy, morpholinocarbonyloxy, N,N-di-n-octylaminocarbonyloxy, and N-n-octylcarbamoyloxy.

Preferred alkoxycarbonyloxy groups include substituted and unsubstituted alkoxycarbonyloxy groups having 2 to 30 carbon atoms, such as methoxycarbonyloxy, ethoxycarbonyloxy, t-butoxycarbonyloxy, and n-octylcarbonyloxy.

Preferred aryloxycarbonyloxy groups include substituted and unsubstituted aryloxycarbonyloxy groups having 7 to 30 carbon atoms, such as phenoxycarbonyloxy, p-methoxyphenoxycarbonyloxy, and p-n-hexadecyloxyphenoxycarbonyloxy.

Amino groups that can be used include alkylamino, arylamino, and heterocyclic amino groups. Preferred amino groups include amino, substituted and unsubstituted alkylamino groups having 1 to 30 carbon atoms, and substituted and unsubstituted anilino groups having 6 to 30 carbon atoms, such as methylamino, dimethylamino, anilino, N-methylanilino, diphenylamino, and triazinylamino.

Preferred acylamino groups include formylamino, substituted and unsubstituted alkylcarbonylamino groups having 1 to 30 carbon atoms, and substituted and unsubstituted arylcarbonylamino groups having 6 to 30 carbon atoms, such as acetylamino, pivaloylamino, lauroylamino, benzoylamino, and 3,4,5-tri-n-octyloxyphenylcarbonylamino.

Preferred aminocarbonylamino groups include substituted and unsubstituted aminocarbonylamino groups having 1 to 30 carbon atoms, such as carbamoylamino, N,N-dimethylaminocarbonylamino, N,N-diethylaminocarbonylamino, and morpholinocarbonylamino.

Preferred alkoxycarbonylamino groups include substituted and unsubstituted alkoxycarbonylamino groups having 2 to 30 carbon atoms, such as methoxycarbonylamino, ethoxycarbonylamino, t-butoxycarbonylamino, n-octadecyloxycarbonylamino, and N-methylmethoxycarbonylamino.

Preferred aryloxycarbonylamino groups include substituted and unsubstituted aryloxycarbonylamino groups having 7 to 30 carbon atoms, such as phenoxycarbonylamino, p-chlorophenoxycarbonylamino, and m-n-octyloxyphenoxycarbonylamino.

Preferred sulfamoylamino groups include substituted and unsubstituted sulfamoylamino groups having 0 to 30 carbon atoms, such as sulfamoylamino, N,N-dimethylaminosulfonylamino, and N-n-octylaminosulfonylamino.

Preferred alkyl- or aryl-sulfonylamino groups include substituted and unsubstituted alkylsulfonylamino groups having 1 to 30 carbon atoms and substituted and unsubstituted arylsulfonylamino group having 6 to 30 carbon atoms, such as methylsulfonylamino, butylsulfonylamino, phenylsulfonylamino, 2,3,5-trichlorophenylsulfonylamino, and p-methylphenylsulfonylamino.

Preferred alkylthio groups include substituted and unsubstituted alkylthio groups having 1 to 30 carbon atoms, such as methylthio, ethylthio, and n-hexadecylthio.

Preferred arylthio groups include substituted and unsubstituted arylthio groups having 6 to 30 carbon atoms, such as phenylthio, p-chlorophenylthio, and m-methoxyphenylthio.

Preferred heterocyclic thio groups include substituted and unsubstituted heterocyclic thio groups having 2 or 30 carbon atoms, such as 2-benzothiazolylthio and 1-phenyltetrazol-5-ylthio.

Preferred sulfamoyl groups include substituted and unsubstituted sulfamoyl groups having 0 to 30 carbon atoms, such as N-ethylsulfamoyl, N-(3-dodecyloxypropyl)sulfamoyl, N,N-dimethylsulfamoyl, N-acetylsulfamoyl, N-benzoylsulfamoyl, and N—(N'-phenylcarbamoyl)sulfamoyl.

Preferred alkyl- or aryl-sulfinyl groups include substituted and unsubstituted alkylsulfinyl groups having 1 to 30 carbon atoms and substituted and unsubstituted arylsulfinyl groups having 6 to 30 carbon atoms, such as methylsulfinyl, ethylsulfinyl, phenylsulfinyl, and p-methylphenylsulfinyl.

Preferred alkyl- or aryl-sulfonyl groups include substituted and unsubstituted alkylsulfonyl groups having 1 to 30 carbon atoms and substituted and unsubstituted arylsulfonyl groups having 6 to 30 carbon atoms, such as methylsulfonyl, ethylsulfonyl, phenylsulfonyl, and p-methylphenylsulfonyl.

Preferred acyl groups include formyl, substituted and unsubstituted alkylcarbonyl groups having 2 to 30 carbon atoms, substituted and unsubstituted arylcarbonyl groups having 7 to 30 carbon atoms, and substituted and unsubstituted heterocyclic carbonyl groups having 2 to 30 carbon atoms with the carbonyl group on a carbon atom, such as acetyl, pivaloyl, 2-chloroacetyl, stearoyl, benzoyl, p-n-octyloxyphenylcarbonyl, 2-pyridylcarbonyl, and 2-furylcarbonyl.

Preferred aryloxycarbonyl groups include substituted and unsubstituted aryloxycarbonyl groups having 7 to 30 carbon atoms, such as phenoxycarbonyl, o-chlorophenoxycarbonyl, m-nitrophenoxycarbonyl, and p-t-butylphenoxycarbonyl.

Preferred alkoxycarbonyl groups include substituted and unsubstituted alkoxycarbonyl groups having 2 to 30 carbon atoms, such as methoxycarbonyl, ethoxycarbonyl, t-butoxycarbonyl, and n-octadecyl oxycarbonyl.

Preferred carbamoyl groups include substituted and unsubstituted carbamoyl groups having 1 to 30 carbon atoms, such as carbamoyl, N-methylcarbamoyl, N,N-dimethylcarbamoyl, N,N-di-n-octylcarbamoyl, and N-(methylsulfonyl)carbamoyl.

Preferred aryl- or heterocyclic azo groups include substituted and unsubstituted arylazo groups having 6 to 30 carbon atoms and substituted and unsubstituted heterocyclic azo groups having 3 to 30 carbon atoms, such as phenylazo, p-chlorophenylazo, and 5-ethylthio-1,3,4-thiadiazol-2-ylazo.

Preferred imido groups include N-succinimide and N-phthalimide.

Preferred phosphino groups include substituted and unsubstituted phosphino groups having 0 to 30 carbon atoms, such as dimethylphosphino, diphenylphosphino, and methylphenoxyphosphino.

Preferred phosphinyl groups include substituted and unsubstituted phosphinyl groups having 0 to 30 carbon atoms, such as phosphinyl, dioctyloxyphosphinyl, and diethoxyphosphinyl.

Preferred phosphinyloxy groups include substituted and unsubstituted phosphinyloxy groups having 0 to 30 carbon atoms, such as diphenoxyphosphinyloxy and dioctyloxyphosphinyloxy.

Preferred phosphinylamino groups include substituted and unsubstituted phosphinylamino groups having 0 to 30 carbon atoms, such as dimethoxyphosphinylamino and dimethylaminophosphinylamino.

Preferred silyl groups include substituted and unsubstituted silyl groups having 0 to 30 carbon atoms, such as trimethylsilyl, t-butyldimethylsilyl, and phenyldimethylsilyl.

Examples of ionic hydrophilic groups include sulfo, carboxyl, thiocarboxyl, sulfino, phosphono, dihydroxyphosphino, and quaternary ammonium. Sulfo and carboxyl are particularly preferred. Carboxyl, phosphono, and sulfo may be in the form of a salt, and examples of countercations that form a salt therewith include ammonium, alkali metal ions (e.g., lithium, sodium, and potassium ions), and organic cations (e.g., tetramethylammonium and tetramethylguanidium ions and tetramethylphosphonium ions). Salts of lithium, sodium, potassium, and ammonium are preferred, sodium salts and salt blends made primarily with a sodium salt are more preferred, and sodium salts are the most preferred.

It should be noted that in the invention, any compound that is a salt and present in a water-soluble ink is in the form of dissociated ions.

Compound Represented by General Formula (1)

Here begins the description of the compound of general formula (1).

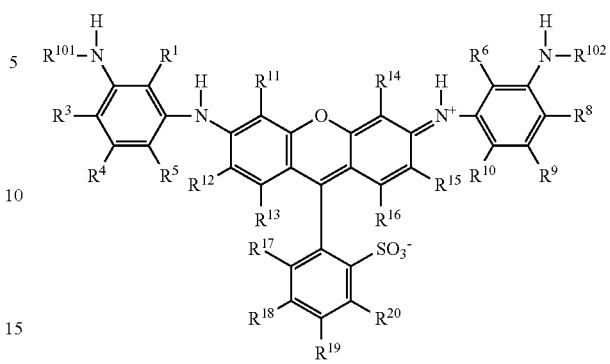

(1)

In general formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or substituent. $R^{101}$ and $R^{102}$ each independently represent a substituted or unsubstituted alkyl group, substituted or unsubstituted aryl group, substituted or unsubstituted heterocyclic group, substituted or unsubstituted alkylsulfonyl group, substituted or unsubstituted arylsulfonyl group, substituted or unsubstituted alkoxycarbonyl group, substituted or unsubstituted aryloxycarbonyl group, substituted or unsubstituted carbamoyl group, substituted or unsubstituted monoalkylaminocarbonyl group, substituted or unsubstituted dialkylaminocarbonyl group, substituted or unsubstituted monoarylaminocarbonyl group, substituted or unsubstituted diarylaminocarbonyl group, or substituted or unsubstituted alkylarylaminocarbonyl group.

The compound of general formula (1) has amino groups substituted with a particular group. Although the mechanism behind is unclear, it appears that such a structure of the compound of general formula (1) gives the ink composition high chroma, good density during printing, lightfastness, and resistance to gases.

In general formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or substituent. Examples of substituents that can be represented by $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{22}$ are those in substituent set A.

Preferably, to ensure the availability of raw materials and easy synthesis of the compound, $R^1$, $R^5$, $R^6$, and $R^{10}$ in general formula (1) are each independently a hydrogen atom, substituted or unsubstituted alkyl group, substituted or unsubstituted aryl group, substituted or unsubstituted alkoxy group, substituted or unsubstituted aryloxy group, carboxyl group, or halogen atom. It is more preferred that these Rs be each independently a substituted or unsubstituted alkyl group, substituted or unsubstituted aryl group, or substituted or unsubstituted alkoxy group, in particular a substituted or unsubstituted alkyl group. Alkyl groups having 1 to 6 carbon atoms are preferred, more preferably those having 1 to 3 carbon atoms, even more preferably methyl. The substituent in a substituted group can be, for example, one selected from substituent set A.

Preferably, to ensure the availability of raw materials and easy synthesis of the compound and to help give the ink composition lightfastness, resistance to gases, density during printing, and chroma, $R^4$ and $R^9$ in general formula (1) are each independently a hydrogen atom, substituted or unsubstituted alkyl group, substituted or unsubstituted aryl group, substituted or unsubstituted alkoxy group, substituted or unsubstituted aryloxy group, substituted or unsubstituted amino group, substituted or unsubstituted acylamino group, substituted or unsubstituted alkoxycarbonylamino group, substituted or unsubstituted alkylsulfonylamino group, substituted or unsubstituted arylsulfonylamino group, substituted or unsubstituted alkylureido group, substituted or unsubstituted arylureido group, sulfo group, carboxyl group, or halogen atom. It is more preferred that these Rs be each independently a hydrogen atom, substituted or unsubstituted acylamino group, substituted or unsubstituted alkoxycarbonylamino group, substituted or unsubstituted alkylsulfonylamino group, substituted or unsubstituted arylsulfonylamino group, substituted or unsubstituted alkylureido group, substituted or unsubstituted arylureido group, or sulfo group, in particular a hydrogen atom or sulfo group. The substituent in a substituted group can be, for example, one selected from substituent set A.

Preferably, to ensure that the compound can be synthesized from readily available raw materials, $R^3$ and $R^8$ in general formula (1) are each independently a hydrogen atom, substituted or unsubstituted alkyl group, substituted or unsubstituted aryl group, substituted or unsubstituted alkoxy group, substituted or unsubstituted aryloxy group, substituted or unsubstituted amino group, substituted or unsubstituted acylamino group, substituted or unsubstituted alkoxycarbonylamino group, substituted or unsubstituted alkylsulfonylamino group, substituted or unsubstituted alkylureido group, substituted or unsubstituted arylureido group, sulfo group, carboxyl group, or halogen atom. It is more preferred that these Rs be each independently a hydrogen atom, substituted or unsubstituted alkyl group, or sulfo group, in particular a substituted or unsubstituted alkyl group. Alkyl groups having 1 to 6 carbon atoms are preferred, more preferably those having 1 to 3 carbon atoms, even more preferably methyl. The substituent in a substituted group can be, for example, one selected from substituent set A.

Preferably, to ensure the availability of raw materials and easy synthesis of the compound, $R^{11}$, $R^{14}$, $R^{13}$, $R^{16}$, $R^{17}$, $R^{18}$, $R^{19}$, and $R^{20}$ in general formula (1) are each independently a hydrogen atom, substituted or unsubstituted alkyl group, substituted or unsubstituted aryl group, substituted or unsubstituted alkoxy group, substituted or unsubstituted aryloxy group, hydroxy group, halogen atom, or sulfo group. It is more preferred that these Rs be each independently a hydrogen atom, hydroxy group, halogen atom, or sulfo group, in particular a hydrogen atom. The substituent in a substituted group can be, for example, one selected from substituent set A.

Preferably, to ensure the availability of raw materials and easy synthesis of the compound, $R^{12}$ and $R^{15}$ in general formula (1) are each independently a hydrogen atom, substituted or unsubstituted alkyl group, substituted or unsubstituted aryl group, halogen atom, or sulfo group. It is more preferred that these Rs be each independently a hydrogen atom or sulfo group. The substituent in a substituted group can be, for example, one selected from substituent set A.

When it comes to solubility, it is preferred that at least one of $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in general formula (1) have an ionic hydrophilic group, such as a carboxyl, sulfo, or phosphono group. While examples of countercations for such ionic hydrophilic groups include hydrogen (proton), alkali metal cations (lithium, sodium, and potassium ions), and the ammonium ion, alkali metal cations are preferred given the ease of synthesis (ease of handling of the compound as a dye powder).

In general formula (1), $R^{101}$ and $R^{102}$ each independently represent a substituted or unsubstituted alkyl group, substituted or unsubstituted aryl group, substituted or unsubstituted heterocyclic group, substituted or unsubstituted alkylsulfonyl group, substituted or unsubstituted arylsulfonyl group, substituted or unsubstituted alkoxycarbonyl group, substituted or unsubstituted aryloxycarbonyl group, substituted or unsubstituted carbamoyl group, substituted or unsubstituted monoalkylaminocarbonyl group, substituted or unsubstituted dialkylaminocarbonyl group, substituted or unsubstituted monoarylaminocarbonyl group, substituted or unsubstituted diarylaminocarbonyl group, or substituted or unsubstituted alkylarylaminocarbonyl group.

A substituted or unsubstituted alkyl group in $R^{101}$ and $R^{102}$ is preferably one having 1 to 6 carbon atoms, more preferably one having 1 to 3 carbon atoms, even more preferably methyl or ethyl. The substituent in a substituted alkyl group can be, for example, one selected from substituent set A, preferably an aryl group, in particular phenyl.

A substituted or unsubstituted aryl group in $R^{101}$ and $R^{102}$ is preferably one having 6 to 14 carbon atoms, more preferably one having 6 to 10 carbon atoms, even more preferably phenyl. The substituent in a substituted aryl group can be, for example, one selected from substituent set A.

A substituted or unsubstituted heterocyclic group in $R^{101}$ and $R^{102}$ is preferably triazine, thiazolyl, benzothiazolyl, or thiadiazolyl. The substituent in a substituted heterocyclic group can be, for example, one selected from substituent set A, preferably a substituted or unsubstituted amino group or substituted or unsubstituted sulfamoyl group.

A substituted or unsubstituted alkylsulfonyl group in $R^{101}$ and $R^{102}$ is preferably one having 1 to 6 carbon atoms, more preferably one having 1 to 3 carbon atoms, even more preferably methylsulfonyl. The substituent in a substituted alkylsulfonyl group can be, for example, one selected from substituent set A.

A substituted or unsubstituted arylsulfonyl group in $R^{101}$ and $R^{102}$ is preferably one having 6 to 14 carbon atoms, more preferably one having 6 to 10 carbon atoms, even more preferably phenylsulfonyl. The substituent in a substituted arylsulfonyl group can be, for example, one selected from substituent set A, with carboxyl being particularly preferred.

A substituted or unsubstituted alkoxycarbonyl group in $R^{101}$ and $R^{102}$ is preferably one represented by —COOR$^{201}$. $R^{201}$ represents an alkyl group having 1 to 6 carbon atoms, preferably an alkyl group having 1 to 4 carbon atoms, more preferably isopropyl. The substituent in a substituted alkoxycarbonyl group can be, for example, one selected from substituent set A.

A substituted or unsubstituted aryloxycarbonyl group in $R^{101}$ and $R^{102}$ is preferably one represented by —COOR$^{202}$. $R^{202}$ represents an aryl group having 6 to 14 carbon atoms, preferably an aryl group having 6 to 10 carbon atoms, more preferably phenyl. The substituent in a substituted aryloxycarbonyl group can be, for example, one selected from substituent set A, with nitro being particularly preferred.

A substituted or unsubstituted monoalkylaminocarbonyl group in $R^{101}$ and $R^{102}$ is preferably one represented by —CONHR$^{203}$. $R^{203}$ represents an alkyl group having 1 to 12 carbon atoms, preferably an alkyl group having 1 to 10 carbon atoms, more preferably an alkyl group having 1 to 6 carbon atoms, even more preferably methyl, ethyl, isopropyl, hexyl, 2-ethylhexyl, dodecyl, or cyclohexyl, in particular isopropyl. The substituent in a substituted monoalkylaminocarbonyl group can be, for example, one selected from substituent set A, with phenyl, carboxyl, a substituted or unsubstituted amino group, and hydroxyl being particularly preferred.

A substituted or unsubstituted dialkylaminocarbonyl group in $R^{101}$ and $R^{102}$ is preferably one represented by —$CONR^{204}R^{205}$. $R^{204}$ and $R^{205}$ each independently represent an alkyl group having 1 to 10 carbon atoms, preferably an alkyl group having 1 to 6 carbon atoms, more preferably methyl or isopropyl.

The substituent in a substituted dialkylaminocarbonyl group can be, for example, one selected from substituent set A, with carboxyl and alkyloxycarbonyl groups (preferably those having 2 to 6 carbon atoms, more preferably ethyloxycarbonyl) being particularly preferred.

A substituted or unsubstituted monoarylaminocarbonyl group in $R^{101}$ and $R^{102}$ is preferably one represented by —$CONHR^{206}$. $R^{206}$ represents an aryl group having 6 to 14 carbon atoms, preferably an aryl group having 6 to 12 carbon atoms, more preferably an aryl group having 6 to 10 carbon atoms. Specifically, phenyl, biphenyl, naphthyl are preferred, and phenyl is preferred to the others. The substituent in a substituted monoarylaminocarbonyl group can be, for example, one selected from substituent set A, with carboxyl, hydroxyl, phosphono, and alkoxy groups (preferably those having 1 to 6 carbon atoms, more preferably cyclohexyloxy) being particularly preferred.

A substituted or unsubstituted diarylaminocarbonyl group in $R^{101}$ and $R^{102}$ is preferably one represented by —$CONR^{207}R^{208}$. $R^{207}$ and $R^{208}$ each independently represent an aryl group having 6 to 14 carbon atoms, preferably an aryl group having 6 to 10 carbon atoms, more preferably phenyl. The substituent in a substituted diarylaminocarbonyl group can be, for example, one selected from substituent set A.

Preferably, to ensure the chroma, lightfastness, and resistance to gases of the ink composition, $R^{101}$ and $R^{102}$ are substituted or unsubstituted alkyl sulfonyl groups, substituted or unsubstituted arylsulfonyl groups, substituted or unsubstituted alkoxycarbonyl groups, substituted or unsubstituted aryloxycarbonyl groups, substituted or unsubstituted carbamoyl groups, substituted or unsubstituted monoalkylaminocarbonyl groups, substituted or unsubstituted dialkylaminocarbonyl groups, substituted or unsubstituted monoarylaminocarbonyl groups, or substituted or unsubstituted diarylaminocarbonyl groups, more preferably substituted or unsubstituted alkylsulfonyl groups, substituted or unsubstituted arylsulfonyl groups, substituted or unsubstituted monoalkylaminocarbonyl groups, substituted or unsubstituted dialkylaminocarbonyl groups, substituted or unsubstituted monoarylaminocarbonyl groups, or substituted or unsubstituted diarylaminocarbonyl groups, in particular substituted or unsubstituted monoalkylaminocarbonyl groups, substituted or unsubstituted dialkylaminocarbonyl groups, substituted or unsubstituted monoarylaminocarbonyl groups, or substituted or unsubstituted diarylaminocarbonyl groups.

Specific examples of compounds represented by general formula (1) include, but are not limited to the following. In the structural formulae of these specific compounds, Me represents methyl, Et represents ethyl, i-Pr represents isopropyl, and n-Bu represents n-butyl. The ratios in the Rs and Ms are molar ratios.

(1-1)

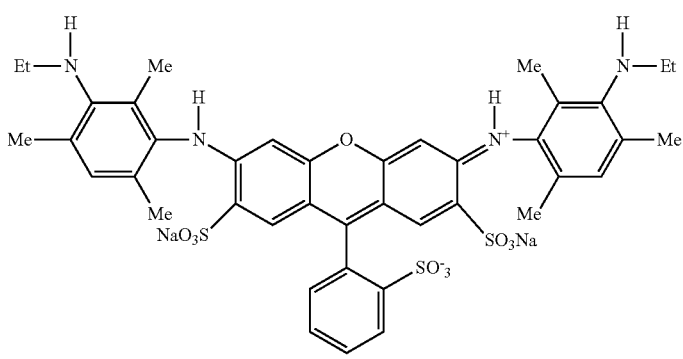

(1-2)

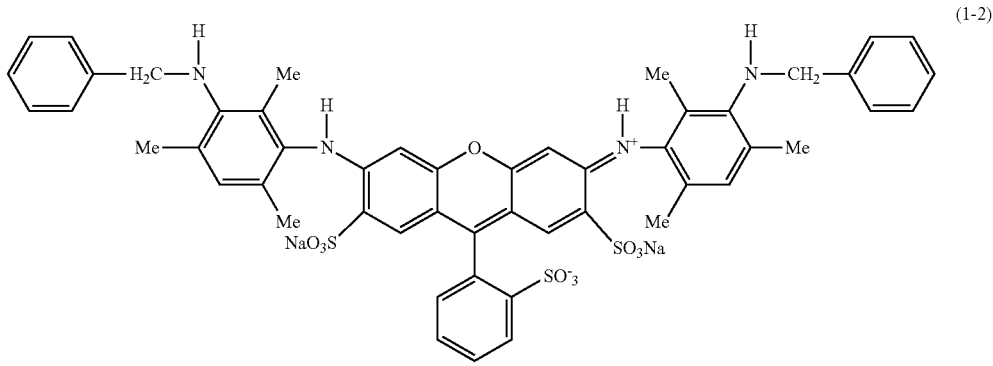

-continued
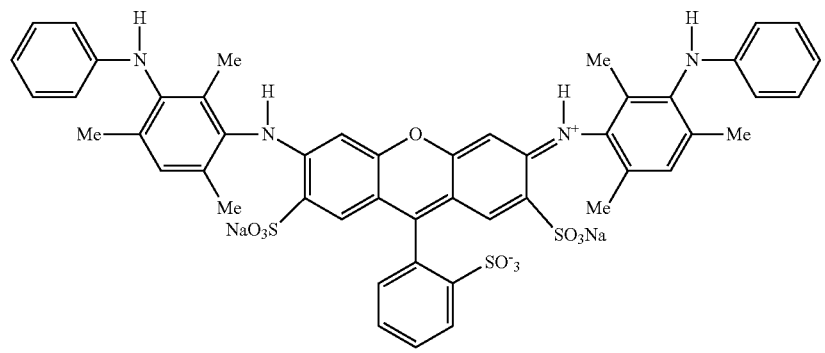
(1-3)
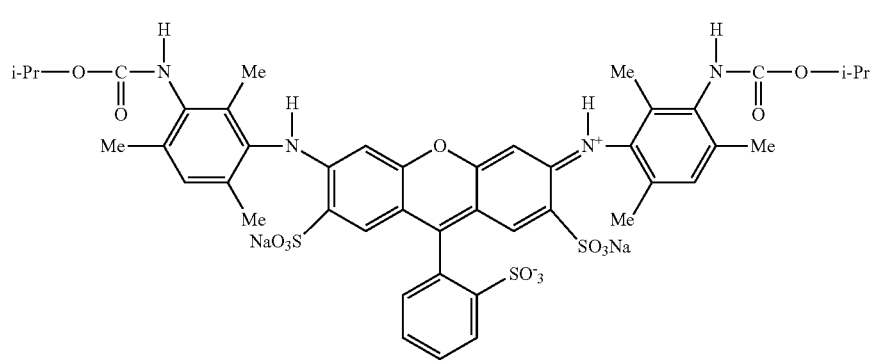
(1-4)
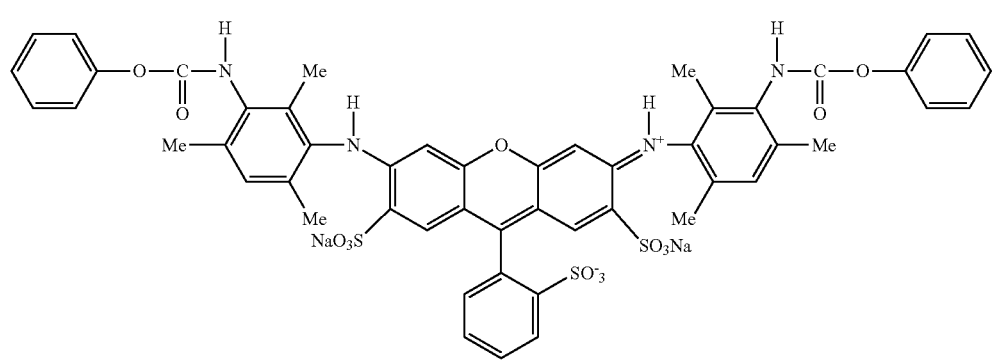
(1-5)
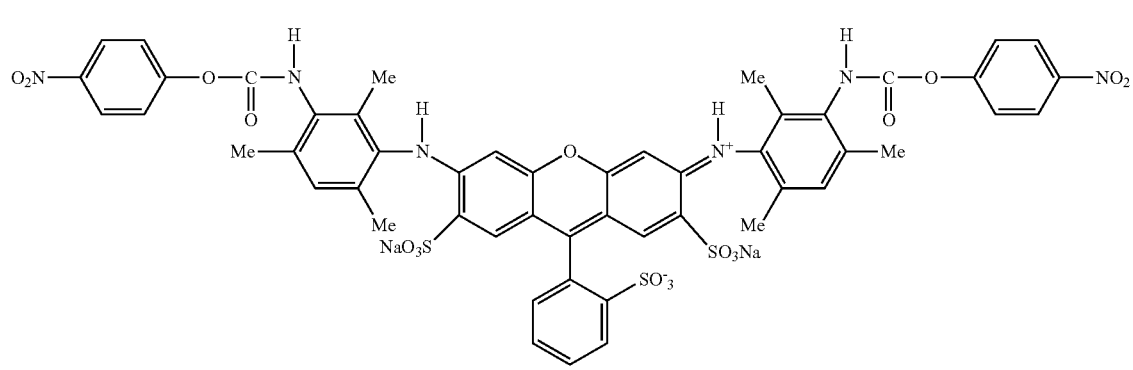
(1-6)

-continued
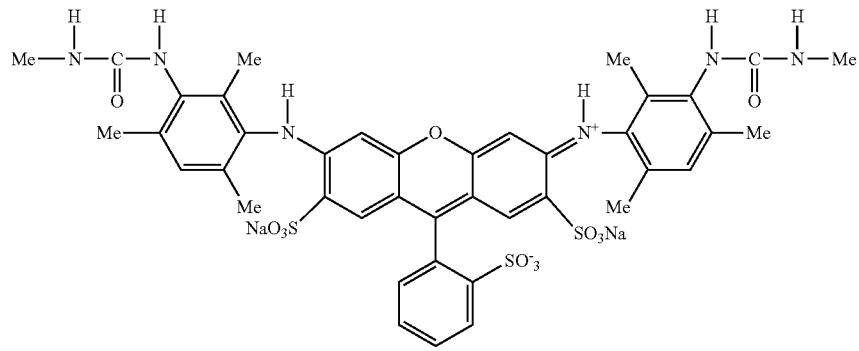
(1-7)
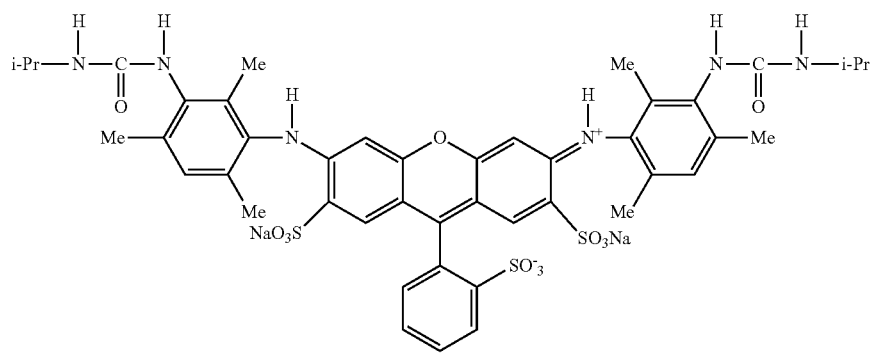
(1-8)
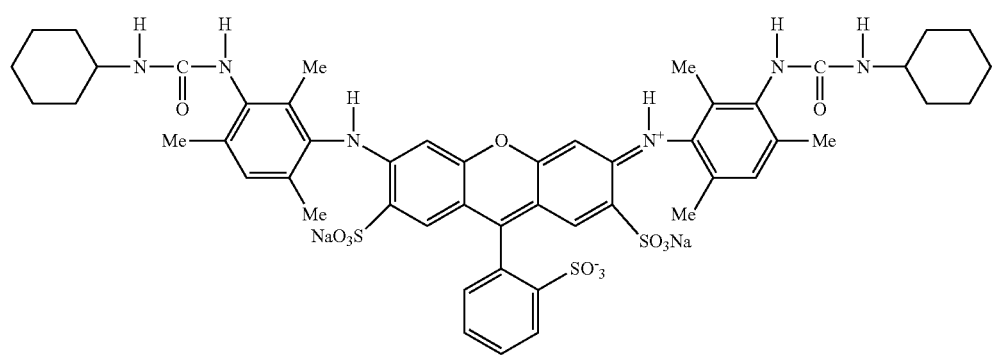
(1-9)
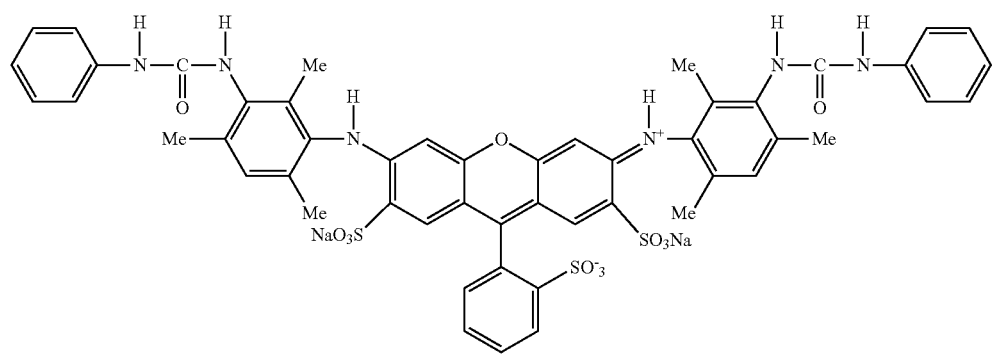
(1-10)

-continued
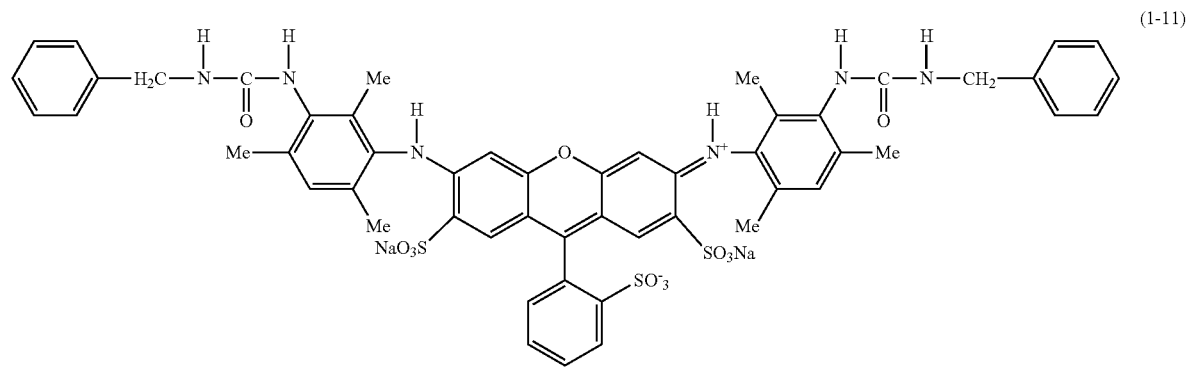
(1-11)
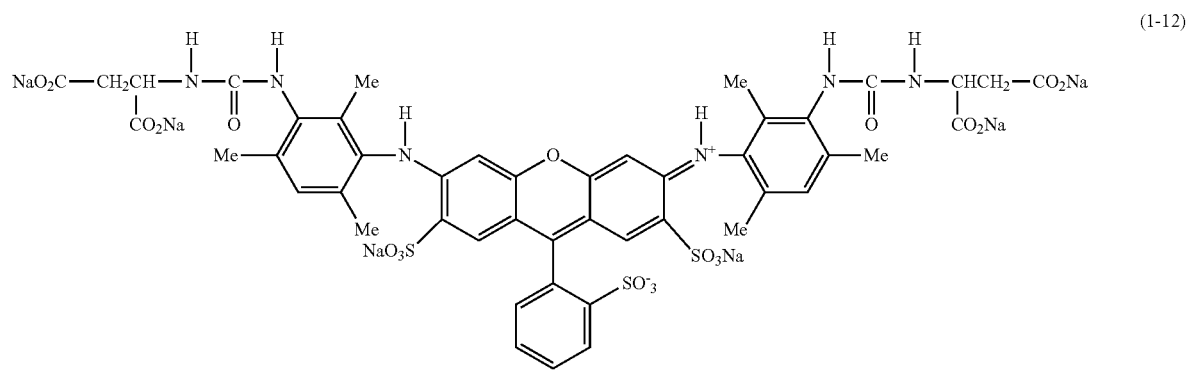
(1-12)
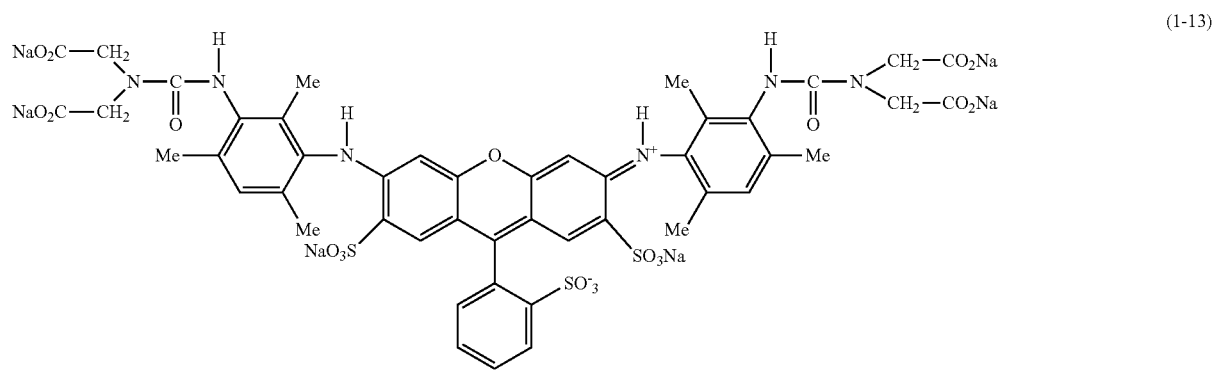
(1-13)
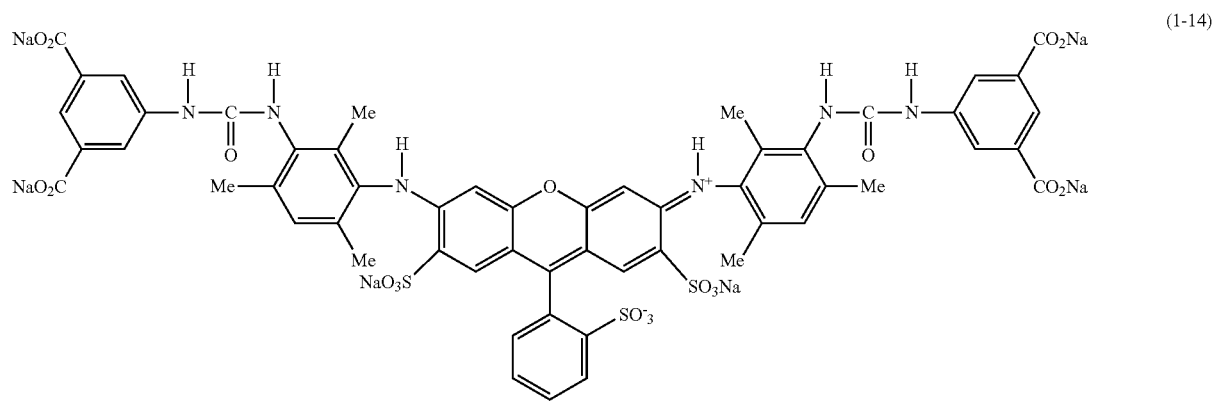
(1-14)

-continued
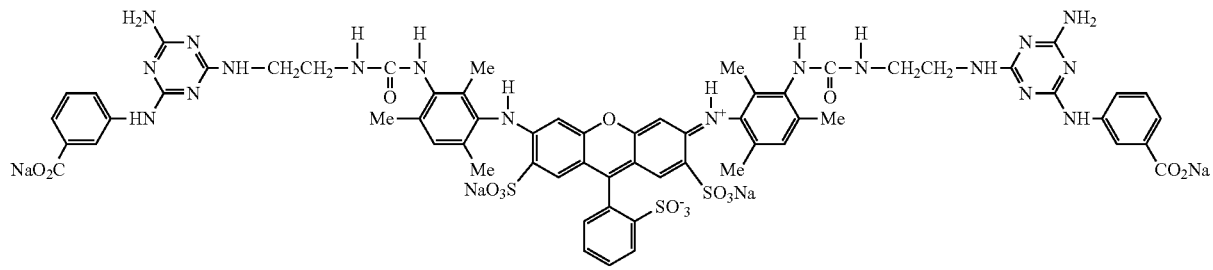
(1-15)
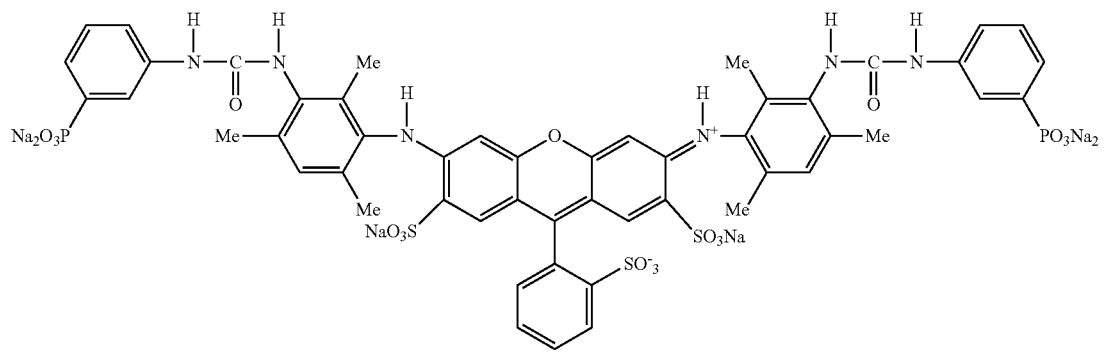
(1-16)
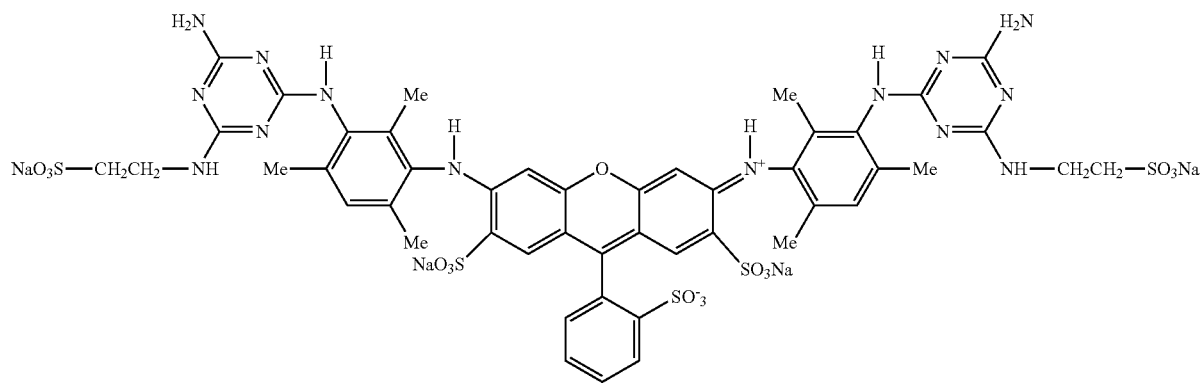
(1-17)
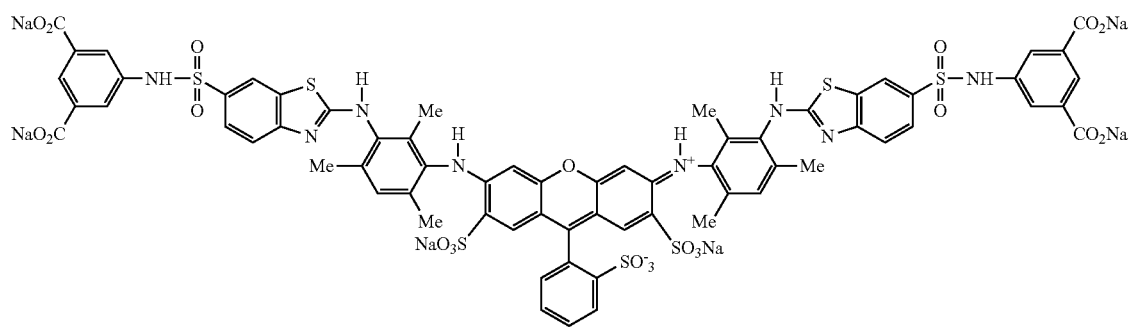
(1-18)

-continued
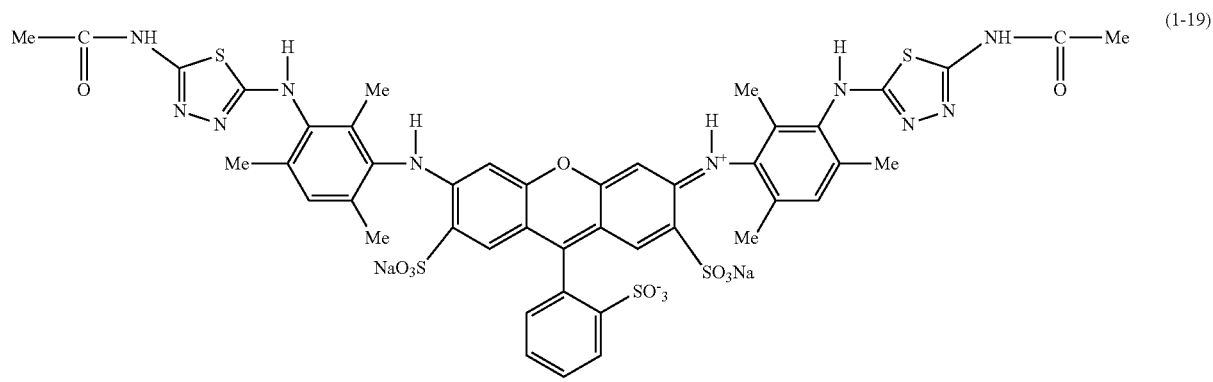
(1-19)
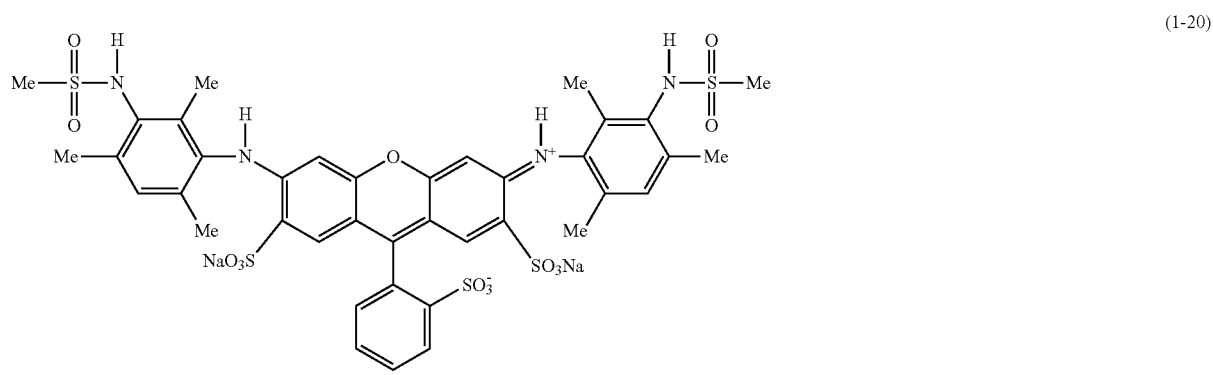
(1-20)
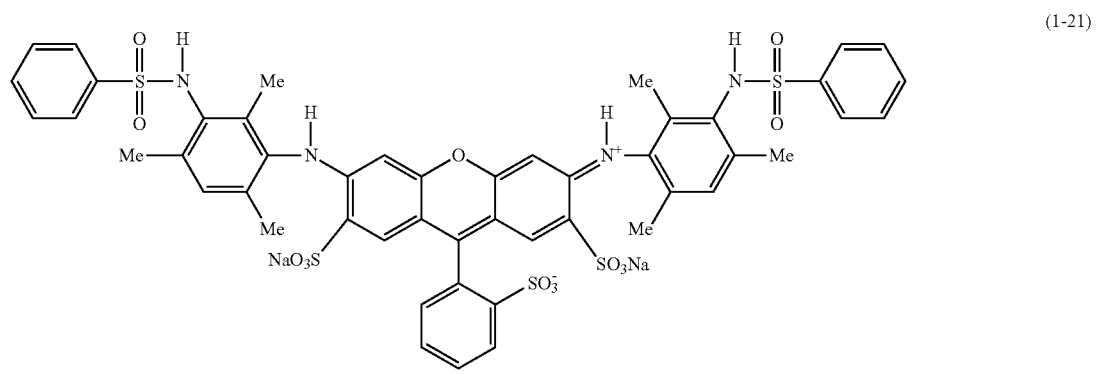
(1-21)
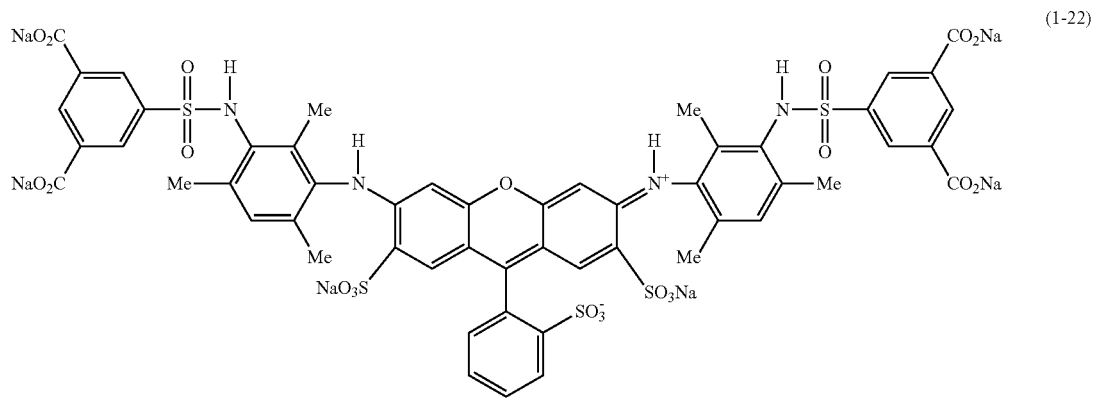
(1-22)

-continued
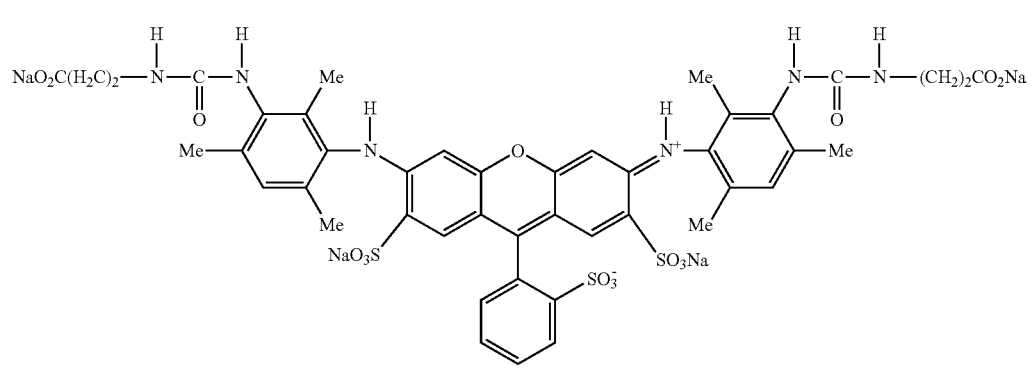
(1-23)
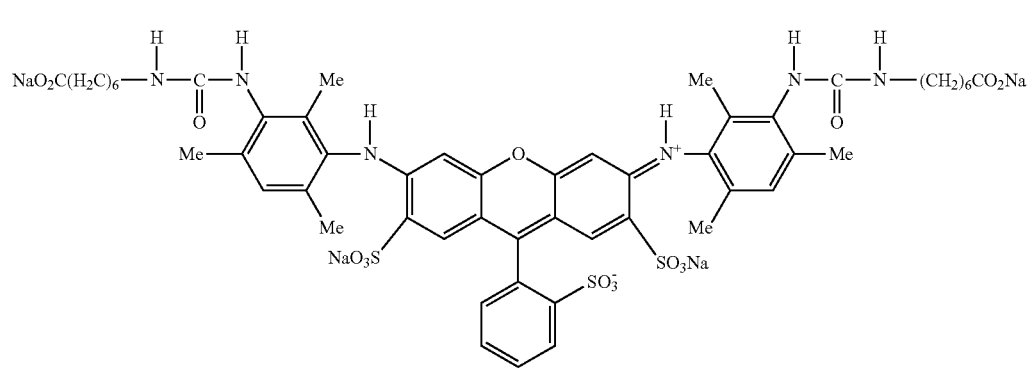
(1-24)
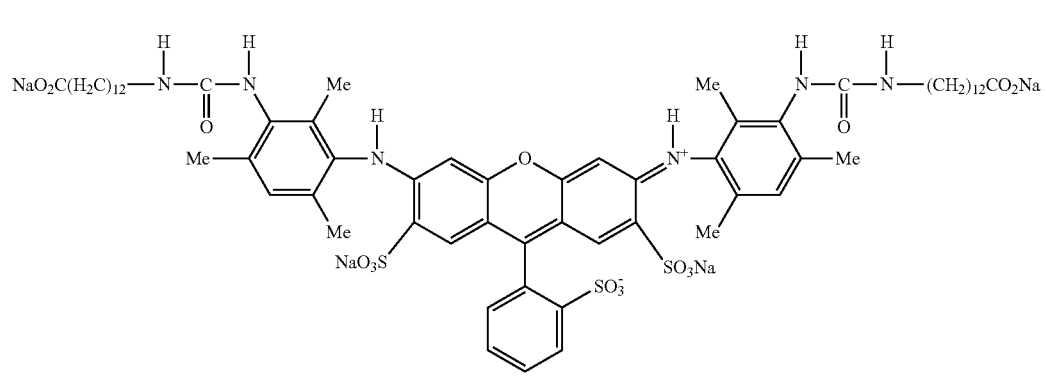
(1-25)
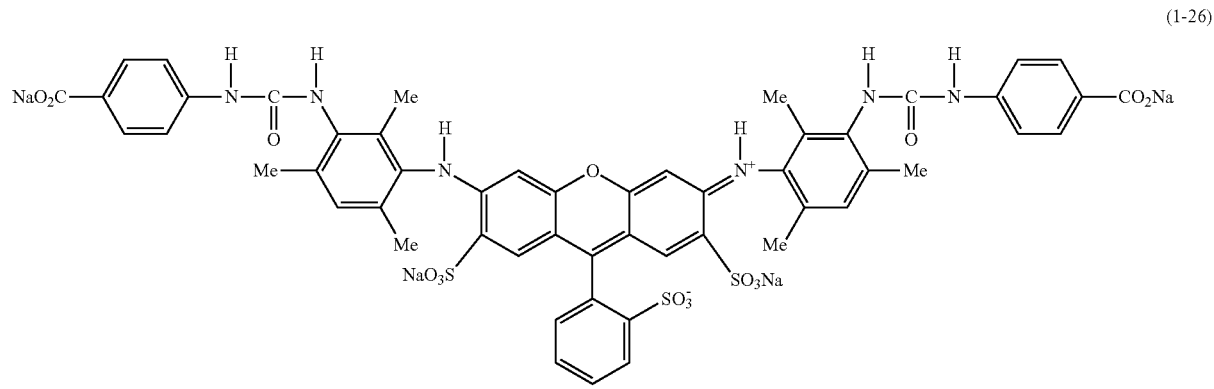
(1-26)

-continued
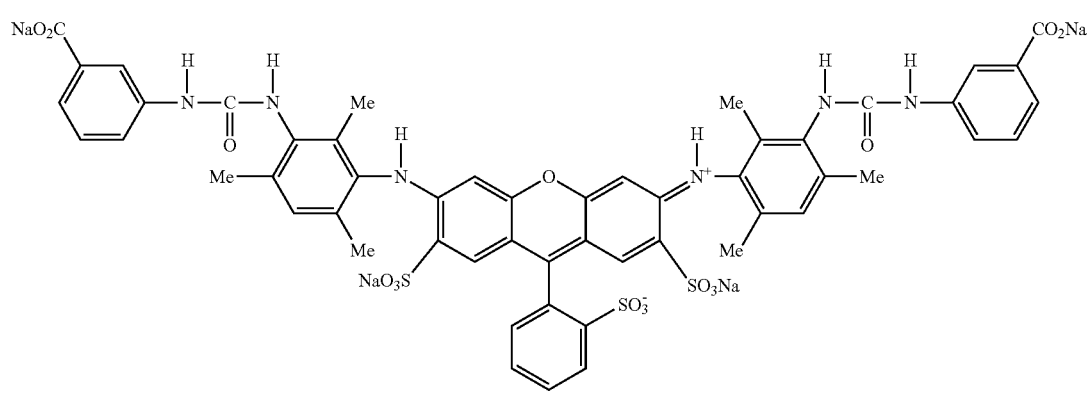
(1-27)
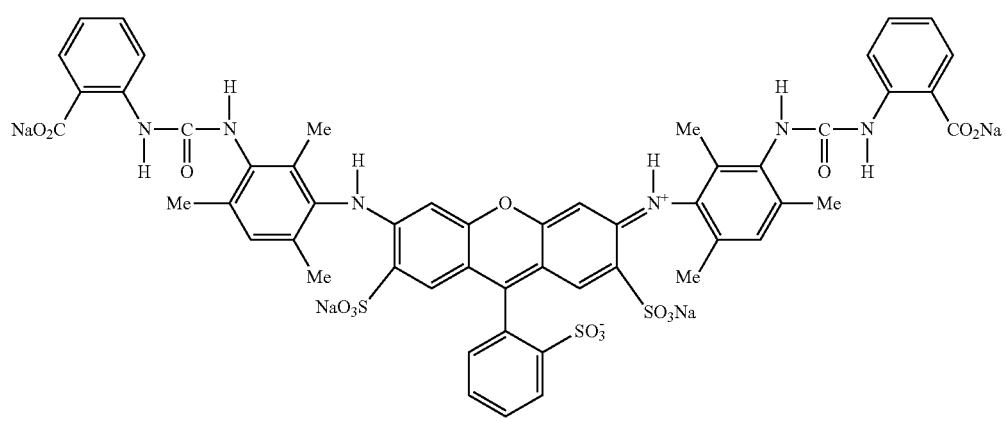
(1-28)
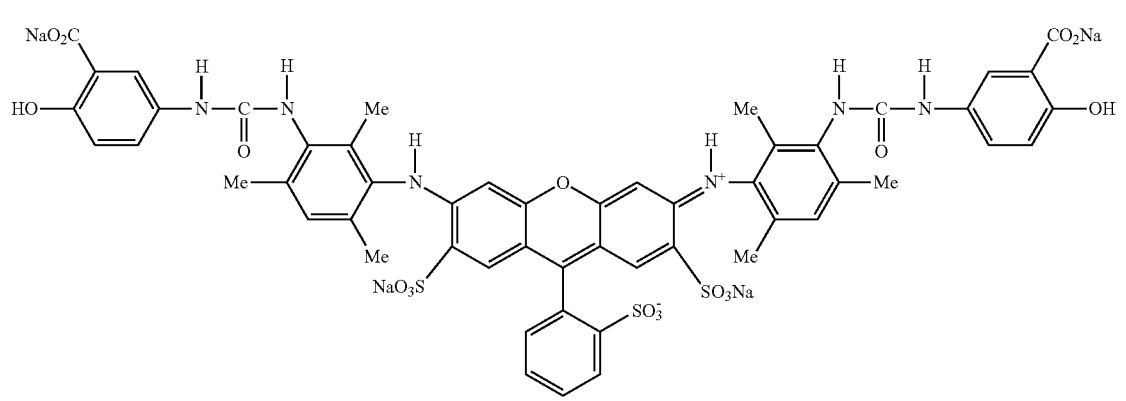
(1-29)
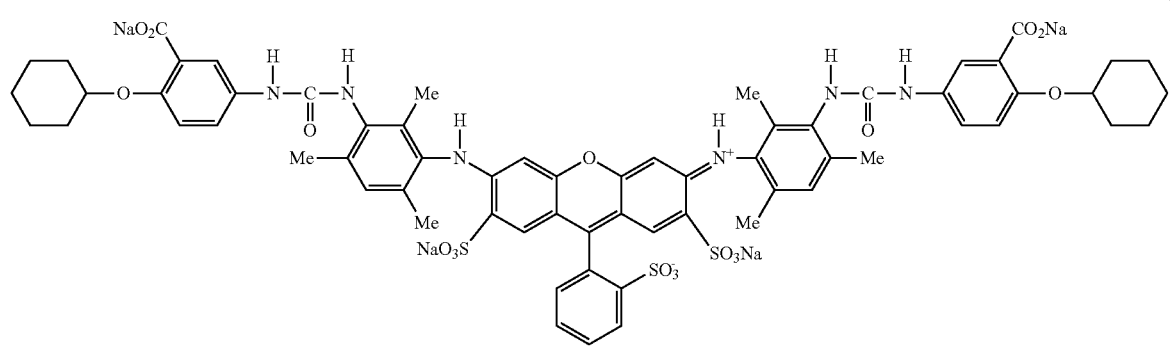
(1-30)

-continued
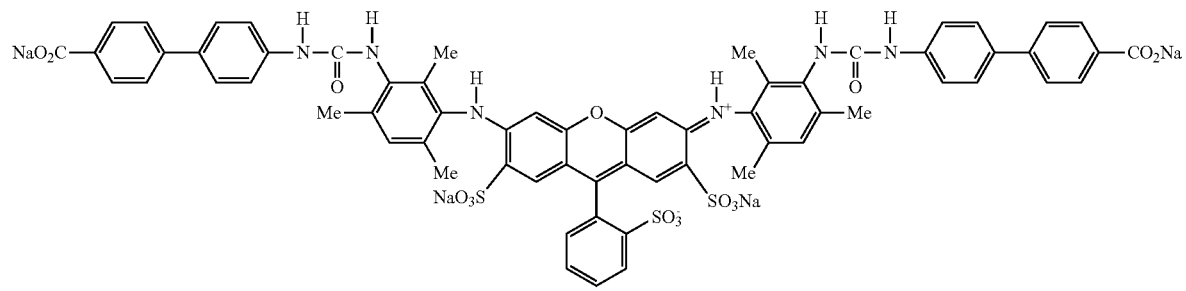
(1-31)
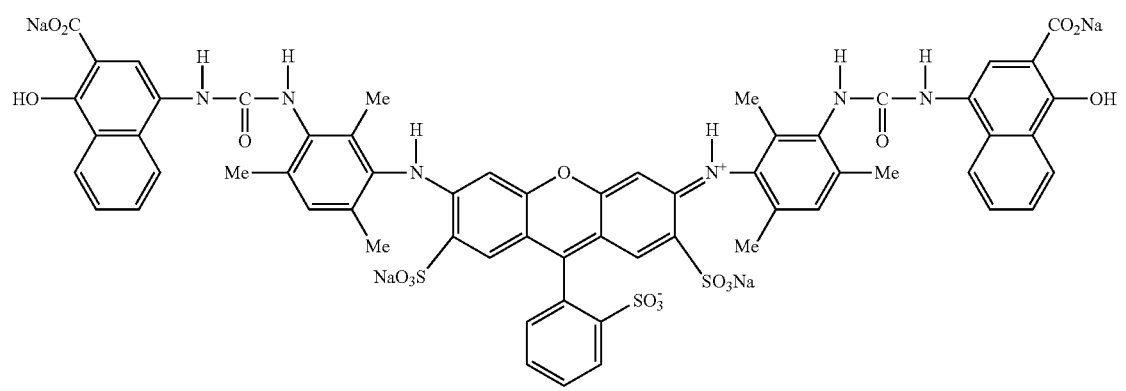
(1-32)
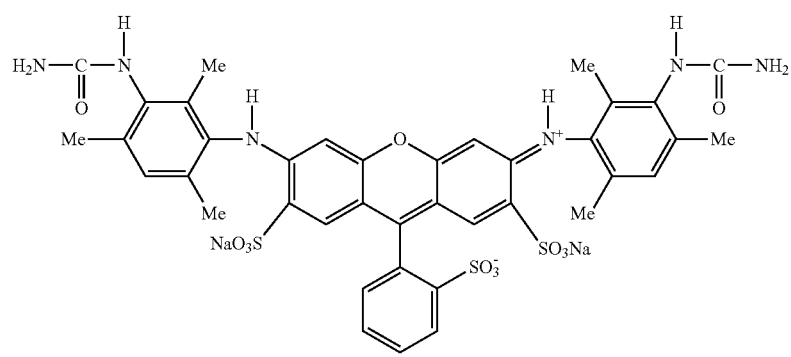
(1-33)
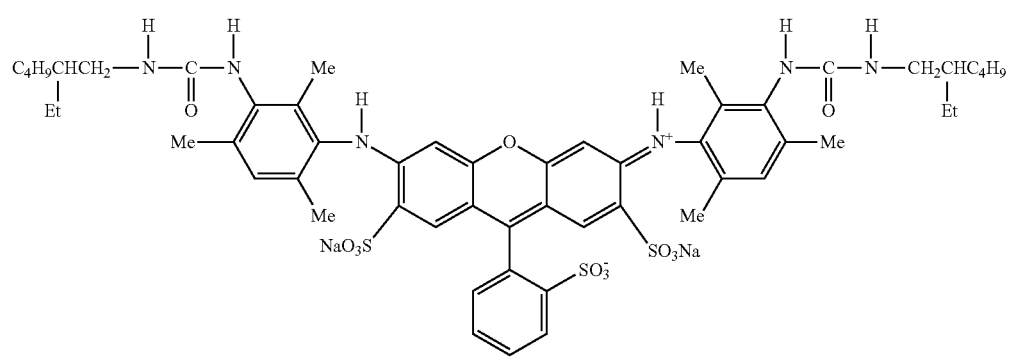
(1-34)

-continued
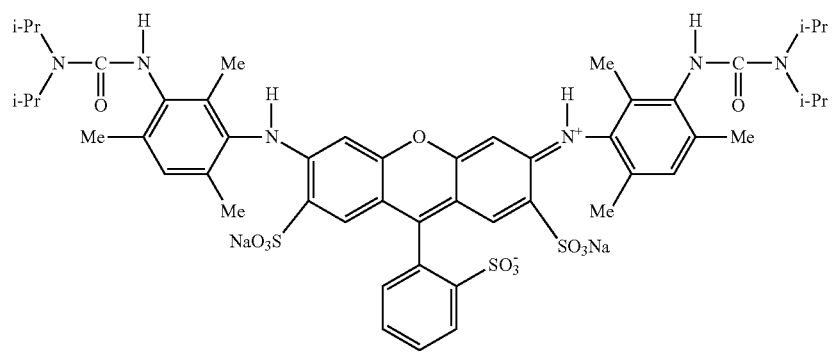
(1-35)
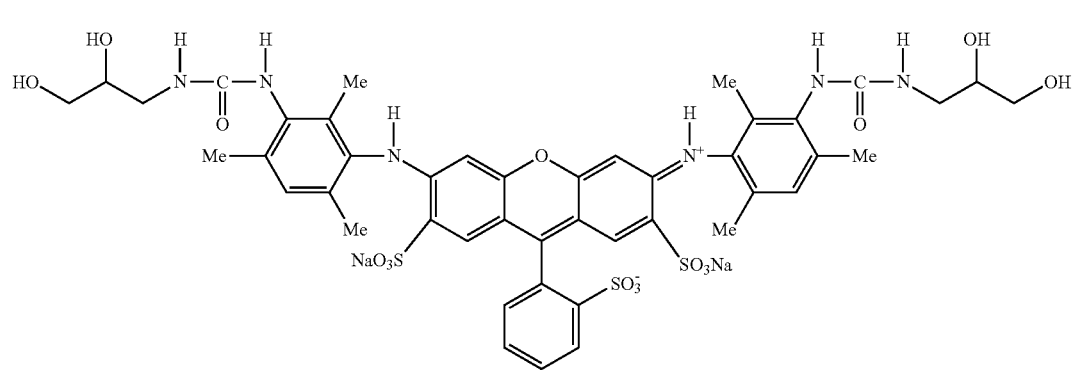
(1-36)
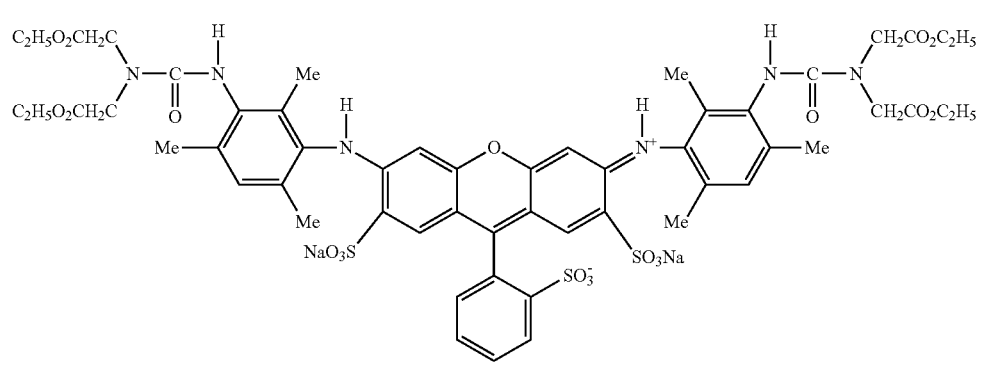
(1-37)
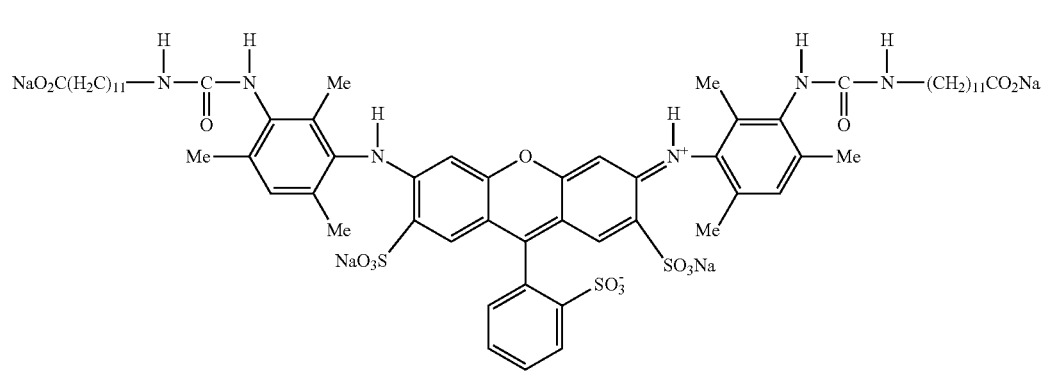
(1-38)

-continued
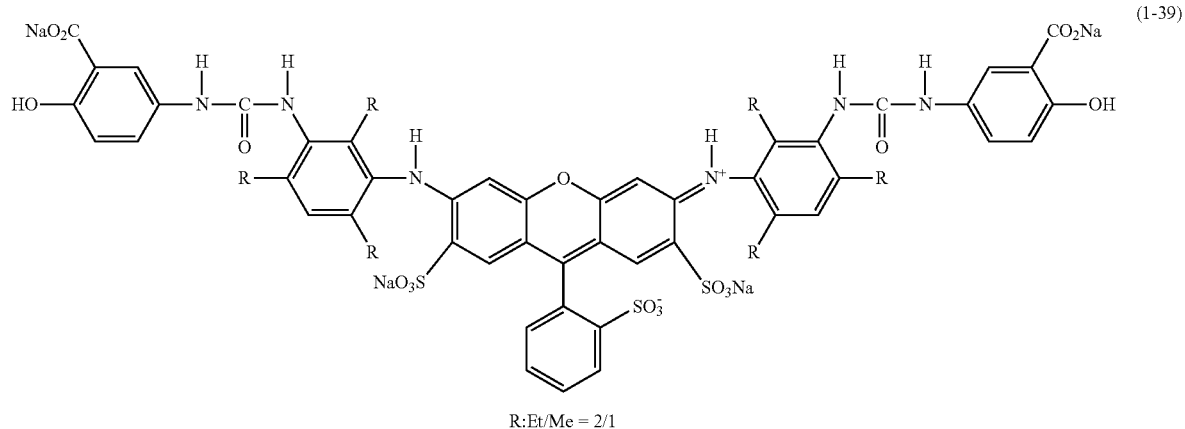
(1-39)
R:Et/Me = 2/1
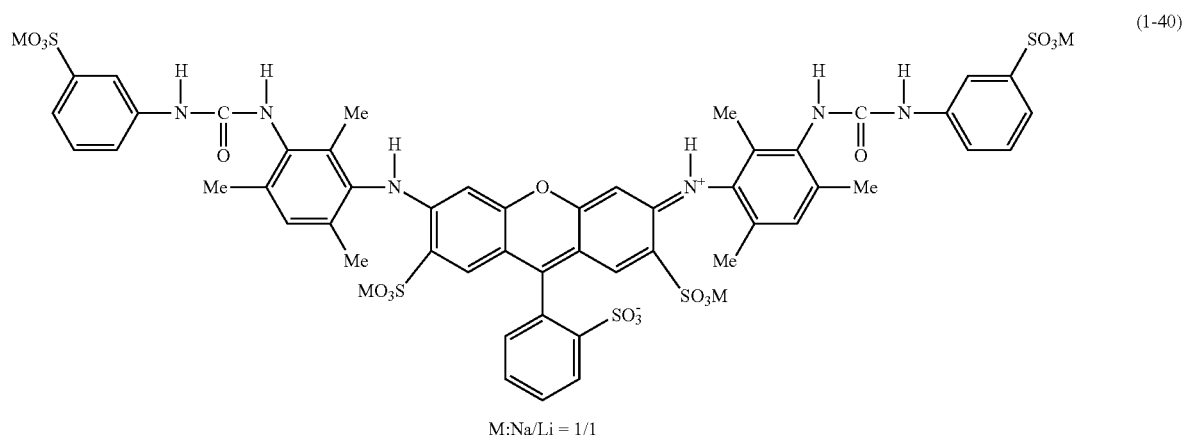
(1-40)
M:Na/Li = 1/1
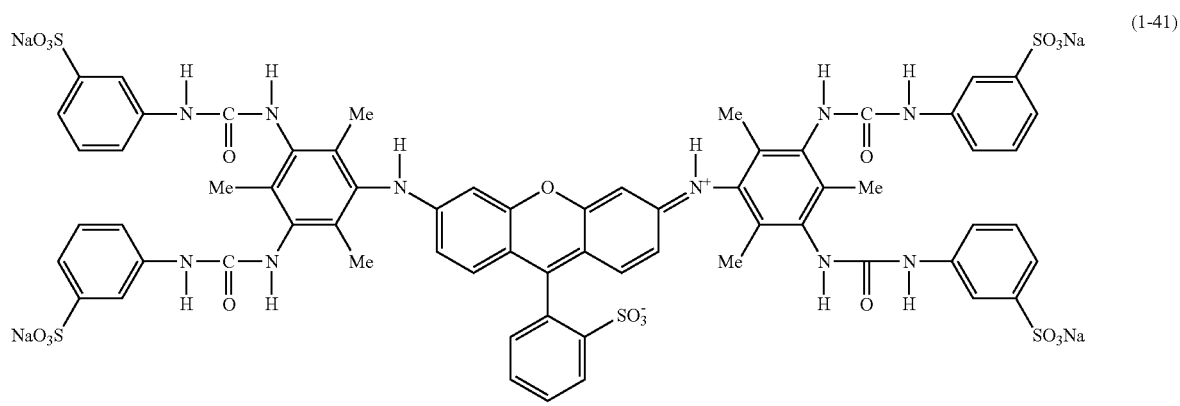
(1-41)
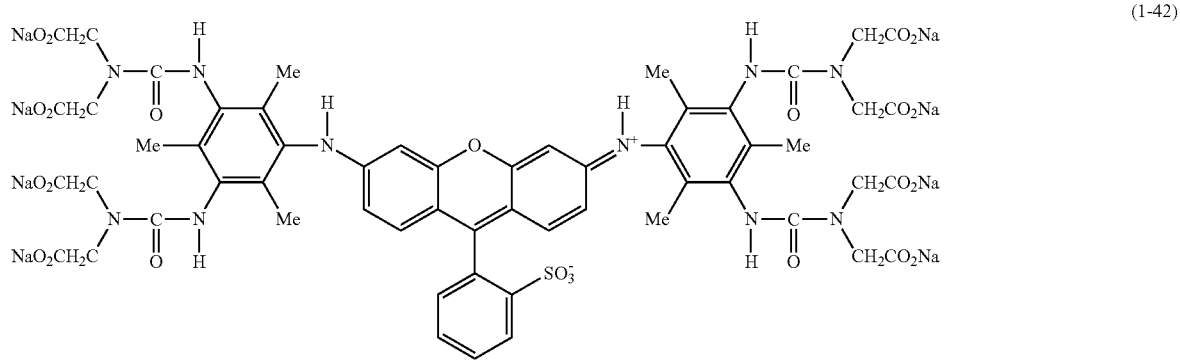
(1-42)

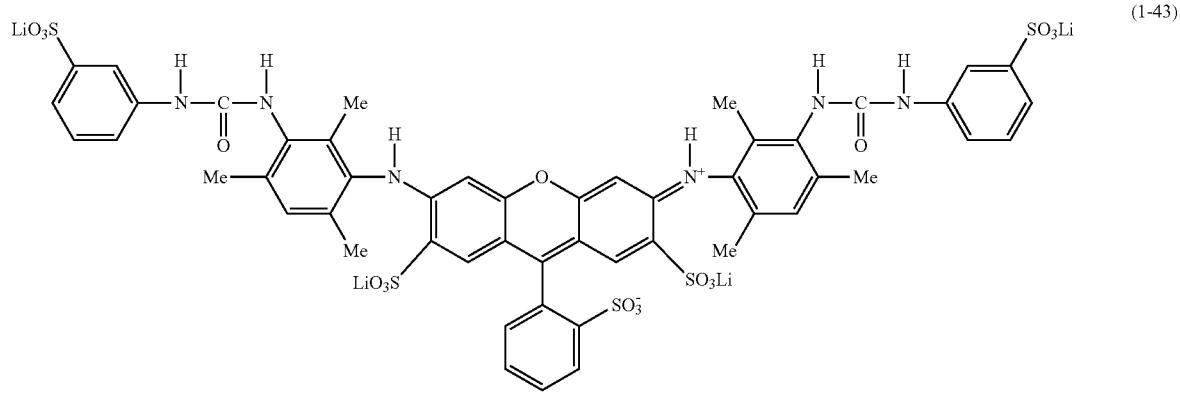
(1-43)
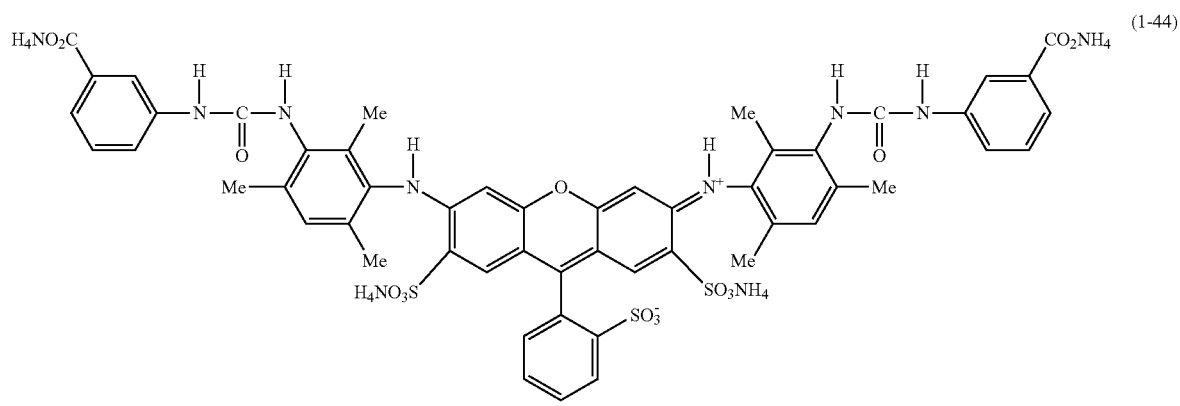
(1-44)
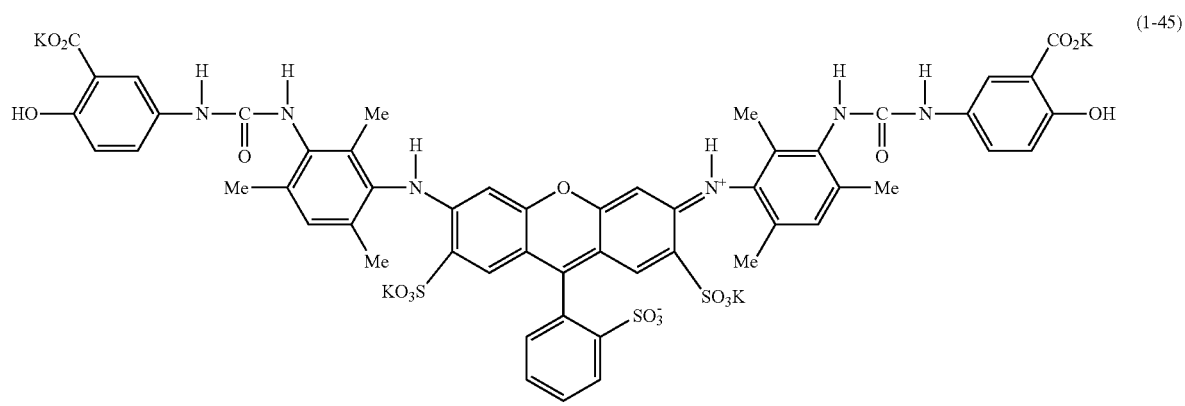
(1-45)
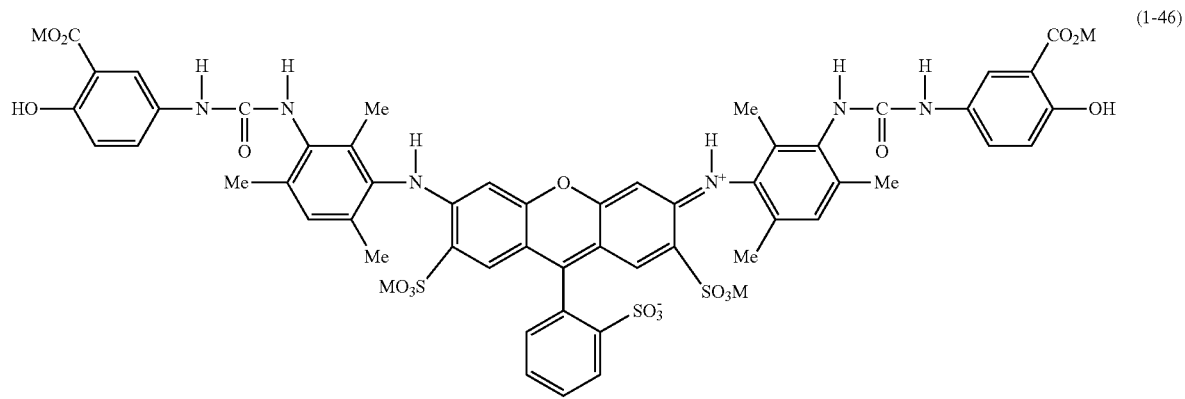
(1-46)
M:K/Na = 1/1

-continued
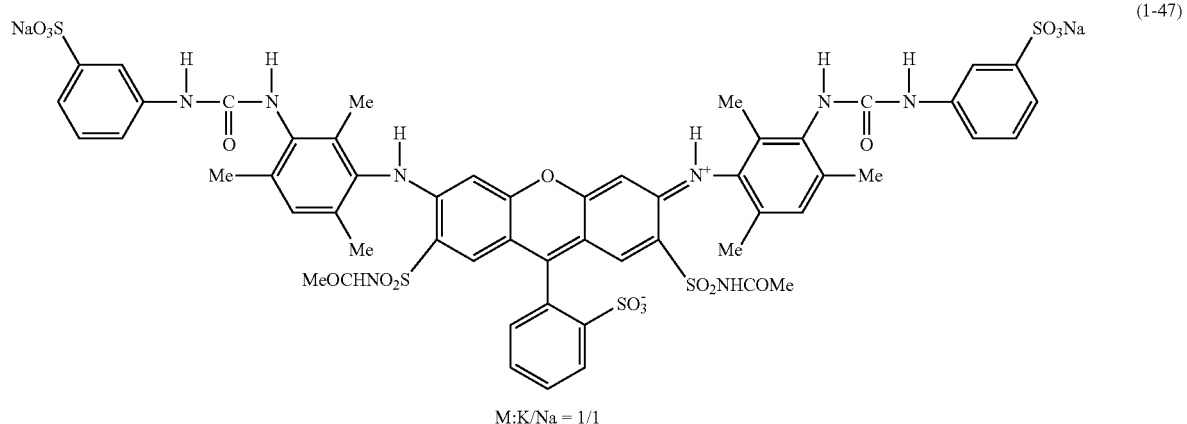
(1-47)
M:K/Na = 1/1
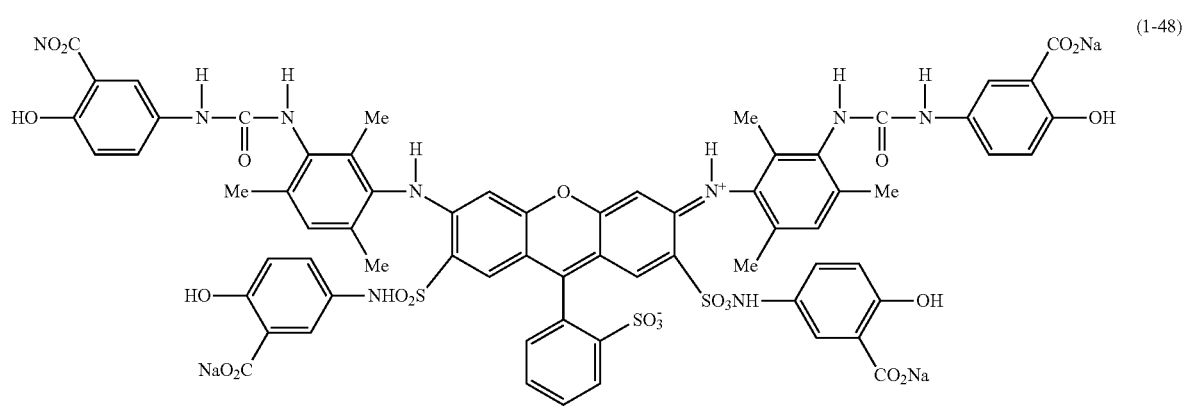
(1-48)
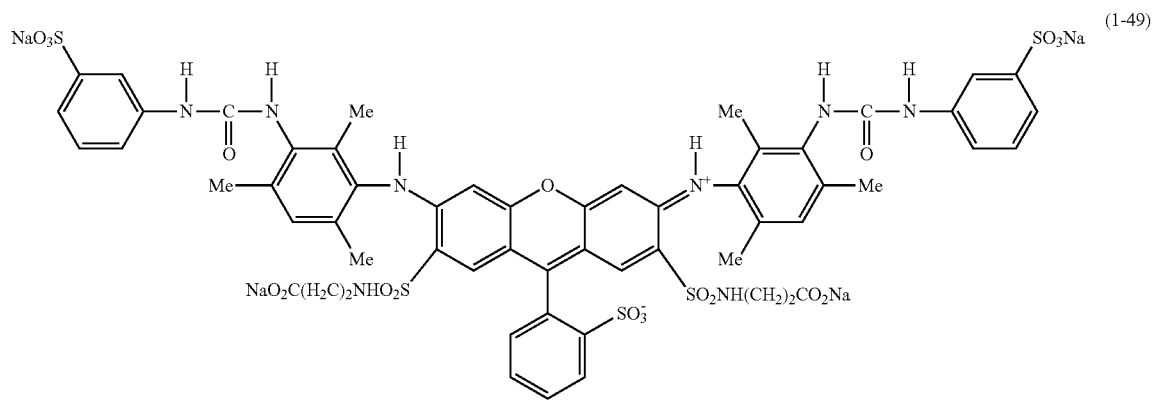
(1-49)
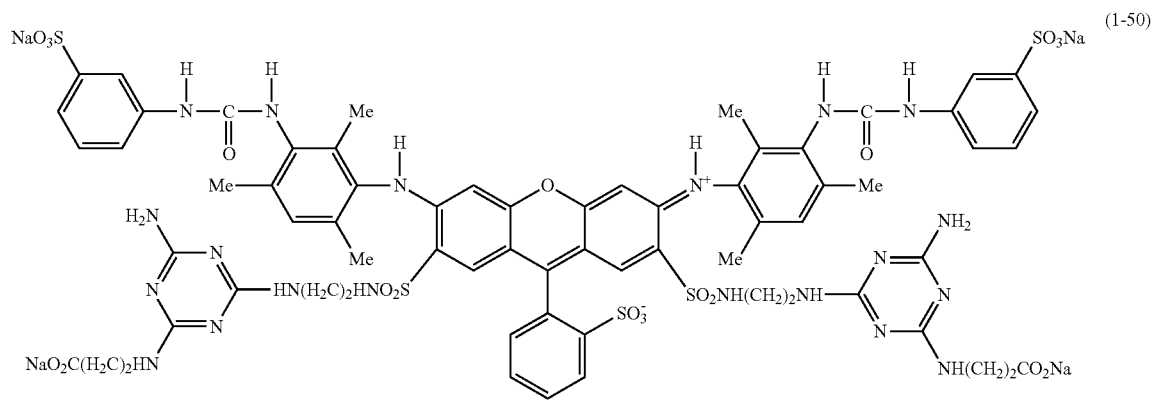
(1-50)

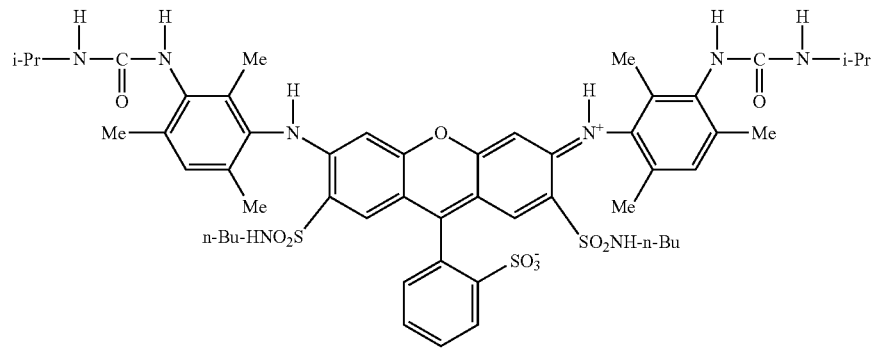
(1-51)
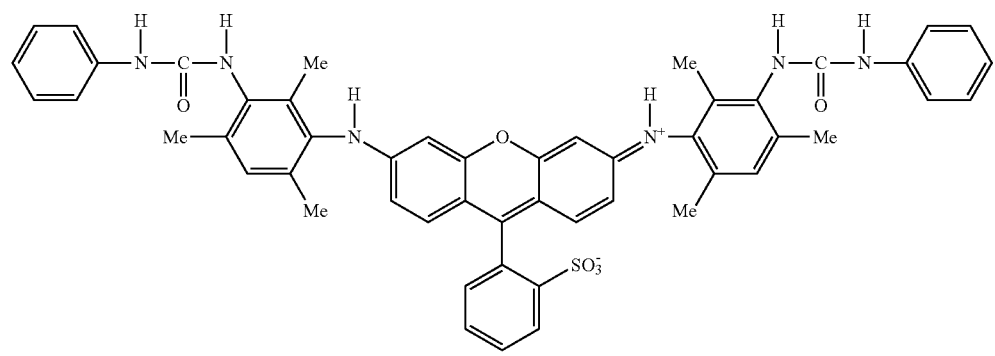
(1-52)
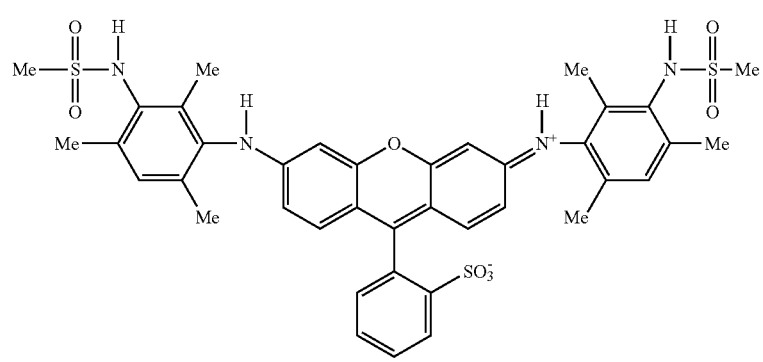
(1-53)
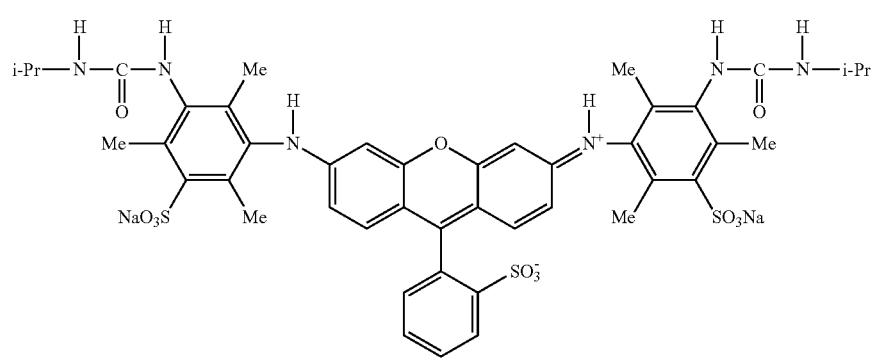
(1-54)

-continued

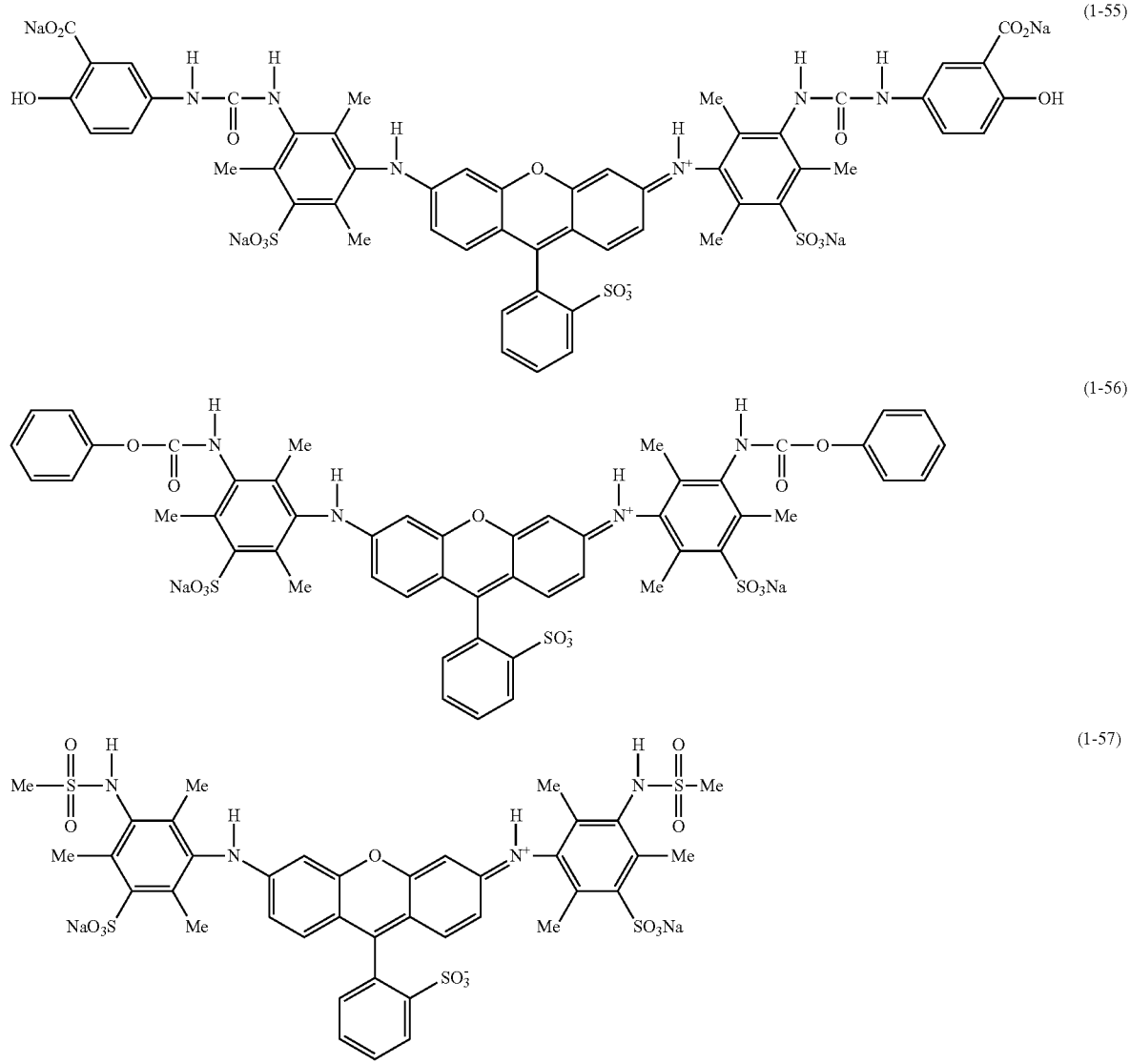

1.2. Dye B

An ink composition according to this embodiment contains dye B, having the width at half height of the largest peak in the absorption spectrum between 380 nm and 780 nm is 70 nm or more. Dye B, having the width at half height of the largest peak in the absorption spectrum between 380 nm and 780 nm is 70 nm or more, is good in dark tone reproduction (graininess) by virtue of the width at half height being 70 nm or more, although inferior to dye A in color strength and resistance to gases. Combining the dye B with dye A, described above, in appropriate amounts into an ink composition therefore leads to improved color strength, dark tone reproduction (graininess), and resistance to gases of the resulting record.

The amount of dye B in the ink composition according to this embodiment relative to the total mass of dyes (100% by mass) is 10% by mass or more, preferably 20% by mass or more, more preferably 30% by mass or more, and is 60% by mass or less, preferably 50% by mass or less, more preferably 40% by mass or less. By virtue of dye B present in such an amount, the resulting record is improved in color strength, dark tone reproduction, and resistance to gases.

Dye B in the ink composition according to this embodiment is preferably present in an amount of 0.2% by mass or more of the total mass of the ink composition, more preferably 0.6% by mass or more, even more preferably 1.2% by mass or more. Moreover, dye B in the ink composition according to this embodiment is preferably present in an amount of 3.0% by mass or less of the total mass of the ink composition, more preferably 2.4% by mass or less, even more preferably 1.8% by mass or less. When containing such an amount of dye B, the ink composition is good in the color strength, dark tone reproduction, and resistance to gases of recordings made therewith.

For dye B, the wavelength of highest absorbance of the largest peak is preferably between 500 nm and 600 nm. Using such a dye B in combination with dye A, described above, in certain proportions makes images the ink composition produces excellent in color strength, dark tone reproduction, and resistance to gases.

Preferably, at least one dye B in the ink composition according to this embodiment is one or more selected from anthrapyridone dyes, reactive dyes, and azo dyes. When at least one dye B is one or more selected from anthrapyridone dyes, reactive dyes, and azo dyes, the ink composition is good in color strength, dark tone reproduction, and resistance to gases.

Preferred anthrapyridone dyes having the width at half height of the largest peak in the absorption spectrum between 380 nm and 780 nm is 70 nm or more include the dyes represented by formula (M-1). When the ink composition according to this embodiment contains a dye of formula (M-1), the resulting image is better in dark tone reproduction and resistance to gases and also improves in moisture resistance.

Dye Represented by General Formula (M-1)

The following describes the dye of general formula (M-1) in detail. The dye of general formula (M-1) may be in the form of a salt.

include 4-sulfophenoxy, 2,4-disulfophenoxy, 4-carboxyphenoxy, and 3,5-dicarboxyphenoxy, more preferably 4-carboxyphenoxy and 3,5-dicarboxyphenoxy, even more preferably 3,5-dicarboxyphenoxy.

Examples of salts the compound represented by general formula (M-1) can form include ammonium salts and alkali metal salts.

The dye of general formula (M-1) is preferably present in an amount of 0.2% by mass or more of the total mass of the ink composition, more preferably 0.4% by mass or more, even more preferably 0.8% by mass or more. Moreover, the dye of general formula (M-1) is preferably present in an amount of 3.0% by mass or less of the total mass of the ink composition, more preferably 2.4% by mass or less, even more preferably 1.6% by mass or less. When the ink composition contains such an amount of dye of general formula (M-1), the image is good in color strength and resistance to gases.

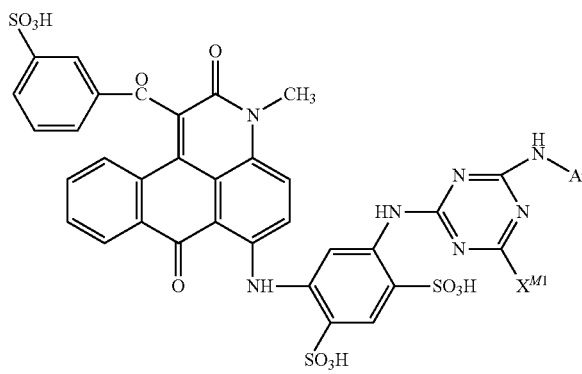
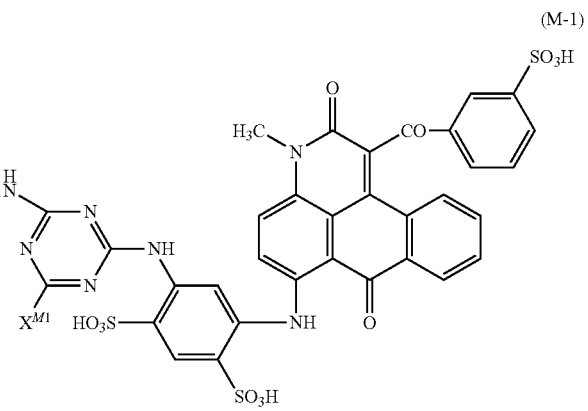

(M-1)

In general formula (M-1), $A^{M1}$ represents an alkylene group having 1 or 2 carbon atoms, alkylene group having 1 or 2 carbon atoms and containing phenylene, or group represented by general formula (M-1-1). $X^{M1}$ represents an amino group, hydroxy group, chlorine atom, or sulfo- or carboxy-substituted phenoxy group.

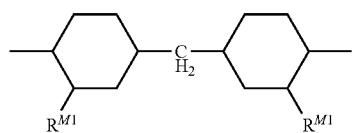

(M-1-1)

In general formula (M-1-1), $R^{M1}$ represents a hydrogen atom or alkyl group.

In general formula (M-1), $A^{M1}$ is preferably an alkylene group having 1 or 2 carbon atoms, more preferably an alkylene group having 2 carbon atoms.

In general formula (M-1), $X^{M1}$ represents an amino group, hydroxy group, chlorine atom, or sulfo- or carboxy-substituted phenoxy group. It is particularly preferred that $X^{M1}$ be a sulfo- or carboxy-substituted phenoxy group, more preferably a carboxy-substituted phenoxy group. Carboxy-substituted phenoxy groups are highly effective in improving moisture resistance, and those substituted with two carboxy groups are particularly preferred because of their higher resistance to moisture.

Specific examples of sulfo- or carboxy-substituted phenoxy groups that $X^{M1}$ can be in general formula (M-1)

Dye Represented by General Formula (M-2)

Preferred azo dyes having the width at half height of the largest peak in the absorption spectrum between 380 nm and 780 nm is 70 nm or more include the dyes represented by general formula (M-2). When the ink composition according to this embodiment contains a dye of general formula (M-2), the resulting image is better in dark tone reproduction and resistance to gases.

The dye of general formula (M-2) may be in the form of a salt.

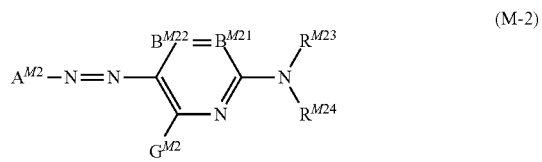

(M-2)

In general formula (M-2), $A^{M2}$ represents a five-membered heterocyclic group;

for $B^{M21}$ and $B^{M22}$, one of the following holds: each represents $-CR^{M21}=$ or $-CR^{M22}=$; or one represents a nitrogen atom, and the other represents $-CR^{M21}=$ or $-CR^{M22}=$;

$R^{M23}$ and $R^{M24}$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group, or sulfamoyl group and may have a substituent;

$G^{M2}$, $R^{M21}$, and $R^{M22}$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkyl-, aryl-, or heterocyclic-substituted amino group, acylamino group, ureido group, sulfamoylamino group, alkoxycarbonylamino group, aryloxycarbonylamino group, alkyl- or aryl-sulfonylamino group, aryloxycarbonylamino group, nitro group, alkyl- or aryl-thio group, alkyl- or aryl-sulfonyl group, alkyl- or aryl-sulfinyl group, sulfamoyl group, sulfo group, or heterocyclic thio group and may have a substituent; and there may be a five- or six-membered ring formed by the binding of $R^{M21}$ with $R^{M23}$ or $R^{M23}$ with $R^{M24}$.

Examples of five-membered heterocyclic groups suitable for use in general formula (M-2) include pyrazole, imidazole, thiazole, isothiazole, thiadiazole, benzothiazole, benzoxazole, and benzisothiazole rings. Substituted heterocyclic rings may also be used. Pyrazole is a particularly preferred heterocyclic ring.

$R^{M21}$ in general formula (M-2) is preferably a hydrogen atom or alkyl group, more preferably a hydrogen atom.

$R^{M22}$ in general formula (M-2) is preferably an aliphatic group, more preferably methyl, ethyl, propyl, optionally branched, or butyl, optionally branched.

$R^{M23}$ and $R^{M24}$ in general formula (M-2) each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group, or sulfamoyl group. $R^{M23}$ and $R^{M24}$ may have a substituent.

$R^{M23}$ in general formula (M-2) is preferably an aromatic group. Specific examples include benzene and naphthalene rings. $R^{M24}$ is preferably a heterocyclic group. A specific example is a benzothiazole ring.

$G^{M2}$, $R^{M21}$, and $R^{M23}$ in general formula (M-2) each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkyl-, aryl-, or heterocyclic-substituted amino group, acylamino group, ureido group, sulfamoylamino group, alkoxycarbonylamino group, aryloxycarbonylamino group, alkyl- or aryl-sulfonylamino group, aryloxycarbonylamino group, nitro group, alkyl- or aryl-thio group, alkyl- or aryl-sulfonyl group, alkyl- or aryl-sulfinyl group, sulfamoyl group, sulfo group, or heterocyclic thio group. $R^{M23}$ and $R^{M24}$ may have a substituent. There may be a five- or six-membered ring formed by the binding of $R^{M21}$ with $R^{M23}$ or $R^{M23}$ with $R^{M24}$.

Among the dyes represented by general formula (M-2), the compounds of general formula (M-21) are particularly preferred.

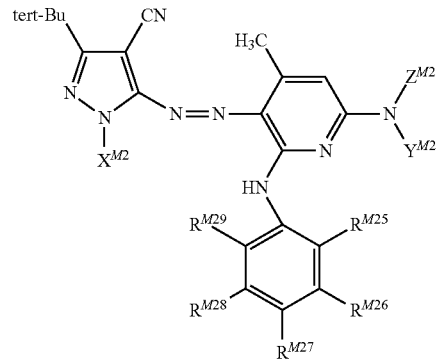

In general formula (M-21), $R^{M25}$, $R^{M26}$, $R^{M27}$, $R^{M28}$, and $R^{M29}$ represent a hydrogen atom, alkyl group, sulfo group, or salt thereof. When both $R^{M25}$ and $R^{M29}$ in general formula (M-21) are alkyl, the alkyl groups are constituted by a total of three or more carbon atoms and may have a substituent. $X^{M2}$ represents a hydrogen atom, aliphatic group, aromatic group, or heterocyclic group, and $Y^{M2}$ and $Z^{M2}$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group, or sulfamoyl group. Each of $X^{M2}$, $Y^{M2}$, and $Z^{M2}$ may have a substituent. Any sulfo group in $R^{M25}$ to $R^{M29}$ is in the form of —$SO_3M$. M is preferably an alkali metal, more preferably at least one of Li and Na.

It is particularly preferred, in general formula (M-21), that $X^{M2}$ be an aromatic, alicyclic, or heterocyclic group. Specific examples include benzene, cyclopentane, cyclohexane, cycloheptane, cyclooctane, cyclohexene, pyridine, pyrimidine, pyrazine, pyridazine, triazine, imidazole, benzimidazole, oxazole, benzoxazole, thiazole, benzothiazole, oxane, sulfolane, and thian rings. Of these, the heterocyclic rings are more preferred to the others.

As for $Y^{M2}$ and $Z^{M2}$ in general formula (M-21), specific examples of preferred groups are the same as for $R^{M23}$ and $R^{M24}$ in the dye (M-2).

Among the compounds represented by general formula (M-21), the compounds of general formula (M-22) are particularly preferred because of their superior color strength and resistance to gases.

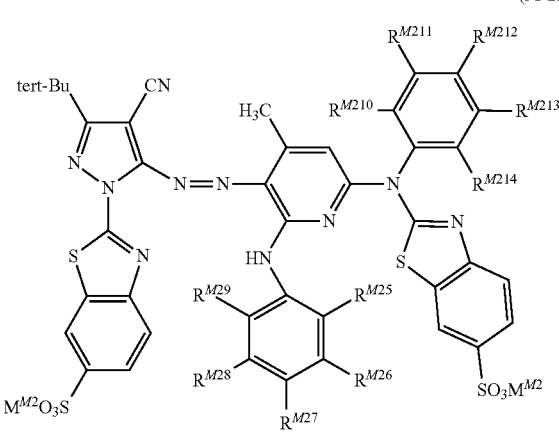

In general formula (M-22), $R^{M25}$, $R^{M26}$, $R^{M27}$, $R^{M28}$, $R^{M29}$, $R^{M210}$, $R^{M211}$, $R^{M212}$, $R^{M213}$, $R^{M214}$ represent a hydrogen atom, alkyl group, sulfo group, or salt thereof. $M^{M2}$ represents a hydrogen or alkali metal atom. When both $R^{M25}$ and $R^{M29}$ are alkyl groups, the alkyl groups are constituted by a total of three or more carbon atoms and may have a substituent. When both $R^{M210}$ and $R^{M214}$ are alkyl groups, the alkyl groups are constituted by a total of three or more carbon atoms and may have a substituent.

dyes in such a ratio, the ink composition combines high levels of resistance to moisture and gases.

For reactive dyes having the width at half height of the largest peak in the absorption spectrum between 380 nm and 780 nm is 70 nm or more, an example is C.I. Reactive Red 141, represented by general formula (M-3). When containing the dye of general formula (M-3), the ink composition according to this embodiment improves in dark tone reproduction.

(M-3)

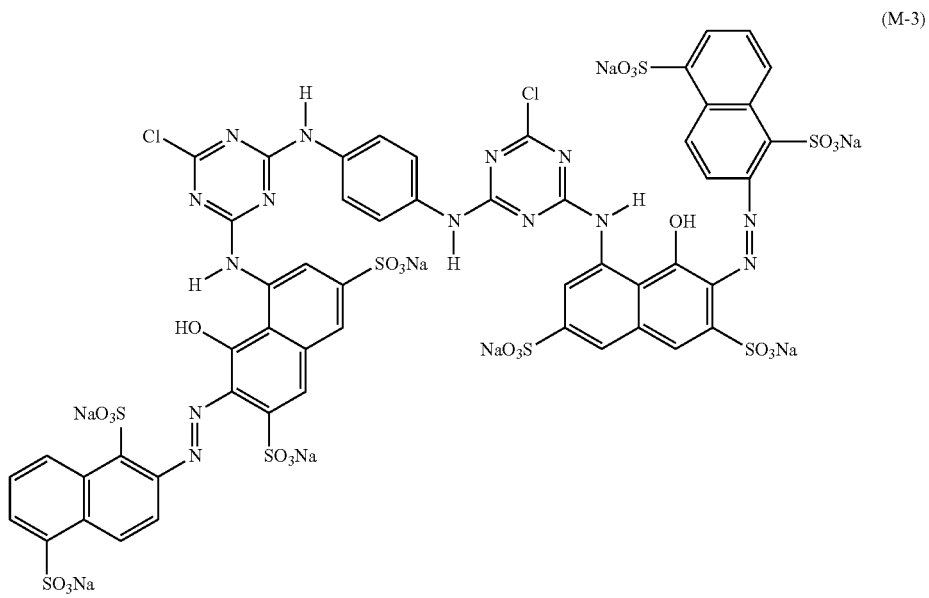

Among the compounds represented by general formula (M-22), the compound of general formula (M-23) is particularly preferred.

(M-23)

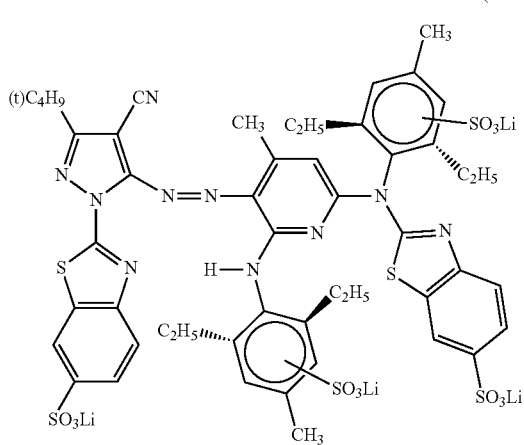

When an ink composition according to this embodiment contains a dye represented by general formula (M-1) in combination with a dye represented by general formula (M-2), the ratio of the dye of formula (M-1) to that of formula (M-2) is preferably between 1:2 and 15:1, more preferably between 5:1 and 13:1. When containing the two The ink composition according to this embodiment may contain other dyes for the adjustment of its color and other characteristics unless its characteristics, primarily color strength, dark tone reproduction, and resistance to gases, are impaired greatly.

Measurement of the Absorption Spectrum and Width at Half Height for Dyes A and B The absorption spectrum and width at half height for dyes A and B used in the ink composition according to this embodiment can be measured using an ultraviolet-visible spectrophotometer, for example under the conditions given below.

First, the sample to be measured is prepared by dissolving the analyte dye with ultrapure water, in a measuring flask and using a micropippete, to a concentration of 100 ppm (wt/vol) on a solid basis. Then, the resulting sample is measured under the following conditions.

Instrument: V-770 ultraviolet-visible spectrophotometer (Jasco Corporation)
Parameter file
Photometric mode: Abs
Measurement range: 800 to 300 nm
Data interval: 0.5 nm
UV/Vis bandwidth: 2.0 nm
NIR bandwidth: 8.0 nm
UV/Vis response: 0.06 sec
NIR response: 0.06 sec
Scanning speed: 400 nm/min
Light-source change: 340 nm
Diffraction-grating change: 850 nm
Light sources: D2/WI Filter change: Stepwise
Correction: Baseline
FIGS. 1 and 2 present absorption spectra of dyes measured under the above conditions.

FIG. 1 is an absorption spectrum of the compound of general formula (1-20) (100 ppm on a solid basis). In FIG. 1, the vertical axis represents absorbance (Abs), and the horizontal axis represents wavelength λ (nm). The spectrum 1-20 is the absorption spectrum of the compound of general formula (1-20), and arrow Pmax indicates the apex of the peak of the absorption spectrum of the compound of general formula (1-20). The wavelength at which the peak has its apex, or the wavelength of absorption maximum (λmax) is 533 nm, and the absorbance (Abs) at the wavelength of absorption maximum (λmax) is 7.01. The width at half height of the largest peak of the absorption spectrum for the compound of general formula (1-20) is therefore the width (nm) of the peak at the height half the highest absorbance of 7.01 from the baseline horizontal line B at the wavelength of absorption maximum (λmax) of 533 nm. The width at half height in this case is 39.0 nm, smaller than 50 nm.

Figure 2:
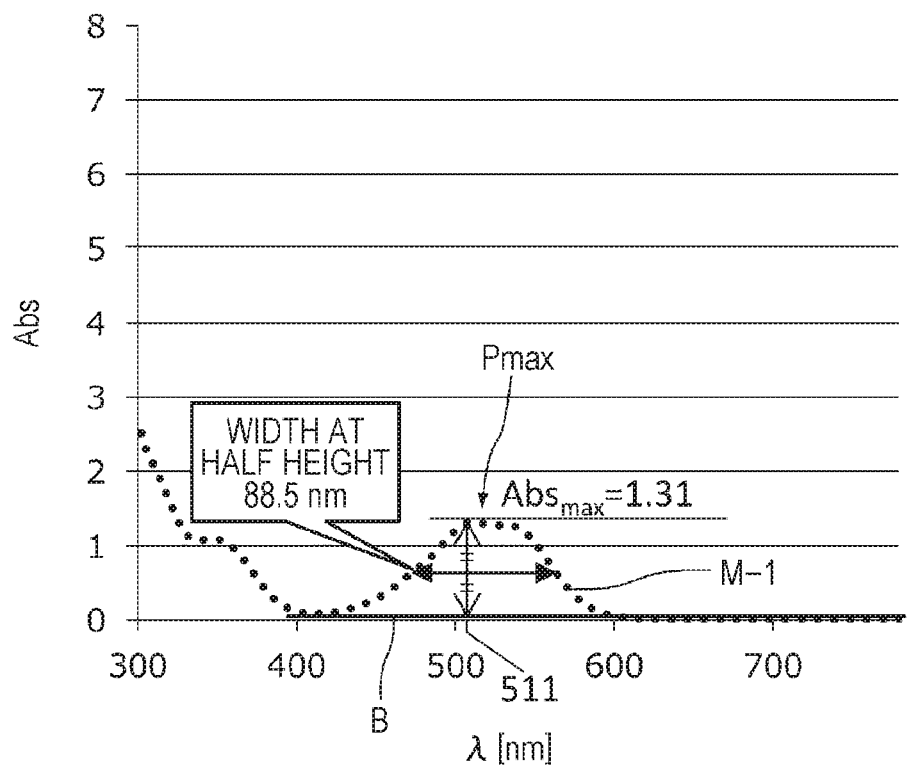
FIG. 2 is an absorption spectrum of a compound of general formula (M-1) (100 ppm on a solid basis).

FIG. 2 is an absorption spectrum of a compound of general formula (M-1) (100 ppm on a solid basis). The same calculations as in FIG. 1 give a wavelength of absorption maximum (λmax) of 511 nm and an absorbance (Abs) at the wavelength of absorption maximum (λmax) of 1.31. The width at half height of the largest peak of the absorption spectrum for the compound of general formula (M-1) is therefore the width (nm) of the peak at the height half of the highest absorbance of 1.31 from the baseline horizontal line B at the wavelength of absorption maximum (λmax) of 511 nm. The width at half height in this case is 88.5 nm, larger than 70 nm.

Although not illustrated, the width at half height of the largest peak of the absorption spectrum between 380 nm and 780 nm for the compound of general formula (M-23) is 87.0 nm, and the width at half height for the compound of general formula (M-3) is 85.5 nm, both larger than 70 nm.

Identification of Dyes A and B

Dyes A and B in the ink composition can be identified by determining the retention time of the corresponding peaks in high-performance liquid chromatography (HPLC) and obtaining the absorbance and wavelength of absorption for each peak.

The conditions of the HPLC-based identification can be, for example, as follows. First, the sample to be measured is prepared by diluting the ink composition with methanol by a factor of approximately 1000. The sample is then analyzed by HPLC under the following conditions, and the retention time of the peaks and the absorbance and wavelength of absorption for each peak are measured using a photodiode array detector (PDA). The concentrations of the dyes are then calculated from the areas of the HPLC peaks using a calibration curve prepared beforehand. Subsequently, the width at half height of each peak is determined from an absorption spectrum scaled a concentration of 100 ppm (wt/vol).

HPLC Conditions
   Instrument: Waters ACQUITY UPLC SYSTEM (Waters)
   Column: An ODS column (ACQUITY UPLC BEH C18 1.7 μm)
   Mobile-phase composition:
   Solvent A: Ultrapure water (commercial product, LC-MS grade)
   Solvent B: Acetonitrile (HPLC grade)
   Solvent C: Acetonitrile (HPLC grade)
   Solvent D: A 100-mM aqueous solution of ammonium bicarbonate
   Mobile-phase gradient: Table 1
   Flow rate: 0.1 mL/min
   Injection volume: 1.0 μL
   Temperature: 40° C.
   Detector: PDA (210 nm to 800 nm)
   Retention time and wavelength of height absorbance of each dye: Table 2

TABLE 1

|  | Solvent A | Solvent B | Solvent C | Solvent D |
|---|---|---|---|---|
| Initial | 94% | 0% | 1% | 5% |
| 8 min | 40% | 0% | 55% | 5% |
| 10 min | 1% | 0% | 94% | 5% |
| 12 min | 94% | 0% | 1% | 5% |

TABLE 2

<Measurements>

| | HPLC | | | Measurements scaled to a concentration of 100 ppm | |
|---|---|---|---|---|---|
| Dye | Retention time | Wavelength of highest absorbance | ABS_max | λmax [nm] | Width at half height [nm] |
| 1-20 | 2.5 to 4.5 min | 533 ± 10 nm | 7.01 | 533 | 39.0 |
| M-23 | 7.0 to 9.0 min | 555 ± 10 nm | 3.41 | 555 | 87.0 |
| M-1 | 1.5 to 3.5 min | 511 ± 10 nm | 1.31 | 511 | 88.5 |
| M-3 | 1.0 to 3.0 min | 544 ± 10 nm | 4.41 | 544 | 85.5 |

By measuring the ink composition under the above conditions, dyes A and B in the ink composition can be identified with their concentrations.

1.3. Water-Soluble Organic Solvent

An ink composition according to this embodiment may contain a water-soluble organic solvent. The water-soluble organic solvent is preferably, but not limited to, a volatile one.

Examples of water-soluble organic solvents include alcohols and glycols, such as alkylbetaines, glycerol, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol monoisopropyl ether, diethylene glycol monoisopropyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol monoisopropyl ether, propylene glycol mono-n-butyl ether, dipropylene glycol mono-n-butyl ether, dipropylene glycol mono-n-propyl ether, dipropylene glycol monoisopropyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, isopropyl alcohol, n-butanol, 2-butanol, tert-butanol, isobutanol, n-pentanol, 2-pentanol, 3-pentanol, and tert-pentanol; N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, and 1,1,3,3-tetramethylurea.

One of these water-soluble organic solvents may be used alone, or two or more may be used in combination. The amount of water-soluble organic solvent is not critical and can be determined as desired. For example, when the manufacturer seeks to make the ink good in penetration into the recording medium, moisture retention, and stability during continuous printing, preferred solvents are alkylbetaines, glycerol, triethylene glycol, triethylene glycol monobutyl ether, and triethanolamine.

Examples of alkylbetaines include the compound of general formula (B-1) and their salts.

$$(R)p\text{-}N\text{-}[L\text{-}(COOM)q]r \quad (B\text{-}1)$$

In general formula (B-1), R represents a hydrogen atom, alkyl group, aryl group, or heterocyclic group. L represents a linking group having a valency of two or more. M represents a hydrogen atom, alkali metal atom, ammonium group, protonated organic amine or nitrogen-containing heterocyclic group, or quaternary ammonium ion or, when serving as a counterion for an ammonium ion including the N atom in general formula (B-1), a group that cannot exist as a cation. q denotes an integer of 1 or more, and r denotes an integer of 1 or more and 4 or less. p denotes an integer of 0 or more and 4 or less, with p+r being 3 or 4. When p+r is 4, the nitrogen atom N is part of a quaternary amine. When p is two or more, the Rs may be the same or different. When q is two or more, the COOMs may be the same or different. When r is two or more, the L-(COOM)qs may be the same or different.

When an alkylbetaine is used, it is preferred to employ a compound represented by general formula (B-2) or (B-3), more preferably the compound of general formula (B-3). The use of such a compound helps improve the fixation of the ink composition on the recording medium. One compound represented by general formula (B-2) or (B-3) may be used alone, or two or more may be used as a mixture.

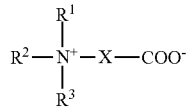

In general formula (B-2), $R^1$ to $R^3$ represent an alkyl group having 1 to 20 carbon atoms, and X represents a linking group having a valency of two or more. $R^1$ and $R^3$ in general formula (B-2) have no relation to $R^1$, $R^2$, and R in general formula (1).

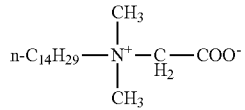

The alkylbetaine is preferably present in an amount of 0.1% by mass or more of the total mass of the ink, more preferably 0.5% by mass or more, even more preferably 1.0% by mass or more. Moreover, the alkylbetaine is preferably present in an amount of 5.0% by mass or less of the total mass of the ink, more preferably 4.0% by mass or less, even more preferably 3.0% by mass or less. When an alkylbetaine is present in such an amount, the ink composition improves in stability during continuous printing owing to controlled precipitation at the gas-liquid interface, and the resulting print also improves in the fastness of the image, such as resistance to moisture.

The total amount of water-soluble organic solvents is preferably 5% by mass or more and 25% by mass or less, more preferably 7.5% by mass or more and 20% by mass or less, even more preferably 10% by mass or more and 15% by mass or less, of the total mass of the ink.

1.4. Surfactant

The ink composition according to this embodiment preferably contains a surfactant. A surfactant contained in the ink composition according to this embodiment serves to control the dynamic surface tension and wettability of the ink, thereby helping improve the ejection stability of the ink Preferred surfactants include, but are not limited to, acetylene glycol surfactants, such as those having an HLB of 4 or less, alkylene oxide adducts of acetylene glycols having 12 or more backbone carbon atoms, and acetylene glycols having 10 or more backbone carbon atoms.

Acetylene Glycol Surfactant Having an HLB of 4 or Less

The ink composition according to this embodiment preferably contains, as a surfactant, an acetylene glycol surfactant having an HLB of 4 or less. Highly hydrophobic and having antifoaming properties, the acetylene glycol surfactant having an HLB of 4 or less (hereinafter also referred to as "acetylene glycol A") serves to control the dynamic surface tension and wettability of the ink, thereby helping improve the ejection stability of the ink.

The HLB (Hydrophile-Lipophile Balance) of a surfactant herein is a value calculated by the Griffin method. Specifically, the HLB of a surfactant can be determined according to Equation (H).

$$HLB = 20 \times (\% \text{ by mass of hydrophilic groups}) \quad (H)$$

Examples of acetylene glycols A include, but are not limited to, 2,5,8,11-tetramethyl-6-dodecin-5,8-diol. Examples of commercially available acetylene glycols A include Air Products Japan K.K. Surfynol 104S (HLB, 4), Surfynol 104PG50 (HLB, 4), Surfynol 420 (HLB, 4), Surfynol 82 (HLB, 4), Surfynol DF110D (HLB, 3), and Surfynol MD-20 (HLB, 4). These surfactants may be used alone or as combinations of two or more.

Acetylene glycol A is preferably present in an amount of 0.050% by mass or more and 1.0% by mass or less of the total mass of the ink, more preferably 0.075% by mass or more and 0.50% by mass or less, even more preferably 0.10% by mass or more and 0.30% by mass or less. When containing 0.050% by mass or more acetylene glycol A, the ink composition tends to be even easier to load by virtue of increased wettability on hydrophobic surfaces. When containing 0.30% by mass or less acetylene glycol A, the ink composition is even more stable as a solution.

Alkylene Oxide Adduct of an Acetylene Glycol Having 12 or More Backbone Carbon Atoms The ink composition according to this embodiment preferably contains, as a surfactant, an alkylene oxide adduct of an acetylene glycol having 12 or more backbone carbon atoms. When containing an alkylene oxide adduct of an acetylene glycol having 12 or more backbone carbon atoms, the ink composition according to this embodiment improves in ease of initial loading. The use of such a surfactant also provides further improved quality of the resulting image by controlling color reproduction and bleed.

The alkylene oxide adduct of an acetylene glycol having 12 or more backbone carbon atoms (hereinafter also referred to as "acetylene glycol B"), and also the acetylene glycol having 10 or more backbone carbon atoms discussed hereinafter, are acetylene glycol surfactants (nonionic surfactants). Since a nonionic surfactant acts to spread ink uniformly on a recording medium, ink jet recording using an ink containing a nonionic surfactant produces a relatively high-definition image with little bleed. The term "backbone" as used herein refers to the main chain or backbone according to the IUPAC nomenclature.

In particular, acetylene glycol B has 12 or more backbone carbon atoms and this makes it superior in wettability on polymer components, such as rubber or plastic ones, of an ink channel and on ink contaminants, which can cause the ink to foam. The use of acetylene glycol B therefore helps prevent bubbles that emerge in the ink from being left on the surfaces of the polymer components of the channel from an ink tank to the printhead. The ink composition in this case is therefore good in ease of initial loading, and also in stability during continuous printing owing to missing dots being prevented, whether caused by the growth of residual bubbles or the detachment of bubbles from channel surfaces. Moreover, alkylene glycol B is highly soluble in the ink composition because of its being an alkylene oxide adduct.

Acetylene glycol B preferably has an HLB of 4 or more and 15 or less, more preferably 8 or more and 15 or less. This further improves the aforementioned wettability. This HLB is also that defined by the Griffin method.

Examples of acetylene glycols B include, but are not limited to, the compounds represented by general formula (A-1).

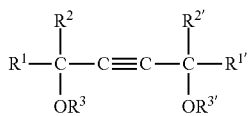

(A-1)

In general formula (A-1), $R^1$, $R^{1\prime}$, $R^2$, and $R^{2\prime}$ independently represent an alkyl group having 1 to 5 carbon atoms, and the number of backbone carbon atoms is 12 or more. —$OR^3$ represents —OH or —$O(C_2H_4O)_mH$, and —$OR^{3\prime}$ represents —OH or —$O(C_2H_4O)_nH$. m and n are independently between 0.5 and 25 and can be decimals, and m+n is between 1 and 40 and can be a decimal (excluding the case in which both —$OR^3$ and —$OR^{3\prime}$ are —OH. $R^1$ and $R^2$ in the general formula (A-1) have no relation to $R^1$ and $R^2$ in general formulae (1) and (B-2).

Specific examples of acetylene glycols B include, but are not limited to, ethoxylated 2,5,8,11-tetramethyl-6-dodecin-5,8-diol and ethoxylated 5,8-dimethyl-6-dodecin-5,8-diol. Among the alkylene oxide adducts of acetylene glycols discussed in this section, ethylene oxide adducts and propylene oxide adducts of acetylene glycols are particularly preferred, and ethylene oxide adducts of acetylene glycols are more preferred.

The number of moles of the alkylene oxide units in the acetylene glycol is preferably 1 mole or more and 20 moles or less in each of $R^3$ and $R^{3\prime}$. The total number of moles of the added units ($R^3$ and $R^{3\prime}$ combined) is preferably 2 moles or more and 40 moles or less. When the total number of moles of the added alkylene oxide is 40 moles or less, the ink easily penetrates into recording media by virtue of reduced static and dynamic surface tensions.

Examples of commercially available acetylene glycols B include, but are not limited to, OLFINE EXP4300 (trade name, Nissin Chemical Industry Co., Ltd.; C12-ethylene oxide adduct).

One acetylene glycol B may be used alone, or two or more may be used in combination.

Acetylene glycol B is preferably present in an amount of 0.050% by mass or more and 1.0% by mass or less of the total mass of the ink, more preferably 0.075% by mass or more and 0.50% by mass or less, even more preferably 0.10% by mass or more and 0.30% by mass or less. When containing 0.050% by mass or more acetylene glycol B, the ink composition tends to be even easier to load by virtue of increased wettability on hydrophobic surfaces. When containing 0.30% by mass or less acetylene glycol B, the ink composition is even more stable as a solution.

Acetylene Glycol Having 10 or More Backbone Carbon Atoms

The ink composition according to this embodiment preferably contains an acetylene glycol having 10 or more backbone carbon atoms. Good in antifoaming properties, the acetylene glycol having 10 or more backbone carbon atoms (hereinafter also referred to as "acetylene glycol C") is effective in breaking foam formed during the introduction of ink, for example into an ink container. With this nature, acetylene glycol C improves the ease of initial loading and stability during continuous printing of the ink composition.

Acetylene glycol C preferably has an HLB of 7 or less, more preferably 5 or less, even more preferably 4 or less. This ensures good antifoaming properties. As for the lower limit, it is preferred that the HLB be 3 or more. When having such an HLB, acetylene glycol C tends to be better in antifoaming properties.

Specific examples of acetylene glycols C include, but are not limited to, the acetylene glycols represented by general formula (A-2).

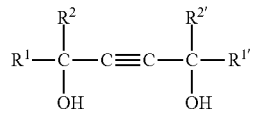

(A-2)

In general formula (A-2), $R^1$, $R^{1\prime}$, $R^2$, and $R^{2\prime}$ independently represent an alkyl group having 1 to 5 carbon atoms, and the number of backbone carbon atoms is 10 or more. $R^1$, $R^{1\prime}$, $R^2$, and $R^{2\prime}$ in the general formula (A-2) have no relation to $R^1$, $R^{1\prime}$, $R^2$, and $R^{2\prime}$ in general formulae (1), (B-2), and (A-1).

Specific examples of preferred acetylene glycols C include, but are not limited to, 2,5,8,11-tetramethyl-6-dodecin-5,8-diol, 5,8-dimethyl-6-dodecin-5,8-diol, 2,4,7,9-tetramethyl-5-decin-4,7-diol, and 4,7-dimethyl-5-decin-4,7-diol.

Examples of commercially available acetylene glycols C include, but are not limited to, Surfynol 104PG50 (2,4,7,9-tetramethyl-5-decin-4,7-diol) and Surfynol DF110D (2,5,8,11-tetramethyl-6-dodecin-5,8-diol) (trade names, Air Products).

One acetylene glycol C may be used alone, or two or more may be used in combination. Acetylene glycol C is preferably present in an amount of 0.050% by mass or more and 1.0% by mass or less of the total mass of the ink, more preferably 0.075% by mass or more and 0.50% by mass or less, even more preferably 0.10% by mass or more and 0.30% by mass or less. When containing 0.050% by mass or more acetylene glycol C, the ink composition is less likely to foam and even better in ease of loading. When containing 0.30% by mass or less acetylene glycol C, the ink composition is even more stable as a solution.

The total amount of acetylene glycol C and the aforementioned acetylene glycols A and B (hereinafter also collectively referred to as "acetylene glycol compounds") is preferably 0.1% by mass or more and 1.0% by mass or less of the total mass of the ink, more preferably 0.3% by mass or more and 0.8% by mass or less, even more preferably 0.4% by mass or more and 0.7% by mass or less. Such an amount of acetylene glycols A to C dissolves well in the ink and therefore is unlikely to cause aggregation upon being mixed into the ink.

Regarding the ratio by mass of the amount of acetylene glycol C to that of acetylene glycol B, it is preferred that with the amount of the alkylene oxide adduct defined as 1, the amount of the acetylene glycol having 10 or more backbone carbon atoms be 0.5 or more and 2.5 or less, more preferably 0.5 or more and 2.0 or less, even more preferably 0.5 or more and 1.5 or less. When containing these types of surfactants in such a mass ratio, the ink composition is even better in ease of initial loading and stability during continuous printing.

Polyoxyalkylene Alkyl Ether

The ink composition according to this embodiment, when containing acetylene glycol B, preferably contains a polyoxyalkylene alkyl ether. The polyoxyalkylene alkyl ether makes the acetylene glycol B even more soluble and dispersible, thereby improving the ease of initial loading of the ink composition, with little impact on the low dynamic surface tension of acetylene glycol B.

A continuous ink supply system (CISS), described hereinafter, usually incorporates ink channels and ink tanks made of a hydrophobic material. For an ink composition for use with a continuous ink supply system, therefore, it is advantageous to use a relatively hydrophobic surfactant. A surfactant useful from this point of view is acetylene glycol B, but to improve the stability as a solution, ease of initial loading, and stability during continuous printing of the ink composition while securing the advantages of acetylene glycol B, it is preferred that the ink contain a polyoxyalkylene alkyl ether, particularly when the ink composition according to this embodiment is used with a recording apparatus equipped with a continuous ink supply system (CISS).

The term "ink supply system" herein refers to one that includes an ink container (ink tank) having an air inlet, a printhead having a nozzle through which the liquid in the ink container is sent out, and an ink supply path that connects the ink container and printhead together and supplies the liquid to the printhead.

The term "ink channel" refers to a channel created in an ink jet recording apparatus for ink to flow through. Examples of ink channels include an ink supply path for supplying ink from an ink container storing the ink to an ink jet recording head and a channel created in an ink jet recording head for ink to flow through to the opening of a nozzle.

The polyoxyalkylene alkyl ether preferably has an HLB of 11 or more and 16 or less, more preferably 12 or more and 15 or less. When the polyoxyalkylene alkyl ether has such an HLB, the ink composition tends to be even better in ease of initial loading and stability during continuous printing.

Examples of polyoxyalkylene alkyl ethers include, but are not limited to, the compounds represented by formula (2). The use of such a polyoxyalkylene alkyl ether tends to make the ink composition even better in storage stability and stability during continuous printing.

$$R^6O(C_2H_4O)_w(C_3H_6O)_x(C_2H_4O)_y(C_3H_6O)_zH \quad (2)$$

In formula (2), $R^6$ represents an alkyl group having 1 to 20 carbon atoms, preferably an alkyl group having 5 to 15 carbon atoms, more preferably an alkyl group having 10 to 15 carbon atoms. w is a value between 1 and 20, and x, y, and z are independently 0 or a value between 1 and 20. w, x, y, and z satisfy $5 \leq w+x+y+z \leq 30$, preferably $5 \leq w+x+y+z \leq 25$. The use of such a polyoxyalkylene alkyl ether tends to make the ink composition even better in storage stability and stability during continuous printing.

Specific examples of polyoxyalkylene alkyl ethers include, but are not limited to:

$C_{12}H_{25}O(C_2H_4O)_6(C_3H_6O)_2(C_2H_4O)_6(C_3H_6O)_8H$;
$C_{13}H_{27}O(C_2H_4O)_6(C_3H_6O)_2(C_2H_4O)_6(C_3H_6O)_8H$;
$C_{12}H_{25}O(C_2H_4O)_w(C_3H_6O)_x(C_2H_4O)_y(C_3H_6O)_zH$
(where w+y=15 and x+z=4);
$C_{13}H_{27}O(C_2H_4O)_w(C_3H_6O)_x(C_2H_4O)_y(C_3H_6O)_zH$
(where w+y=15 and x+z=4);
$C_{12}H_{25}O(C_2H_4O)_8(C_3H_6O)_2(C_2H_4O)_6H$;
$C_{13}H_{27}O(C_2H_4O)_8(C_3H_6O)_2(C_2H_4O)_6H$;
$C_{12}H_{25}O(C_2H_4O)_{12}(C_3H_6O)_2(C_2H_4O)_{12}H$;
$C_{13}H_{27}O(C_2H_4O)_{12}(C_3H_6O)_2(C_2H_4O)_{12}H$;
$CH_3(CH_2)_9(CH_3)CHO(C_2H_4O)_7(C_3H_6O)_{4.5}H$;
$CH_3(CH_2)_{11}(CH_3)CHO(C_2H_4O)_7(C_3H_6O)_{4.5}H$;
$CH_3(CH_2)_9(CH_3)CHO(C_2H_4O)_5(C_3H_6O)_{3.5}H$;
$CH_3(CH_2)_{11}(CH_3)CHO(C_2H_4O)_5(C_3H_6O)_{3.5}H$;
$C_{14}H_{29}O(C_2H_4O)_{14}(C_3H_6O)_2H$;
$C_{11}H_{23}O(C_2H_4O)_8H$;
$C_{10}H_{21}O(C_2H_4O)_{11}H$; and
$C_{12}H_{25}O(C_2H_4O)_{15}H$.

Specific examples of commercially available polyoxyalkylene alkyl ethers include, but are not limited to:

NOIGEN DL-0415 ($R^6O(C_2H_4O)_w(C_3H_6O)_x(C_2H_4O)_y(C_3H_6O)_zH$, where "$R^6$" represents a C12- or C13-alkyl, w+y=15, and x+z=4; HLB, 15.0);

NOIGEN ET-116B ($R^6O(C_2H_4O)_7(C_3H_6O)_{4.5}H$, where "$R^6$" represents a C12- or C14-alkyl; HLB, 12.0);

NOIGEN ET-106A ($R^6O(C_2H_4O)_5(C_3H_6O)_{3.5}H$, where "$R^6$" represents a C12- or C14-alkyl; HLB, 10.9);

NOIGEN DH-0300 ($R^6O(C_2H_4O)_2H$, where "$R^6$" represents a C14-alkyl; HLB, 4.0);

NOIGEN YX-400 ($R^6O(C_2H_4O)_{40}H$, where "$R^6$" represents a C12-alkyl; HLB, 18.1); and NOIGEN EA-160 ($C_9H_{19}C_6H_4O(C_2H_4O)_{16.8}H$; HLB, 15.4) (DKS); and EMULGEN 1108 (trade name, Kao; $R^6O(C_2H_4O)_8H$, where "$R^6$" represents a C11-alkyl; HLB, 13.4).

One polyoxyalkylene alkyl ether may be used alone, or two or more may be used in combination.

In the ink composition according to this embodiment, the polyoxyalkylene alkyl ether is preferably present in an amount of 0.10% by mass or more and 10% by mass or less of the total mass of the ink, more preferably 0.50% by mass or more and 7.5% by mass or less, even more preferably 1.0% by mass or more and 5.0% by mass or less. When containing such an amount of polyoxyalkylene alkyl ether, the ink composition is even better in storage stability and stability during continuous printing.

Moreover, the amount of polyoxyalkylene alkyl ether is preferably 1.0 part by mass or more and 5.0 parts by mass or less per 1.0 part by mass of acetylene glycol B, more preferably 1.5 parts by mass or more and 3.0 parts by mass or less. Adding such an amount of polyoxyalkylene alkyl ether tends to solubilize the acetylene glycol B sufficiently and make it dissolve well in water. When such an amount of polyoxyalkylene alkyl ether is used, therefore, it is unlikely that aggregates form upon the acetylene glycol B being mixed into the ink or the ink varies in penetration into the recording medium.

Other Surfactants

The ink composition according to this embodiment may contain other surfactants. Any surfactant can be added, but it is preferred to use, for example, at least one of a fluorosurfactant and a silicone surfactant.

Examples of fluorosurfactants include, but are not limited to, salts of perfluoroalkyl sulfonates, salts of perfluoroalkyl carboxylates, perfluoroalkyl phosphates, perfluoroalkyl ethylene oxide adducts, and perfluoroalkylbetaines, perfluoroalkyl amine oxide compounds. Examples of commercially available fluorosurfactants include, but are not limited to, S-144 and S-145 (Asahi Glass Co., Ltd.); FC-170C, FC-430, and FLUORAD FC4430 (Sumitomo 3M Ltd.); FSO, FSO-100, FSN, FSN-100, and FS-300 (DuPont); and FT-250 and 251 (NEOS Co., Ltd.). One fluorosurfactant may be used alone, or two or more fluorosurfactants may be used in combination.

Examples of silicone surfactants include, but are not limited to, polysiloxane compounds and polyether-modified organosiloxanes. Specific examples of commercially available silicone surfactants include, but are not limited to, BYK-306, BYK-307, BYK-333, BYK-341, BYK-345, BYK-346, BYK-347, BYK-348, and BYK-349 (trade names, BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical Co., Ltd.).

1.5. Water

An ink composition according to this embodiment may further contain water.

Water treated to minimize ionic impurities can be used, examples of which include forms of purified water, such as ion-exchanged water, ultrafiltered water, reverse-osmosis water, and distilled water, and ultrapure water. Sterilized water, for example sterilized by ultraviolet radiation or the addition of hydrogen peroxide, will prevent fungal and bacterial development in the ink when it is stored for a long period, thereby further improving the storage stability of the ink.

The water content is preferably 40% by mass or more of the total mass of the ink composition, more preferably 50% by mass or more, even more preferably 60% by mass or more. When containing such an amount of water, the ink composition is even better in ejection properties and the quality of the resulting image.

1.6. pH-Adjusting Agent

An ink composition used in this embodiment may contain a pH-adjusting agent. With a pH-adjusting agent, it is easy to adjust the pH of the ink. Examples of pH-adjusting agents include, but are not limited to, inorganic acids (e.g., sulfuric acid, hydrochloric acid, and nitric acid), inorganic bases (e.g., lithium hydroxide, sodium hydroxide, potassium hydroxide, and ammonia), and organic acids (e.g., adipic acid, citric acid, and succinic acid). One pH-adjusting agent may be used alone, or two or more may be used as a mixture.

1.7. Other Ingredients

Additives may optionally be added to an ink composition according to this embodiment to maintain its good storage stability and stability during ejection from a printhead, to improve clogging, or to prevent the ink from deteriorating. Examples include dissolution aids, viscosity modifiers, pH-adjusting agents, antioxidants, preservatives, antimolds, anticorrosives, and chelating agents for capturing metal ions that would affect dispersion.

1.8. Preparation of the Ink Composition

An ink composition according to this embodiment can be prepared by mixing the ingredients discussed above in any order, optionally with removal of impurities, for example by filtration. A preferred method for mixing the ingredients is to add the materials one by one to a container equipped with a stirrer, such as a mechanical or magnetic stirrer, and then stir and mix the materials. The resulting mixture can be filtered by any method deemed necessary, such as centrifugal filtration and/or passing the mixture through a filter.

1.9. Physical Properties of the Ink Composition

To achieve a balance between recording quality and reliability as an ink jet ink, the ink composition according to this embodiment preferably has a surface tension at 20° C. of 20 mN/m or more and 50 mN/m or less, more preferably 25 mN/m or more and 40 mN/m or less. The surface tension can be measured using CBVP-Z automated surface tensiometer (Kyowa Interface Science) by wetting a platinum plate with the ink and checking the surface tension at 20° C.

For the same reason, the viscosity at 20° C. of the ink composition according to this embodiment is preferably 1 mPa·s or more and 8 mPa·s or less, more preferably 2 mPa·s or more and 6 mPa·s or less. The viscosity can be measured using VM-100AL vibrational viscometer (Yamaichi Electronics Co., Ltd.).

As mentioned above, measuring an ink composition according to this embodiment as described in "Identification of Dyes A and B" gives the retention time of the peaks for dyes A and B in the ink composition and the absorbance and wavelength of absorption for each peak, and these results can be used to calculate the width at half height of each peak and the concentration of each dye.

1.10. Applications

An ink composition according to this embodiment contains two types of dyes with different distributions combined in certain proportions: dye A, having a width at half height is 50 nm or less and which is high in chroma, and dye B, having the width at half height is broad and which is good in dark tone reproduction. By virtue of this, the ink composition produces an image good in color strength, dark tone reproduction (graininess), and resistance to gases, even when the printing process is prolonged by using a continuous-supply ink container, and, therefore, is suitable for use not only with an ink jet recording apparatus but also with that capable of prolonged printing using a continuous-supply ink container.

Moreover, depending on the solvent and surfactant chosen, the ink composition according to this embodiment is good in ease of initial loading and stability during continuous printing in prolonged printing using a continuous-supply ink container, and the resulting print is improved in image fastness. The ink composition is, furthermore, not limited in the recording medium on which printing is performed.

2. Ink Set

An ink composition according to this embodiment is suitable for use in an ink set with cyan and yellow inks, and the ink set may include other inks. Images recorded using this ink set are good in color strength, dark tone reproduction (graininess), and resistance to gases, even when the printing process is prolonged by using continuous-supply ink containers.

The following describes an ink set according to an embodiment of the invention.

An ink set according to an embodiment of the invention includes a cyan ink, a magenta ink, and a yellow ink. The cyan ink contains one or more dyes selected from a first cyan dye represented by general formula (C-1), a second cyan dye represented by general formula (C-2), a third cyan dye represented by general formula (C-3), C.I. Direct Blue 199, and C.I. Direct Blue 86. The magenta ink is an ink composition according to an embodiment of the invention. The yellow ink contains one or more dyes selected from a first yellow dye represented by general formula (Y-1), a second yellow dye represented by general formula (Y-2), C.I. Direct Yellow 86, and C.I. Direct Yellow 132.

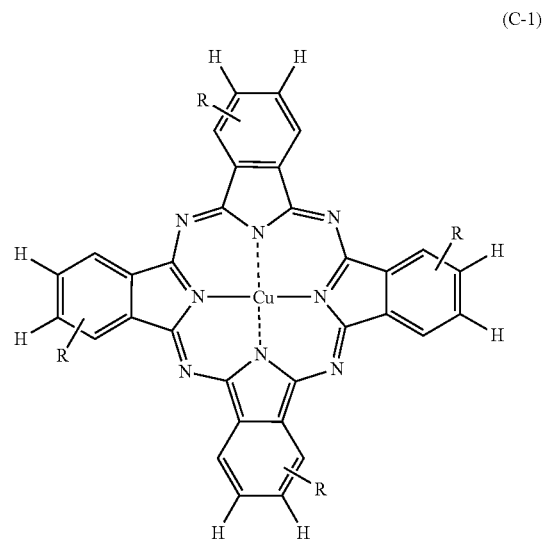

(C-1)

In general formula (C-1), R represents $SO_2(CH_2)_3SO_3Na$.

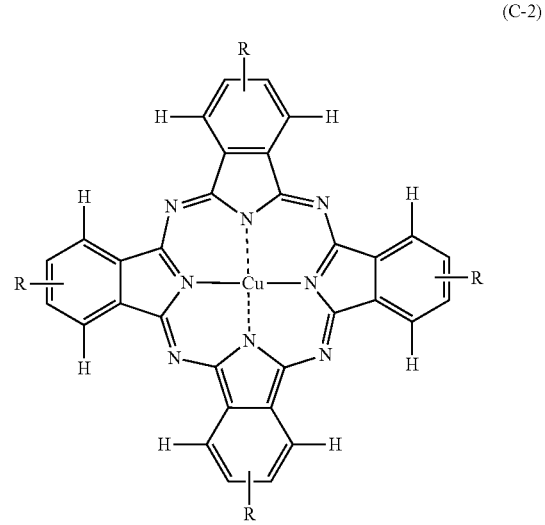

(C-2)

In general formula (C-2), two Rs represent $SO_2(CH_2)_3SO_3Li$, and the other two represents $SO_2(CH_2)_3SO_2NHCH_2(OH)CH_3$.

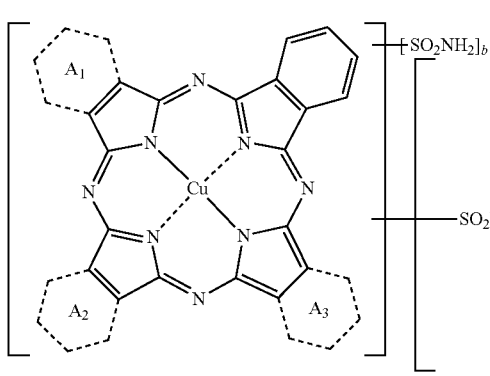
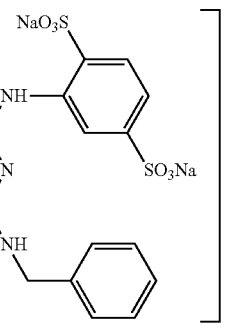

(C-3)

In general formula (C-3), rings $A_1$ to $A_3$, drawn with broken lines, each independently represent a benzene ring or six-membered nitrogen-containing aromatic heterocycle condensed to the porphyrazine ring. The number of nitrogen-containing aromatic heterocycles averages more than 0.00 and 3.00 or less, and the rest is a benzene ring or rings;

b averages 0.00 or more and less than 3.90;

c averages 0.10 or more and less than 4.00; and b plus c averages 1.00 or more and less than 4.00.

formula (C-1), a second cyan dye represented by general formula (C-2), a third cyan dye represented by general formula (C-3), C.I. Direct Blue 199, and C.I. Direct Blue 86. By virtue of containing any such cyan dye in cyan ink with an above-described ink composition, the ink set according to this embodiment produces an image good in color strength, dark tone reproduction (graininess), and resistance to gases, even when the printing process is prolonged by using continuous-supply ink containers.

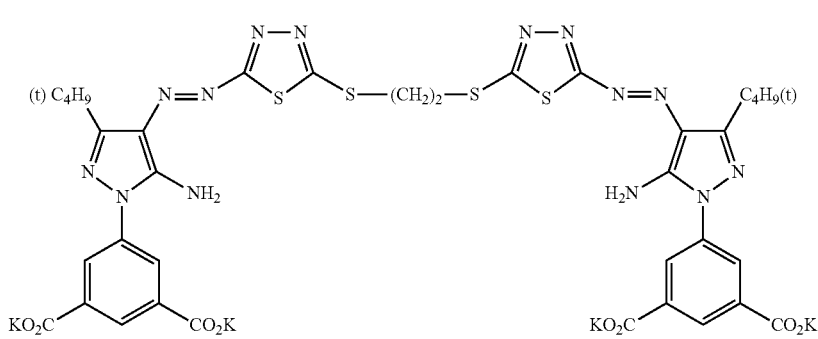

(Y-1)

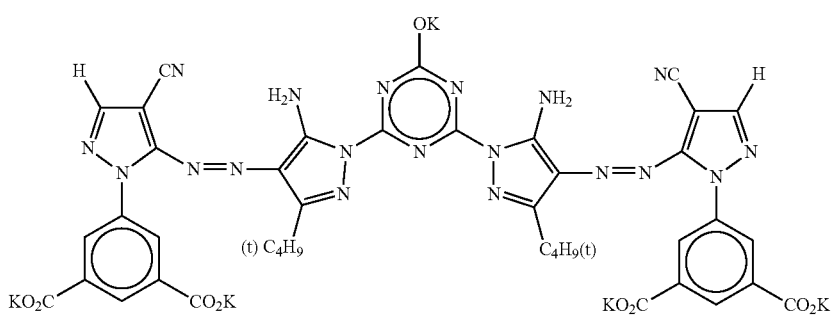

(Y-2)

2.1. Cyan Ink

The cyan ink as a component of the ink set according to this embodiment preferably contains a phthalocyanine compound as a dye. The cyan ink therefore contains one or more dyes selected from a first cyan dye represented by general In a second cyan dye, of general formula (C-2), two Rs represents $SO_2(CH_2)_3SO_3Li$, and the other two represents $SO_2(CH_2)_3SO_2NHCH_2(OH)CH_3$. Mixtures of the following two structures are preferred.

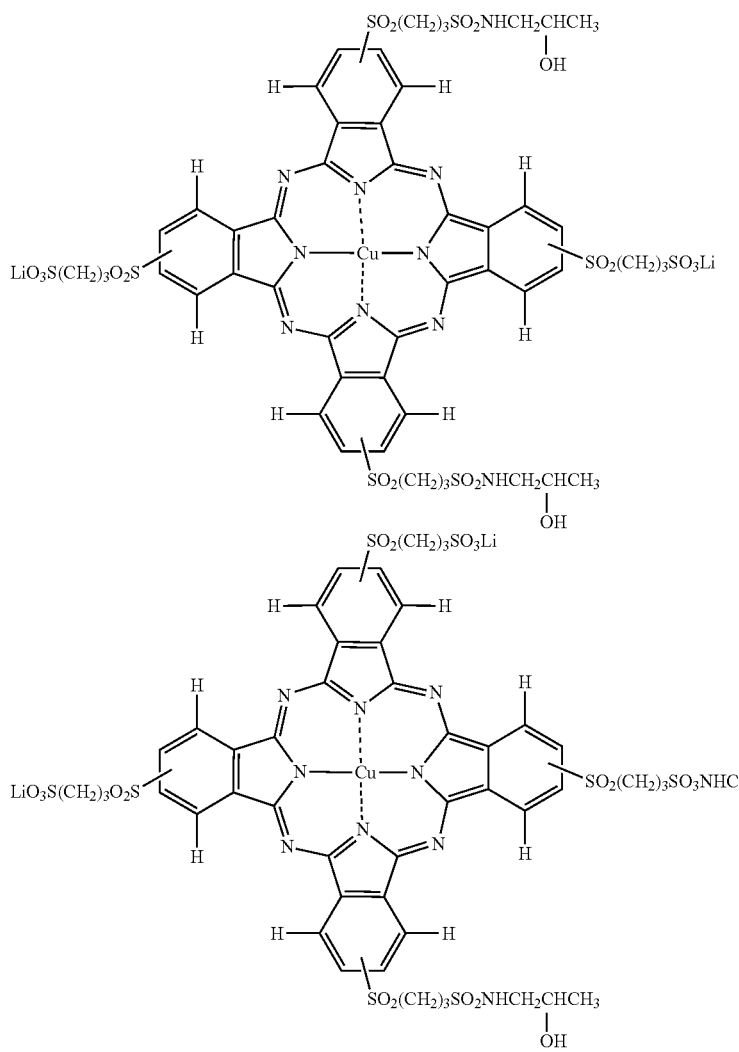

(C-2)

In general formula (C-3), rings $A_1$ to $A_3$, drawn with broken lines, each independently represent a benzene ring or six-membered nitrogen-containing aromatic heterocycle condensed to the porphyrazine ring. The number of nitrogen-containing aromatic heterocycles averages more than 0.00 and 3.00 or less, and the rest is a benzene ring or rings;

b averages 0.00 or more and less than 3.90;
c averages 0.10 or more and less than 4.00; and
b plus c averages 1.00 or more and less than 4.00.

Examples of nitrogen-containing aromatic heterocycles that can be present as the broken-line rings $A_1$ to $A_3$ in general formula (C-3) (the three rings $A_1$, $A_2$, and $A_3$) include those having 1 or 2 nitrogen atoms, such as pyridine, pyrazine, pyrimidine, and pyridazine rings. Among these, the pyridine and pyrazine rings are preferred, and the pyridine ring is more preferred. The cyan ink improves becomes more resistant to gases with increasing number of nitrogen-containing aromatic heterocycles.

The number of nitrogen-containing aromatic heterocycles usually averages more than 0.00 and 3.00 or less, preferably 0.20 or more and 2.00 or less, more preferably 0.50 or more and 1.75 or less, even more preferably 0.75 or more and 1.50 or less, although this is not necessarily true because the kind of heterocycle matters.

As mentioned herein, the terms b, c, and b plus c are numbers rounded to the nearest hundredth.

Each of the first cyan dye, of general formula (C-1), the second cyan dye, of general formula (C-2), and the third cyan dye, of general formula (C-3), can be in the form of a salt. The countercation with which these dyes form a salt is preferably the cation of an inorganic metal, ammonia ($NH_3$), or an organic base.

The inorganic metal can be, for example, an alkali metal or alkaline earth metal. Examples of alkali metals include lithium, sodium, and potassium, and examples of alkaline earth metals include calcium and magnesium.

The organic base can be an organic amine in particular. Examples include C1- to C3-alkylamines, such as methylamine and ethylamine, and mono-, di-, or tri-C1- to C4-alkanolamines, such as monoethanolamine, diethanolamine, and triethanolamine.

Preferred salts in which any of the listed counterions is used include, but are not limited to, salts of sodium, potassium, lithium, and other alkali metals; salts formed with monoethanolamine, diethanolamine, triethanolamine, monoisopropanolamine, diisopropanolamine, triisopropanolamine, or another mono-, di-, or tri-C1- to C4-alkanolamine, and ammonium salts.

Salts of the first cyan dye, of general formula (C-1), the second cyan dye, of general formula (C-2), and the third cyan dye, of general formula (C-3), can vary in physical properties, such as solubility, according to what types of salts they are. Moreover, if they are used as inks, what types of salts they are can also have impact on the performance of the ink, in particular performance attributes such as those related to resistance to gases. Selecting the types of salts according to the desired performance, for example, of the ink is therefore a preferred practice.

The cyan ink can contain one or two or more such dyes, preferably two or more mixed thereinto. The cyan ink may further contain other dyes. By virtue of the cyan ink containing any such dye and serving as part of the ink set together with any of the yellow inks discussed below, the ink set according to this embodiment helps improve the resistance to gases of the mixed-color areas of an image in a well-balanced manner. The resulting image is well-balanced in terms of colors and fading, and the print maintains a good quality for a longer period of time.

In the cyan ink, the dyes are preferably present in an amount of 0.1% by mass or more and 10.0% by mass or less of the total mass of the cyan ink, more preferably 1.0% by mass or more and 5.0% by mass or less, even more preferably 2% by mass or 4.0% by mass or less.

2.2. Yellow Ink

The ink set according to this embodiment contains one or more dyes selected from a first yellow dye represented by general formula (Y-1), a second yellow dye represented by general formula (Y-2), C.I. Direct Yellow 86, and C.I. Direct Yellow 132. By virtue of containing any such yellow ink with an above-described ink composition, the ink set according to this embodiment produces an image good in color strength, dark tone reproduction (graininess), and resistance to gases, even when the printing process is prolonged by using continuous-supply ink containers.

The use of any of the dimeric disazo compounds presented above as a yellow ink in combination with an above-described ink in an ink set, moreover, helps improve the resistance to gases of the mixed-color areas of an image in a well-balanced manner. The resulting image is well-balanced in terms of colors and fading, and the print maintains a good quality for a longer period of time.

Each of the first yellow dye, of general formula (Y-1), and the second yellow dye, of general formula (Y-2), can be in the form of a salt. The countercation with which these dyes form a salt is preferably the cation of an inorganic metal, ammonia ($NH_3$), or an organic base.

The inorganic metal can be, for example, an alkali metal or alkaline earth metal. Examples of alkali metals include lithium, sodium, and potassium, and examples of alkaline earth metals include calcium and magnesium.

The organic base can be an organic amine in particular. Examples include C1- to C3-alkylamines, such as methylamine and ethylamine, and mono-, di-, or tri-C1- to C4-alkanolamines, such as monoethanolamine, diethanolamine, and triethanolamine.

Preferred salts in which any of the listed counterions is used include, but are not limited to, salts of sodium, potassium, lithium, and other alkali metals; salts formed with monoethanolamine, diethanolamine, triethanolamine, monoisopropanolamine, diisopropanolamine, triisopropanolamine, or another mono-, di-, or tri-C1- to C4-alkanolamine, and ammonium salts.

Salts of the first yellow dye, of general formula (Y-1), and the second yellow dye, of general formula (Y-2), can vary in physical properties, such as solubility, according to what types of salts they are. Moreover, if they are used as inks, what types of salts they are can also have impact on the performance of the ink, in particular performance attributes such as those related to resistance to gases. Selecting the types of salts according to the desired performance, for example, of the ink is therefore a preferred practice.

The yellow ink can contain one or two or more such dyes, preferably two or more mixed thereinto. The yellow ink may further contain other dyes. In the yellow ink, the dyes are preferably present in an amount of 0.1% by mass or more and 10.0% by mass or less of the total mass of the yellow ink, more preferably 1.0% by mass or more and 5.0% by mass or less, even more preferably 2% by mass or 4.0% by mass or less.

3. Ink Jet Recording Apparatus

The following describes, with reference to drawings, an example of an ink jet recording apparatus in which ink compositions according to an embodiment is implemented. An example of an ink jet recording apparatus according to an embodiment of the invention is a printer as illustrated in FIGS. 3 to 9, which is a continuous-supply ink-container printer having an ink jet printhead and ink supply channels through which ink compositions are supplied from ink containers to the printhead, although ink compositions according to an embodiment can also be applied to other types of ink jet recording apparatuses.

That is, an ink jet recording apparatus according to an embodiment of the invention includes an ink container capable of containing an ink composition according to an above embodiment, a printhead that ejects the ink composition, and an ink supply channel through which the ink composition is supplied from the ink container to the printhead.

The following describes an ink jet recording apparatus according to this embodiment in detail with reference to drawings. The elements may be drawn to different scales to help understand the structure of the ink jet recording apparatus according to this embodiment.

3.1. Appearance

Figure 3:
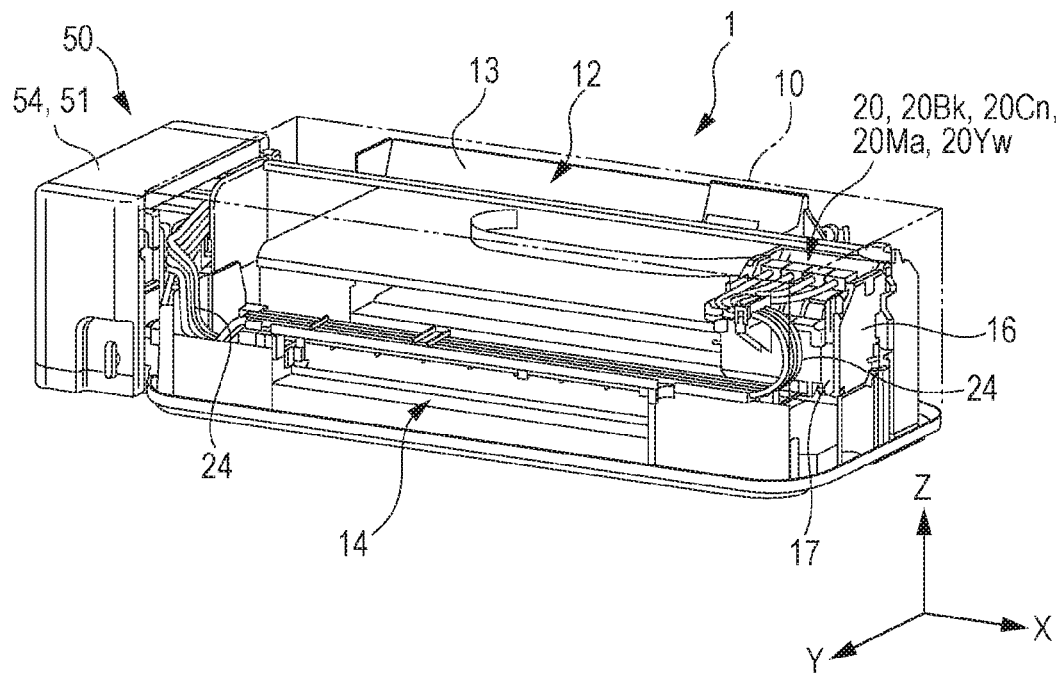
FIG. 3 is a schematic perspective view of an ink jet recording apparatus according to an embodiment of the invention, illustrating the apparatus with its ink containers housed in a container case.
Figure 4:
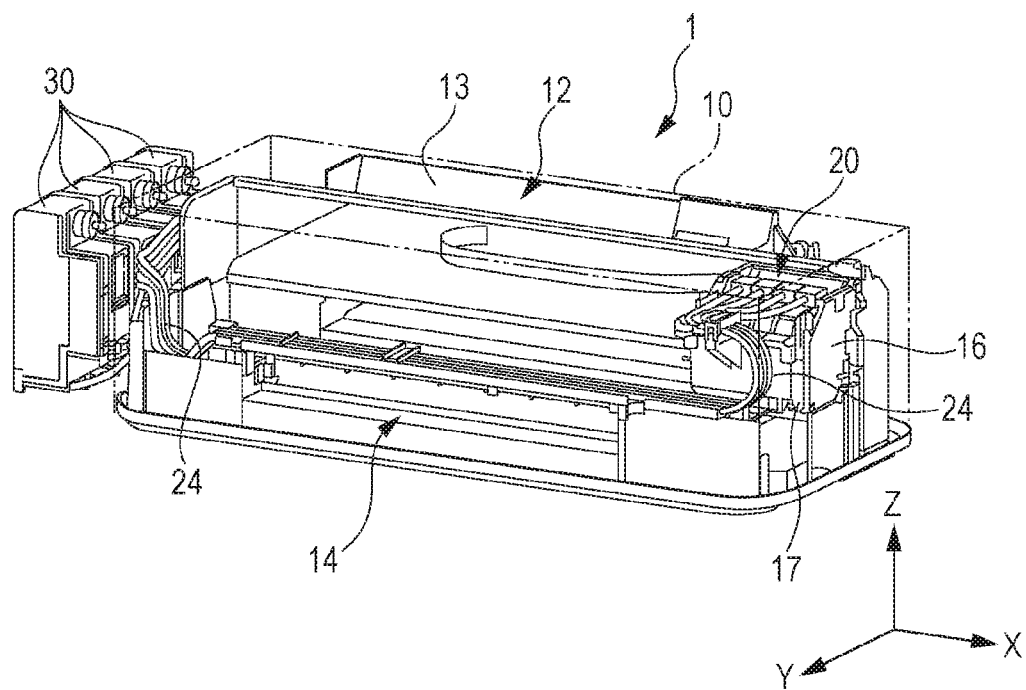
FIG. 4 is a schematic perspective view of the ink jet recording apparatus according an embodiment of the invention, illustrating the apparatus with the container case off of it.

FIG. 3 is a schematic perspective view of an ink jet recording apparatus 1. Specifically, FIG. 3 illustrates the apparatus with its ink containers 30 (see FIG. 5) housed in a container case 51. FIG. 4 illustrates the apparatus with the container case 51 off of it. FIGS. 3,4,5 and 6 include X, Y, and Z axes orthogonal to one another. The X, Y, and Z axes in FIG. 3 correspond to those in other drawings, and the subsequent drawings optionally include the X, Y, and Z axes. In this embodiment, the X axis corresponds to the direction of movement of a carriage 16, and the Y axis corresponds to the direction in which the multiple ink containers 30 are aligned during use. The Z axis corresponds to the vertical direction (direction of gravity).

Figure 5:
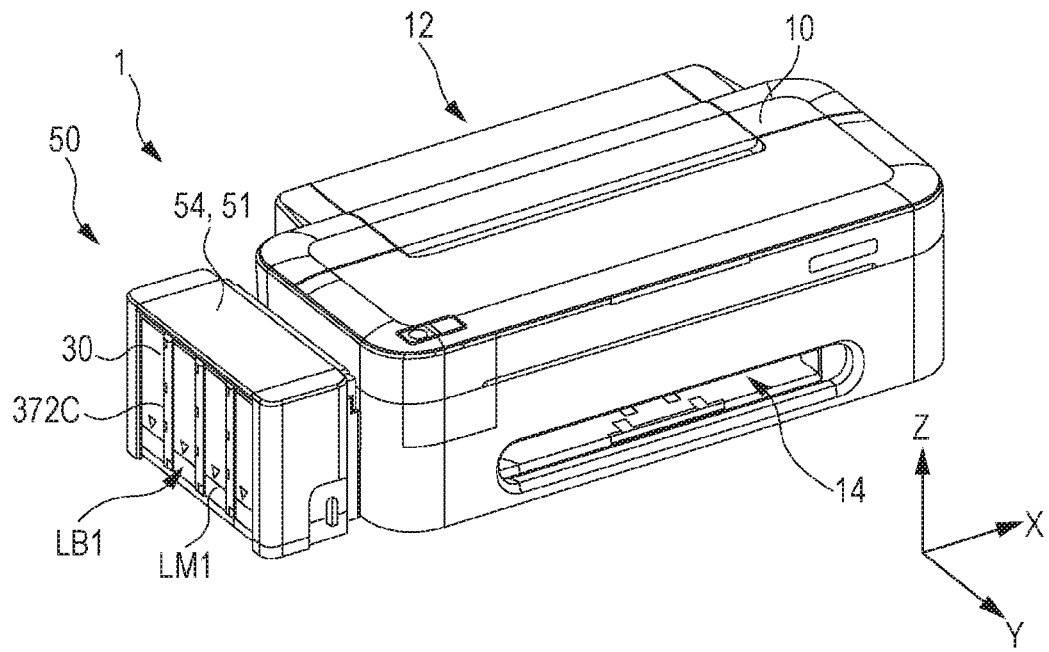
FIG. 5 is a schematic perspective view of the ink jet recording apparatus according to an embodiment of the invention with its recording unit housed in a recording unit case, illustrating the ink jet recording apparatus in the in-use state.
Figure 6:
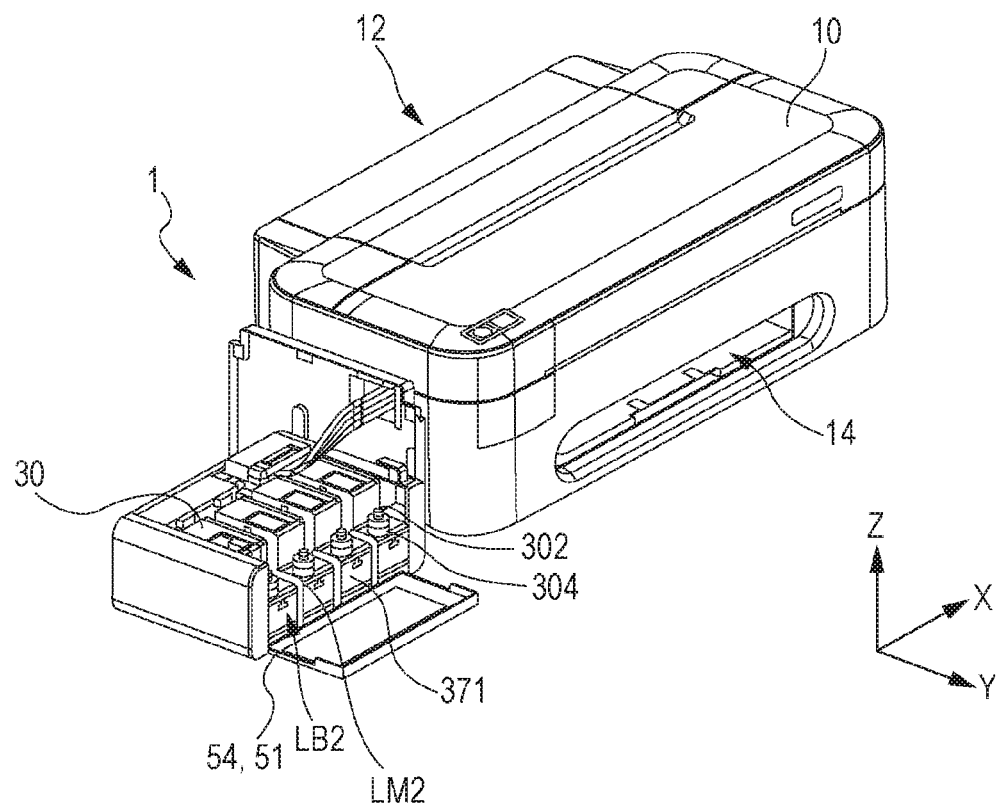
FIG. 6 is a schematic perspective view of the ink jet recording apparatus with its recording unit housed in a recording unit case, illustrating the ink jet recording apparatus in the filling state.

FIGS. 5 and 6 are schematic perspective views of the ink jet recording apparatus 1 with its recording unit 12 housed in a recording unit case 10. Specifically, FIG. 5 illustrates the ink jet recording apparatus 1 in the in-use state (detailed hereinafter), and FIG. 6 illustrates the ink jet recording apparatus 1 in the filling state (detailed hereinafter).

As illustrated in FIGS. 3 to 6, the ink jet recording apparatus 1 has a recording unit 12 that records an image on a recording medium (not illustrated) and an ink-housing unit 50 that supplies inks to subtanks 20 provided in the recording unit 12 through ink supply tubes (ink supply channels) 24.

3.2. Recording Unit

The recording unit 12 has a printhead 17 that records an image on a recording medium by ejecting droplets of above-described ink compositions, subtanks 20 that temporarily keep the inks supplied through the ink supply tubes, a carriage 16 capable of reciprocating in the direction of the X axis with the subtanks 20 and printhead 17 thereon, a feed slot 13 into which the recording medium is fed, and an ejection slot 14 from which the recording medium is ejected.

As illustrated in FIGS. 5 and 6, the recording unit 12 is housed in a recording unit case 10.

The printhead 17 has a nozzle surface facing the recording surface of the recording medium and ejects droplets of the inks through multiple nozzles (not illustrated) created in the nozzle surface to place them on the recording surface of the recording medium.

There are a wide variety of methods of ink jet recording as detailed below, and any of these methods can be used. Examples include the method in which the inks are continuously ejected dropwise from the nozzles using a strong electric field created between the nozzles and accelerating electrodes placed in front of the nozzles, whether printing signals are given to deflecting electrodes while the droplets are flying between the deflecting electrodes or the droplets are ejected in response to printing signals without deflection (electrostatic suction); the method in which droplets of the inks are forced out by pressurizing the ink liquids with a small pump and mechanically vibrating the nozzles, for example using crystal oscillators; the method in which droplets of the inks are ejected to record the image by simultaneously giving pressure and printing signals to the inks using piezoelectric elements (piezoelectric method); and the method in which droplets of the inks are ejected to record the image by heating the inks until they bubble using microelectrodes in accordance with printing signals (thermal jetting).

The subtanks 20, connected to the ink containers 30 by the ink supply tubes 24, temporarily keep the inks housed in the ink containers 30 and supply them to the printhead 17. In the example illustrated in FIGS. 3,4,5 and 6, there are four subtanks 20, i.e., subtanks 20Bk, 20Cn, 20Ma, and 20Yw, for different colors corresponding to the inks of different colors contained in the ink containers 30. The subtanks 20 can be made of, for example, a plastic resin, such as polystyrene or polyethylene, although other materials can also be used. Furthermore, the ink jet recording apparatus 1 illustrated in this embodiment, having subtanks 20, is not the only possible form. For example, the printhead 17 and ink containers 30 may be connected together by the ink supply tubes 24 alone, without the subtanks 20.

The carriage 16 reciprocates along the X axis with the printhead 17 and subtanks 20 thereon, driven by a carriage-moving mechanism (not illustrated) made up of components such as a motor and a timing belt. As this carriage 16 moves, the printhead 17 also reciprocates along the X axis. As a result, in the direction of the X axis, the recording of the image on the recording medium is accomplished by the printhead 17 ejecting the inks while the carriage 16 moves. It should be noted that the recording apparatus illustrated in this embodiment, which is called a serial-head ink jet recording apparatus, is not the only possible type to which the ink containers can be applied. The ink containers can also be applied to what is called a line-heard ink jet recording apparatus.

The ejection slot 14 is on the front of the ink jet recording apparatus 1. The feed slot 13 is on the back side of the ink jet recording apparatus 1. When a recording process is run with a recording medium placed into the feed slot 13, the recording medium is taken in from the feed slot 13, an image, for example, is recorded on it inside the apparatus, and the printing paper is ejected through the ejection slot 14. During this, the recording medium is transported by a feeding mechanism (not illustrated) that feeds the recording medium in the direction of the Y axis. In the direction of the Y axis, therefore, the recording of the image on the recording medium is accomplished by the printhead 17 ejecting the inks while the feeding mechanism moves the recording medium.

The recording unit 12 has a control section (controller, not illustrated) that controls the overall operation of the ink jet recording apparatus 1. The control section may include, for example, a CPU, ROM, and RAM. The control section controls all operations including the reciprocal movement of the carriage 16, feeding of the recording medium, ejection of the inks from the printhead 17, and supply of the inks from the ink containers 30 to the subtanks 20 (printhead 17).

3.3. Ink-Housing Unit and Ink Supply Tubes

The ink-housing unit 50 has multiple ink containers 30 and a container case 51 and a container in which the ink containers 30 are housed. The ink-housing unit 50 is outside the recording unit case 10. The container case 51 can be removed from the side of the recording unit case 10 while holding the ink containers 30 therein. The container case 51 also has a top case 54 that can be opened and closed.

When the ink jet recording apparatus 1 is viewed from the front (from the −Y direction to the +Y direction), the ink-housing unit 50 is on the left side of the recording unit case 10 (−X side of the recording unit case 10). Having the ink-housing unit 50 outside the recording unit case 10, this recording apparatus is less limited in space, and therefore can accommodate more continuous-supply ink containers 30, than one that has the ink-housing unit 50 inside the case 10 together with the recording unit 12. The ink containers 30 can contain a larger amount of ink than the subtanks 20.

The ink supply tubes 24, each for one of the multiple ink containers 30, are part of ink channels that connect the ink containers 30 and subtanks 20 (printhead 17) together and through which the inks in the ink containers 30 are supplied to the subtanks 20 (printhead 17). The ink supply tubes 24 can be, for example, tubes of a flexible material (e.g., rubber or an elastomer). When ink in a subtank 20 is consumed as a result of the ejection of the ink from the printhead 17, the ink in the ink container 30 is supplied to the subtank 20 through an ink supply tube 24. This enables continuous and prolonged recording with the ink jet recording apparatus 1.

The ink supply tubes 24 may have a filter (not illustrated) inside. The filters in the ink supply tubes 24 trap aggregates that form in an ink chamber 340 (see FIGS. 7 and 8) and reduce the entry of such aggregates into the printhead 17.

There are multiple ink containers 30, each for one ink composition or one color. The example illustrated in FIGS. 3 to 6 has four ink containers 30 corresponding to the aforementioned subtanks 20Bk, 20Cn, 20Ma, and 20Yw. Although in this embodiment there are four ink containers 30 each for one color, it may be that one ink container is partitioned into multiple ink compartments. The ink containers 30 can be loaded with, for example, above-described ink containers. The following describes the structure of the ink containers 30 in detail.

3.4. Structure of the Ink Containers

Positions of the Ink Containers

Prior to getting into the specifics of the structure of the ink containers 30, the following describes the positions of the ink containers 30.

An ink container 30 can assume two positions: the in-use state and the filling state. "In-use state" refers to the position the ink container 30 assumes while supplying ink to the printhead 17 (subtank 20). If there are more than one positions in which the ink container 30 can supply ink, the in-use state is the recommended position for ink supply if such information is given in the manual or instruction drawings, or the fixed position of the ink container 30 if the ink jet recording apparatus comes with a component for fixing the ink container 30. FIG. 5 illustrates an example of ink containers 30 in the in-use state. Although not seen in FIG. 5, when the ink containers 30 are in the in-use state, the ink fill ports 304 (see FIG. 6) face a side of the recording unit case 10. In other words, the axis of the ink fill ports 304 is horizontal (specifically, pointing in the +X direction). In this position, furthermore, the ink fill ports 304 are closed by stoppers 302 (see FIG. 6).

"Filling state" refers to the position the ink container 30 assumes while the ink container 30 (ink chamber 340) is filled (or loaded, refilled, etc.) with ink. FIG. 6 illustrates the ink containers 30 in the filling state. To fill an ink container 30 with ink, the user removes the container case 51 from the side of the recording unit case 10 and then opens the top case 54 to bring the ink containers 30 into the filling state, illustrated in FIG. 6. In the filling state, the axis of the ink fill ports 304 is vertical (specifically, pointing in the +Z direction). After bringing the ink containers 30 into the filling state, illustrated in FIG. 6, the user removes the stopper 302 closing the ink fill port 304 and pours ink. After finishing pouring ink, the user closes the ink fill port 304 with the stopper 302. The user then attaches the container case 51 to the side of the recording unit case 10 to return the ink containers 30 to the in-use state, in FIG. 5.

Status Indicators

In the in-use state, in FIG. 5, the third side 372C of the wall 370 (described hereinafter) defining the ink chamber 340 in each ink container 30 is visibly exposed. In the in-use state, in FIG. 5, the third side 372C is perpendicular to the surface on which the apparatus is placed, which is horizontal (parallel to the XY plane). In the filling state, in FIG. 6, the third side 372C is parallel to the placement surface. In the filling state, therefore, the third side 372C is part of the bottom surface of the ink container 30 (ink chamber 340).

As illustrated in FIG. 5, each ink container 30 has a first-state indicator LB1 (also referred to as "start-of-refilling indicator LB1") on the third side 372C. The first-state indicator LB1 works in the in-use state to tell the user that the ink container 30 is in the first state, in which the ink container 30 needs to be refilled. Specifically, the first-state indicator LB1 works in the in-use state to indicate that the ink has been consumed to the extent that the level of the ink is at a first height. The first-state indicator LB1 includes a straight line LM1 that is horizontal (parallel to the XY plane) in the in-use state (also referred to as "first-state mark LM1" or "start-of-refilling mark LM1"). When the level of the ink has approached the first-state mark LM1, the user refills the ink container 30 (ink chamber 340).

When the user opens the top case 54 in the filling state, in FIG. 6, the top surface 371 (see FIG. 8), different from the third side 372C, of the wall 370 (described hereinafter) defining the ink chamber 340 becomes visibly exposed. The top surface 371 in the filling state is a wall vertical with respect to the placement surface, which is parallel to the XY plane. In the in-use state, in FIG. 5, the top surface 371 is part of the top surface of the ink chamber 340 (see FIGS. 7 and 8).

Each ink container 30 has a second-state indicator LB2 (also referred to as "end-of-refilling indicator LB2") on the top surface 371. The second-state indicator LB2 works in the filling state to tell the user that the ink container 30 is in the second state, in which the ink container 30 has been filled completely. Specifically, the second-state indicator LB2 works in the filling state to indicate that the ink has been poured to the extent that the level of the ink is at a second height. The second-state indicator LB2 includes a straight line LM2 that is horizontal in the filling state (also referred to as "second-state mark LM2" or "second-state mark LM2"). When the level of the ink has approached the second-state mark LM2, the user stops pouring the ink.

This embodiment is an example in which the ink containers 30 assume different positions in the in-use and filling states as illustrated in FIGS. 5 and 6, but this is not the only possible configuration. For example, the ink containers 30 may be in the same position in both the in-use and filling states. This further reduces aggregates occurring from the inks. That is, when an ink container 30 changes its position between the in-use and filling states, the ink in the ink chamber 340 can adhere to an area that has been untouched (e.g., part of the wall 370 defining the ink chamber 340). A gas-liquid interface formed between the ink adhering to such an area and the ambient air coming into contact with it causes the emergence of aggregates. By contrast, when an ink container 30 remains in the same position in the in-use and filling states, the ink is less likely to adhere somewhere untouched, and, therefore, aggregates occurring in the ink chamber 340 tend to be reduced.

An example of a configuration in which the ink containers 30 assume the same position in both the in-use and filling states is that the ink containers 30 are switched between the in-use and filling states in the position illustrated in FIG. 5. In this case, the ink fill ports 304 are placed anywhere the inks do not leak out in the filling state. For example, ink fill ports 304 created on the upper side (e.g., top surface 371 of the wall 370 described hereinafter) of the ink containers 30 and opening vertically upwards will prevent the inks from leaking during filling.

Ink and Air Flow Pathways

Figure 7:
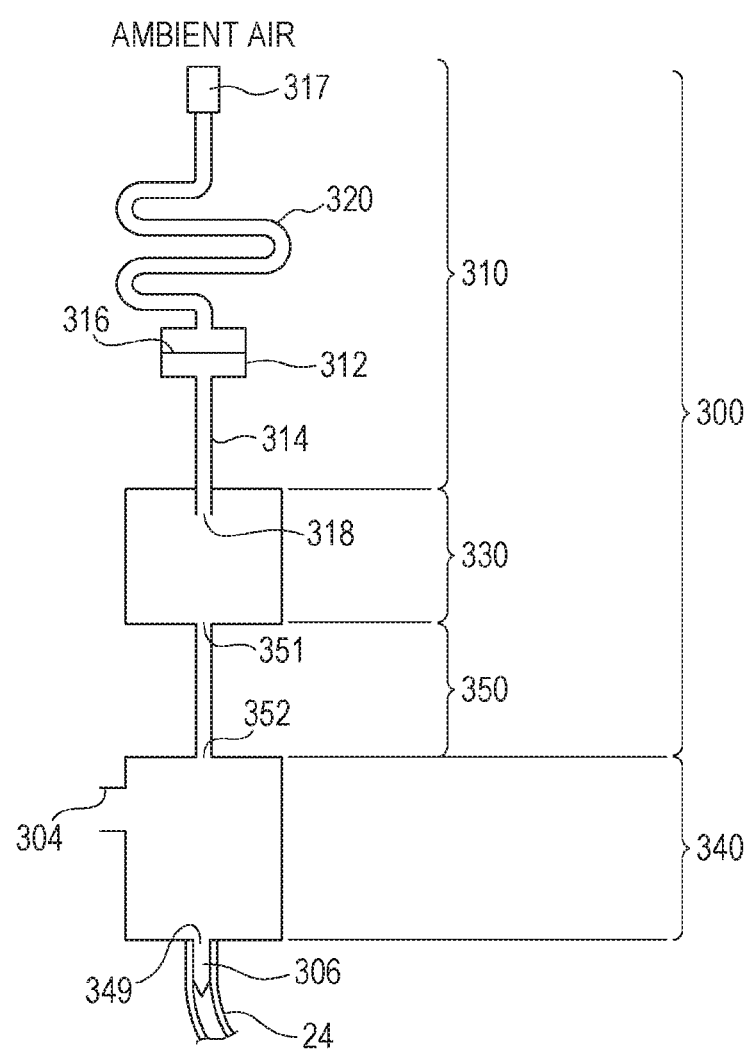
FIG. 7 is a conceptual diagram illustrating the pathway in an ink jet recording apparatus according to an embodiment of the invention from a vent to an ink outlet.

The following describes the pathway through which inks are supplied in an ink jet recording apparatus 1 according to this embodiment. FIG. 7 is a conceptual diagram illustrating the pathway from a vent 317 to an ink outlet 306.

The pathway (channel) from the vent 317 to the ink outlet 306 has two sections, a ventilation channel 300 and an ink chamber 340. The ventilation channel 300 is composed of, from upstream, a first channel 310, an air chamber 330, and an ink-chamber passage 350. In the ventilation channel 300, an air inlet 352 at one end opens in the ink chamber 340, and a vent 317 at the other end opens to the outside. That is, the vent 317 communicates with the ambient air. In the in-use state, the ink has a surface in direct contact with the ambient air in the ink-chamber passage 350 (specifically, the vicinity of the air inlet 352), and air (bubbles) is allowed to come from the air inlet 352 into the ink in the ink chamber 340 to introduce air into the ink chamber 340.

In the first channel 310, an air inlet 318 (also referred to as "air-chamber opening 318") at one end opens in the air chamber 330, and the vent 317, at the other end, opens to the outside to make the air chamber 330 communicate with the outside. The first channel 310 has a communication channel 320, a gas-liquid separation room 312, and a communication channel 314. The communication channel 320 is connected to the vent 317 at one end and to the gas-liquid separation room 312 at the other end. Part of the communication channel 320 is long and narrow to reduce the water in the ink stored in the ink chamber 340 diffusing and evaporating out through the ventilation channel 300. The gas-liquid separation room 312 includes a sheet member (film member) 316 placed somewhere between the upstream and downstream ends to close the channel. This sheet member 316 is permeable to gases and scarcely permeable to liquids. The sheet member 316 can be made of, for example, GORE-TEX®. Placed to close the pathway (channel) from the air inlet 318 to the vent 317 partway, this sheet member 316 reduces backflow of ink from the ink chamber 340 coming upstream of the sheet member 316. This sheet member 316 functions as a gas-liquid separator membrane.

The communication channel 314 makes the gas-liquid separation room 312 and air chamber 330 communicate. One end of the communication channel 314 is the air inlet 318. The air chamber 330 is larger in cross-sectional area than the ink-chamber passage 350 and has a certain volume. With this structure the air chamber 330 holds ink flowing backward thereinto from the ink chamber 340, reducing ink coming upstream of the air chamber 330.

In the ink-chamber passage 350, an air-chamber-side opening 351 at one end opens in the air chamber 330, and the air inlet 352, at the other end, opens in the ink chamber 340 to make the air chamber 330 and ink chamber 340 communicate. The ink-chamber passage 350 is preferably narrow in cross-sectional area enough that a meniscus (curved surface of the ink) forms.

The ink chamber 340 contains ink and supplies it to a subtank 20 (see FIGS. 3 and 4) from an ink exit 349 provided in the ink outlet 306 through an ink supply tube 24.

Figure 8:
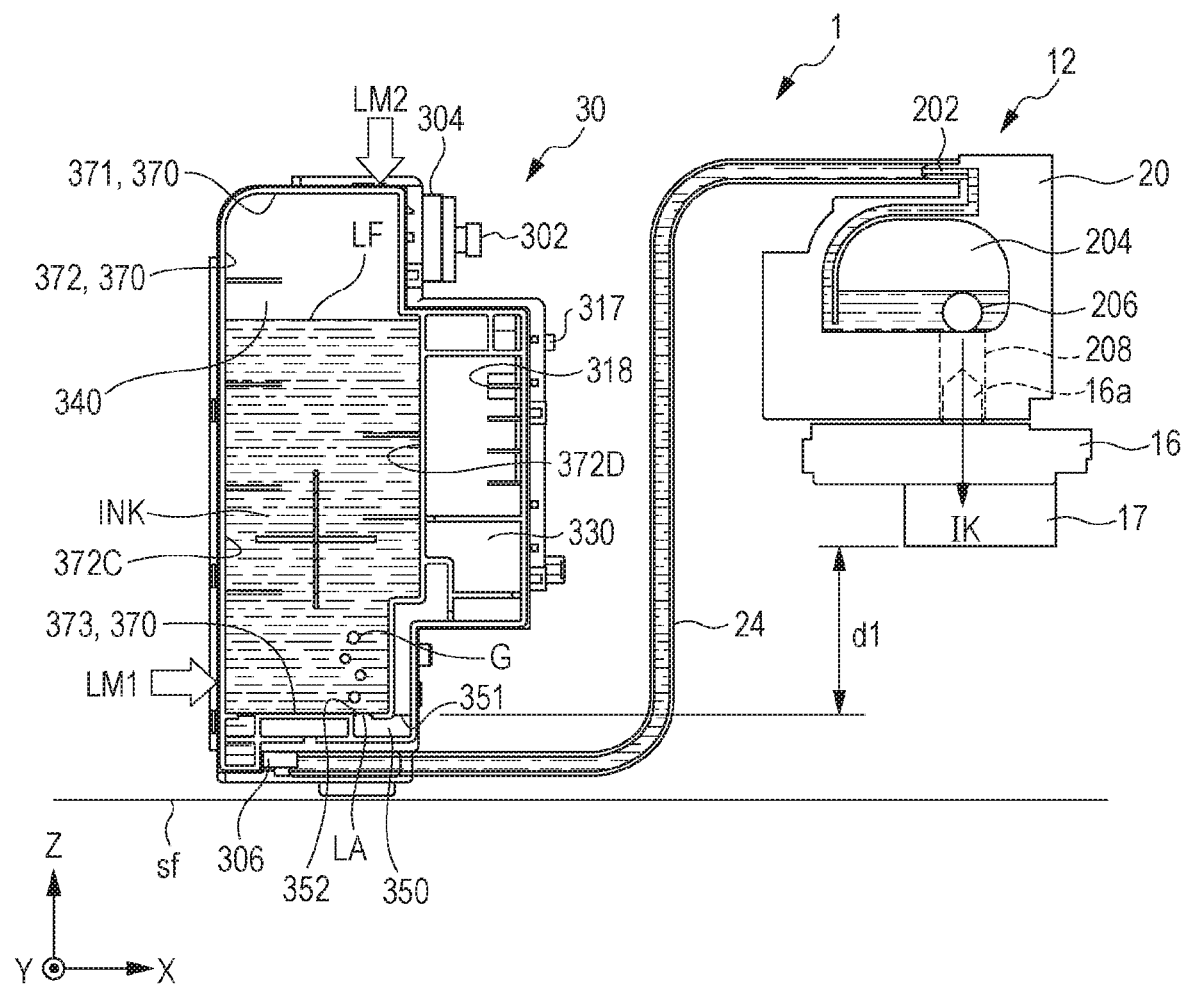
FIG. 8 is a schematic view of part of the internal structure of an ink jet recording apparatus according to an embodiment of the invention.

Next, the principle behind the supply of ink from an ink container 30 to a subtank 20 (printhead 17) is described using FIG. 8. FIG. 8 is a schematic view of part of the internal structure of the ink jet recording apparatus 1. In this embodiment, each ink container 30 supplies ink to the recording unit 12 using the principle of Mariotte's bottle.

In the example illustrated in FIG. 8, the ink jet recording apparatus 1 is on a horizontal surface sf (XY plane). The ink outlet 306 of an ink container 30 and the ink-receiving section 202 of a subtank 20 are connected by an ink supply tube 24.

The subtank 20 in the example illustrated in FIG. 8 includes an ink reservoir 204, an ink flow passage 208, and a filter 206. An ink supply needle 16a of the carriage 16 has been inserted into the ink flow passage 208. The filter 206 traps aggregates, which can be present in the ink as a contaminant, and prevents them from flowing into the printhead 17. Sucked by the printhead 17, the ink in the ink reservoir 204 flows through the ink flow passage 208 and ink supply needle 16a and reaches the printhead 17. The ink supplied to the printhead 17 is ejected (toward the recording medium) through a nozzle (not illustrated).

When the user pours ink into the ink chamber 340 from the ink fill port 304 in the filling state (see FIG. 6), seals the ink fill port 304 with a stopper 302, and brings the ink container 30 into the in-use state, the air inside the ink chamber 340 expands, creating a negative pressure in the ink chamber 340. The pressure in the ink chamber 340 remains negative by virtue of the ink in the ink chamber 340 being sucked by the printhead 17.

The air inlet 352 is created to come below the first-state mark LM1 in the in-use state. In the example illustrated in FIG. 8, the air inlet 352 is in the bottom surface 373 of the ink chamber 340, that is, the side of the wall 370 defining the ink chamber 340 that comes at the bottom in the in-use state. This ensures that the level LA at which the ink comes into direct contact with the ambient air (air-ink interface) is kept at a certain height for a prolonged period (roughly the time the surface of the ink reaches the first-state mark LM1) even if the ink in the ink chamber 340 is consumed and the level in the ink chamber 340 becomes lower. The air inlet 352, furthermore, is created to be lower than the printhead 17 in the in-use state. This produces a hydraulic head difference d1. The hydraulic head difference d1 in the condition in which the air-ink interface LA has been formed as a meniscus near the air inlet 352 of the ink-chamber passage 350 is also referred to as "steady-state hydraulic head difference d1."

As the printhead 17 sucks the ink in the ink reservoir 204, a negative pressure occurs in the ink reservoir 204 exceeding a certain threshold. When the negative pressure in the ink reservoir 204 exceeds the certain threshold, the ink in the ink chamber 340 is supplied to the ink reservoir 204 through the ink supply tube 24. This means that when the ink reservoir 204 releases an amount of ink to the printhead 17, the reservoir is automatically refilled with the same amount of ink coming from the ink chamber 340. In other words, when the force sucking the ink (negative pressure) from the printer side becomes larger by a certain margin than the hydraulic head difference d1, resulting from the difference in vertical height between the air-ink interface LA and the printhead 17 (specifically, the nozzle), ink is supplied from the ink chamber 340 to the ink reservoir 204.

When the ink in the ink chamber 340 is consumed, air in the air chamber 330 is introduced into the ink chamber 340 through the ink-chamber passage 350, producing bubbles G. While this lowers the level LF in the ink chamber 340 (level LF of the ink), the hydraulic head difference d1 remains constant because the air-ink interface LA, at which the ink is in direct contact with the ambient air, is maintained at a certain height. That is, predetermined suction produced by the printhead 17 allows for stable supply of ink from the ink container 30 to the printhead 17.

In FIG. 8, the point of contact between the surface LF of the ink and the inner surface of the wall 370 defining the ink chamber 340 is an area where a thin film of the ink easily forms. A thin film of the ink formed in this contact area dries readily and therefore provides seeds of aggregates in the event that it peels off the wall.

Structure of the Ink Containers

Figure 9:
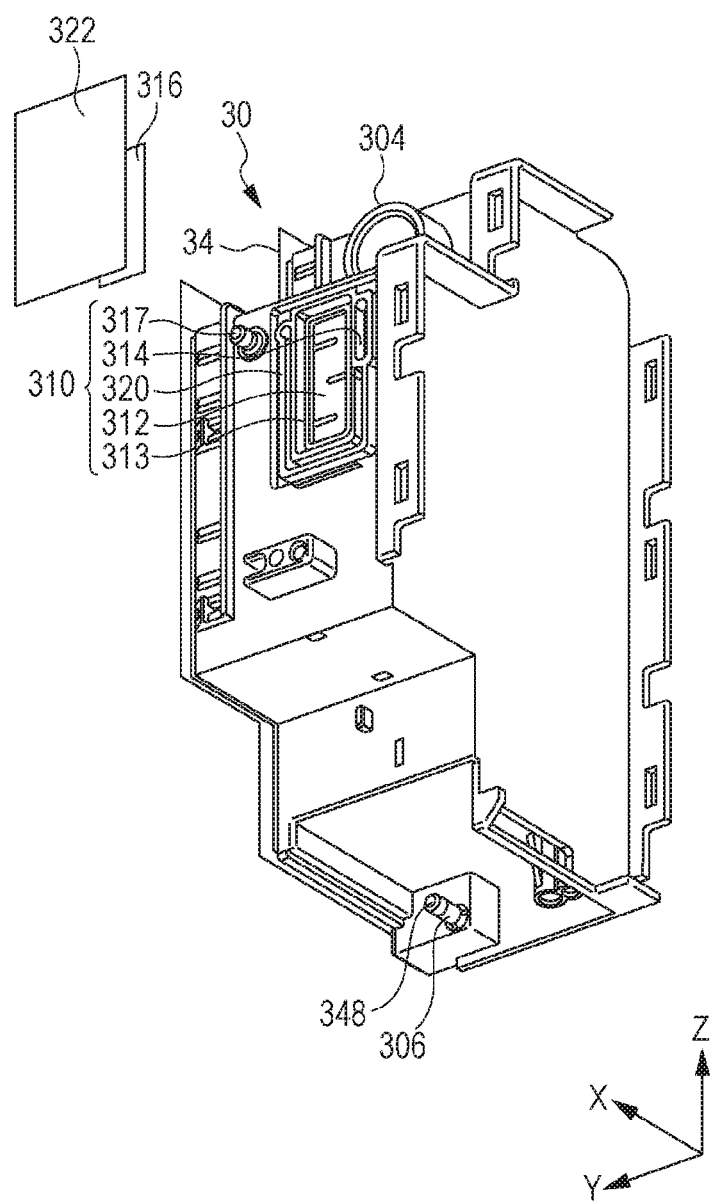
FIG. 9 is a schematic perspective external view of an ink container according to an embodiment of the invention.

FIG. 9 is a schematic perspective external view of an ink container according to the invention.

The ink container 30 in the example illustrated in FIG. 9 is substantially prism-shaped (specifically, substantially right-prism-shaped), but the ink containers 30 can be in any shape, not limited to this. The ink containers 30 are made primarily from a plastic plate made of a synthetic resin (e.g., polypropylene), and part of them may be a flexible component (e.g., a film made of one or a combination of materials such as polyolefins (e.g., polyethylene and polypropylene), polyamides, polyesters (e.g., polyethylene terephthalate), vinyl copolymers (e.g., polyvinyl acetate and polyvinyl chloride), and metals or metal oxides (e.g., aluminum and alumina)). Specifically, the ink container 30 illustrated in FIG. 9 is a plastic container molded from synthetic resin with a film 34 bonded to one side thereof. The ink containers 30 are preferably transparent or translucent at least in part. This allows the user to check the status of the inks in the ink containers 30.

Typical ink compositions contain a solvent with strong wetting properties, such as a surfactant, and therefore tend to easily wet the component that forms the inner surface of the wall defining the ink chamber. This means that the inner surface of the wall 370 is an area where the ink composition easily forms a thin film, and the formed thin film can provide seeds of aggregates. To control the formation of such a thin film, the inner surface of the wall 370 is preferably formed by a component made of a material highly repellent to ink compositions. Particularly preferred materials include fluorides, silicone resins, polypropylene, polystyrene, polyethylene, polyesters, polyvinyl chloride, phenolic resins, polyvinyl acetate, and poly(meth)acrylates (e.g., polymethyl (meth)acrylate). These materials may be used alone or as combinations of two or more. Ink-repellent ones, such as fluorides and silicone, are particularly preferred.

In this embodiment, the term "poly(meth)acrylate" refers to both a polyacrylate and a polymethacrylate, and the term "polymethyl (meth)acrylate" refers to both polymethyl acrylate and polymethyl methacrylate.

Examples of fluorides include fluorine-containing organic compounds and fluoropolymers. Preferred fluorine-containing organic compounds include fluoroalkylsilanes and alkanes, carboxylic acids, alcohols, and amines having a fluoroalkyl group. Examples of fluoroalkylsilanes include heptadecafluoro-1,1,2,2-tetrahydrodecyltrimethoxysilane and heptadecafluoro-1,1,2,2-tetrahydrotrichlorosilane; examples of alkanes having a fluoroalkyl group include octafluorocyclobutane, perfluoromethylcyclohexane, perfluoro-n-hexane, perfluoro-n-heptane, tetradecafluoro-2-methylpentane, perfluorododecane, and perfluoroeicosane; examples of carboxylic acids having a fluoroalkyl group include perfluorodecanoic acid perfluorooctanoic acid; examples of alcohols having a fluoroalkyl group include 3,3,4,4,5,5,5-heptafluoro-2-pentanol; and examples of amines having a fluoroalkyl group include heptadecafluoro-1,1,2,2-tetrahydrodecylamine. Examples of fluoropolymers include tetrafluoroethylene-perfluoroalkyl vinyl ether copolymers (PFA), tetrafluoroethylene-hexafluoropropylene copolymers (FEP), tetrafluoroethylene-ethylene copolymers (ETFE), polychlorotrifluoroethylene (PCTFE), chlorotrifluoroethylene-ethylene copolymers (ECTFE), and polytetrafluoroethylene (PTFE).

Examples of silicone resins include polymers siloxane structural units substituted with an alkyl or other organic group. For example, polymers having the dimethylsiloxane backbone can be used, such as α,w-bis(3-aminopropyl)polydimethylsiloxane, α,w-bis(3-glycidoxypropyl)polydimethylsiloxane, and α,w-bis(vinyl)polydimethylsiloxane.

The wall 370 defining the ink chamber 340 may have a fluid-repellent layer on its inner surface. The fluid-repellent layer is formed by, for example, applying a fluid-repellent agent (e.g., any of the fluorides or silicone resins listed above) or any similar agent to this surface. When the wall 370 has a fluid-repellent layer on its inner surface, this fluid-repellent layer is the component that forms the inner surface of the wall 370. Commercially available water-repellent agents can be used, such as HC303VP (trade name, Wacker Asahikasei Silicone Co., Ltd.; a silicone resin) and SFCOAT (trade name, AGC Seimi Chemical Co., Ltd.; a fluoride).

The component that forms the inner surface of the wall 370 defining the ink chamber 340 may have periodic microstructures on its surface. The periodic microstructures can be formed by, for example, the method described in JP-A-2012-66417 for manufacturing a resin molding. An example of periodic microstructures is an array of pyramids (e.g., trigonal, tetragonal, or hexagonal) with the apex of adjacent pyramids spaced by approximately 1.0 µm to 100 µm. This improves the repellency between the component that forms the inner surface of the wall 370 and the ink composition.

The ink container 30 has a first channel 310 on its side wall, a wall that becomes a lateral side in the use-state. The first channel 310 has a vent 317, a communication channel 320, a film 316, a gas-liquid separation room 312, and a communication channel 314. The gas-liquid separation room 312 is a recess, with an opening in its bottom. Through this bottom opening, the gas-liquid separation room 312 communicates with the communication channel 314. An end of the communication channel 314 is an air inlet 318 (see FIG. 8). The bottom of the gas-liquid separation room 312 is completely surrounded by a wall, which is a bank 313. The film member 316 has been bonded to the bank 313. A film member 322 has been bonded to the ink container 30 to cover the part of the first channel 310 created in the outer surface of the ink container 30, forming the communication channel 320 and preventing the ink from leaking out of the ink container 30. Part of the communication channel 320 extends around the gas-liquid separation room 312 so that the vent 317 is sufficiently distant from the gas-liquid separation room 312. This reduces water evaporating from the ink contained in the ink container 30 out through the air inlet 318.

The air flowing in the first channel 310 passes through the film member 316, a gas-liquid separation membrane bonded to the bank 313, partway. This further reduces ink leaking out of the ink container 30.

The ink outlet 306 is cylindrical and has a channel inside. An ink supply tube 24 is connected to this ink outlet 306. The other end 348 of the ink outlet 306 opens to the outside.

The ink container 30 may have a filter (not illustrated) to trap contaminants such as aggregates formed in the ink chamber 340 and foreign substances mixing into the ink during pouring. The filter can be placed at, for example, the ink exit 349 or ink outlet 306 in the ink container 30.

In another structure, the ink chamber 340 may have a support (not illustrated) connected to the inner surface of the wall 370 to holds the wall 370 in position.

By virtue of employing an ink composition according to an above embodiment, an ink jet recording apparatus according to this embodiment produces images good in color strength and dark tone reproduction (graininess), even when the printing process is prolonged by using continuous-supply ink containers.

After the initial loading of inks (e.g., filling the ink containers with inks to approximately 90% of the capacity of the ink chamber, for example at shipment), the gas-liquid interface of the inks can be in contact with part of the wall defining the ink chamber for a prolonged period. In such a case, aggregates can be likely to occur from the inks on the wall that is in contact with the gas-liquid interface of the inks. An ink jet recording apparatus according to this embodiment, however, provides a great ease of initial loading and high stability during continuous printing and produces prints good in color strength, dark tone reproduction, and resistance to gases when the printing process is prolonged by using continuous-supply ink containers, provided that the user chooses an appropriate solvent and surfactant for the ink composition according to an above embodiment.

In addition, a recording method according to an embodiment of the invention, in which an ink composition according to an embodiment is used with this ink jet recording apparatus to perform recording, includes ejecting the ink composition according to an embodiment from a printhead and making a record by applying the ink composition to a recording medium.

By virtue of making a record using an ink composition according to an embodiment, the recording method according to this embodiment produces an image good in color strength, dark tone reproduction, and resistance to gases. A recording method according to this embodiment can be applied not only to ink jet recording apparatuses according to an above embodiment but also to different types of recording apparatuses. Even with a different type of apparatus, this recording method produces an image good in color strength, dark tone reproduction, and resistance to gases by virtue of making a record using an ink composition according to an embodiment.

4. EXAMPLES

The following describes aspects of the present invention in further detail by providing Examples and Comparative Examples, but no aspect of the invention is limited to these Examples.

First, ink compositions were tested alone.

4.1. Preparation of Ink Compositions

Ink compositions were prepared by blending ingredients to the formula specified in Tables 3 and 4, stirring the blend, and then filtering the mixture through a 10-µm membrane filter under pressure. The values in Tables 3 and 4 represent amounts in the ink (% by mass), and water was added to make the total mass of the ink composition 100% by mass. The amounts of dyes are on a solid basis.

TABLE 3

|  |  | Example 1 | Example 2 | Example 3 | Example 4 | Example 5 | Example 6 | Example 7 |
|---|---|---|---|---|---|---|---|---|
| Dyes A | A1 | 0.8 | 1.8 | 0.2 | 0.3 | 1.2 | 2.4 | 3.0 |
|  | A2 |  |  |  |  |  |  |  |
| Dyes B | B1 | 1.2 | 0.2 | 0.1 | 0.2 | 0.8 | 1.6 | 2.0 |
|  | B2 |  |  |  |  |  |  |  |
|  | B3 |  |  |  |  |  |  |  |

TABLE 3-continued

| | | | | | | | | |
|---|---|---|---|---|---|---|---|---|
| Surfactants | Surfynol 104PG50 | 0.2 | 0.2 | 0.2 | 0.2 | 0.2 | 0.2 | 0.2 |
| | Surfynol MD-20 | 0.1 | 0.1 | 0.1 | 0.1 | 0.1 | 0.1 | 0.1 |
| | OLFINE E1010 | 0.3 | 0.3 | 0.3 | 0.3 | 0.3 | 0.3 | 0.3 |
| | OLFINE EXP4300 | 0.1 | 0.1 | 0.1 | 0.1 | 0.1 | 0.1 | 0.1 |
| Organic solvents | Triethylene glycol | 10.0 | 10.0 | 10.0 | 10.0 | 10.0 | 10.0 | 10.0 |
| | Triethylene glycol monobutyl ether | 7.0 | 7.0 | 7.0 | 7.0 | 7.0 | 7.0 | 7.0 |
| | Glycerol | 10.0 | 10.0 | 10.0 | 10.0 | 10.0 | 10.0 | 10.0 |
| | Triethanolamine | 0.5 | 0.5 | 0.5 | 0.5 | 0.5 | 0.5 | 0.5 |
| | Alkylbetaine | 1.0 | 1.0 | 1.0 | 1.0 | 1.0 | 1.0 | 1.0 |
| | Water | Balance | Balance | Balance | Balance | Balance | Balance | Balance |
| | Total | 100.0 | 100.0 | 100.0 | 100.0 | 100.0 | 100.0 | 100.0 |
| | Total dyes, solid basis | 2.0 | 2.0 | 0.3 | 0.5 | 2.0 | 4.0 | 5.0 |
| | Dyes A/all dyes ratio, solid basis | 40% | 90% | 60% | 60% | 60% | 60% | 60% |
| Evaluations | Color strength (OD) | A | A | C | B | A | A | A |
| | Dark tone reproduction (graininess) | B | B | A | A | A | B | C |
| | Resistance to gases | B | A | B | B | A | B | C |
| | Resistance to moisture | B | B | A | A | A | B | B |
| | Ease of loading | A | A | A | A | A | A | A |
| | Stability during continuous printing | A | A | A | A | A | A | A |

| | | Example 8 | Example 9 | Example 10 | Example 11 | Example 12 | Example 13 | Example 14 |
|---|---|---|---|---|---|---|---|---|
| Dyes A | A1 | | 0.8 | 1.2 | 1.8 | 0.8 | 1.2 | 1.8 |
| | A2 | 1.2 | | | | | | |
| Dyes B | B1 | 0.8 | | | | | | |
| | B2 | | 1.2 | 0.8 | 0.2 | | | |
| | B3 | | | | | 1.2 | 0.8 | 0.2 |
| Surfactants | Surfynol 104PG50 | 0.2 | 0.2 | 0.2 | 0.2 | 0.2 | 0.2 | 0.2 |
| | Surfynol MD-20 | 0.1 | 0.1 | 0.1 | 0.1 | 0.1 | 0.1 | 0.1 |
| | OLFINE E1010 | 0.3 | 0.3 | 0.3 | 0.3 | 0.3 | 0.3 | 0.3 |
| | OLFINE EXP4300 | 0.1 | 0.1 | 0.1 | 0.1 | 0.1 | 0.1 | 0.1 |
| Organic solvents | Triethylene glycol | 10.0 | 10.0 | 10.0 | 10.0 | 10.0 | 10.0 | 10.0 |
| | Triethylene glycol monobutyl ether | 7.0 | 7.0 | 7.0 | 7.0 | 7.0 | 7.0 | 7.0 |
| | Glycerol | 10.0 | 10.0 | 10.0 | 10.0 | 10.0 | 10.0 | 10.0 |
| | Triethanolamine | 0.5 | 0.5 | 0.5 | 0.5 | 0.5 | 0.5 | 0.5 |
| | Alkylbetaine | 1.0 | 1.0 | 1.0 | 1.0 | 1.0 | 1.0 | 1.0 |
| | Water | Balance | Balance | Balance | Balance | Balance | Balance | Balance |
| | Total | 100.0 | 100.0 | 100.0 | 100.0 | 100.0 | 100.0 | 100.0 |
| | Total dyes, solid basis | 2.0 | 2.0 | 2.0 | 2.0 | 2.0 | 2.0 | 2.0 |
| | Dyes A/all dyes ratio, solid basis | 60% | 40% | 60% | 90% | 40% | 60% | 90% |
| Evaluations | Color strength (OD) | A | B | A | A | B | B | A |
| | Dark tone reproduction (graininess) | A | B | A | B | B | A | B |
| | Resistance to gases | A | A | A | A | A | A | A |
| | Resistance to moisture | A | B | B | A | B | A | A |
| | Ease of loading | A | A | A | A | A | A | A |
| | Stability during continuous printing | A | A | A | A | A | A | A |

TABLE 4

| | | Example 15 | Example 16 | Example 17 | Example 18 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Dyes A | A1 | 1.2 | 1.2 | 1.2 | 1.2 | 2.0 | 0.7 | 1.9 | 1.9 | 1.9 | | |
| | A2 | | | | | | | | | | | |
| Dyes B | B1 | 0.8 | 0.8 | 0.8 | 0.4 | | 1.3 | 0.1 | | | 2.0 | |
| | B2 | | | | 0.4 | | | | 0.1 | | | |
| | B3 | | | | | | | | | 0.1 | | 2.0 |
| Surfactants | Surfynol 104PG50 | 0.2 | | 0.2 | 0.2 | 0.2 | 0.2 | 0.2 | 0.2 | 0.2 | 0.2 | 0.2 |
| | Surfynol MD-20 | 0.1 | | 0.1 | 0.1 | 0.1 | 0.1 | 0.1 | 0.1 | 0.1 | 0.1 | 0.1 |
| | OLFINE E1010 | 0.3 | 0.3 | | 0.3 | 0.3 | 0.3 | 0.3 | 0.3 | 0.3 | 0.3 | 0.3 |

TABLE 4-continued

|  |  | Example 15 | Example 16 | Example 17 | Example 18 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Organic solvents | OLFINE EXP4300 | 0.1 | 0.1 |  | 0.1 | 0.1 | 0.1 | 0.1 | 0.1 | 0.1 | 0.1 | 0.1 |
|  | Triethylene glycol | 10.0 | 10.0 | 10.0 | 10.0 | 10.0 | 10.0 | 10.0 | 10.0 | 10.0 | 10.0 | 10.0 |
|  | Triethylene glycol monobutyl ether | 7.0 | 7.0 | 7.0 | 7.0 | 7.0 | 7.0 | 7.0 | 7.0 | 7.0 | 7.0 | 7.0 |
|  | Glycerol | 10.0 | 10.0 | 10.0 | 10.0 | 10.0 | 10.0 | 10.0 | 10.0 | 10.0 | 10.0 | 10.0 |
|  | Triethanolamine | 0.5 | 0.5 | 0.5 | 0.5 | 0.5 | 0.5 | 0.5 | 0.5 | 0.5 | 0.5 | 0.5 |
|  | Alkylbetaine |  |  | 1.0 | 1.0 | 1.0 | 1.0 | 1.0 | 1.0 | 1.0 | 1.0 | 1.0 |
|  | Water | Balance | Balance | Balance | Balance | Balance | Balance | Balance | Balance | Balance | Balance | Balance |
|  | Total | 100.0 | 100.0 | 100.0 | 100.0 | 100.0 | 100.0 | 100.0 | 100.0 | 100.0 | 100.0 | 100.0 |
| Total dyes, solid basis |  | 2.0 | 2.0 | 2.0 | 2.0 | 2.0 | 2.0 | 2.0 | 2.0 | 2.0 | 2.0 | 2.0 |
| Dyes A/all dyes ratio, solid basis |  | 60% | 60% | 60% | 60% | 100% | 35% | 95% | 95% | 95% | 0% | 0% |
| Evaluations | Color strength (OD) | A | A | A | A | A | A | A | A | A | B | D |
|  | Dark tone reproduction (graininess) | A | A | A | A | D | B | D | D | D | B | B |
|  | Resistance to gases | A | A | A | A | A | D | A | A | A | D | A |
|  | Resistance to moisture | C | A | A | B | A | B | A | A | A | B | B |
|  | Ease of loading | A | C | C | A | A | A | A | A | A | A | A |
|  | Stability during continuous printing | B | B | C | A | A | A | A | A | A | A | A |

For the ingredients in Tables 3 and 4 for which a trade name is used, the details are as follows:

Surfynol 104PG50 (trade name, Air Products Japan K.K.; acetylene glycol surfactant having 10 backbone carbon atoms with no added alkylene oxides)

Surfynol MD-20 (trade name, Air Products Japan K.K.; acetylene glycol surfactant having an HLB of 4 or less)

OLFINE E1010 (trade name, Nissin Chemical Industry Co., Ltd.; acetylene glycol surfactant having 10 backbone carbon atoms with added alkylene oxides)

OLFINE EXP4300 (trade name, Nissin Chemical Industry Co., Ltd. acetylene glycol surfactant having 12 or more backbone carbon atoms with added alkylene oxides)

For the ingredients in Tables 3 and 4 corresponding to dyes A and B, the details are as follows:

A1: Exemplary compound (1-20), presented above; λmax, 533 nm; width at half height, 39.0 nm A2: Exemplary compound (1-27), presented above; λmax, 533 nm; width at half height, 39.0 nm B1: Exemplary compound (M-1), presented below; λmax, 511 nm; width at half height, 88.5 nm

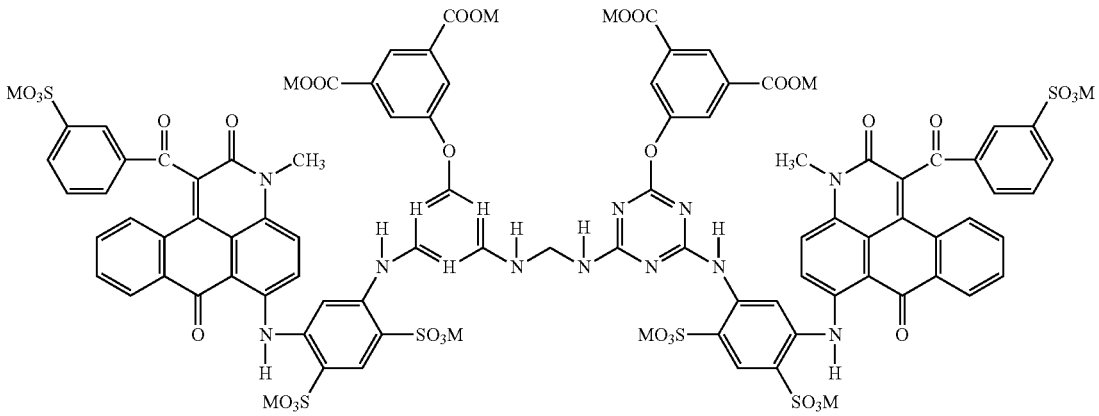

(M-1)

M: Na or NH$_4$

B2: Exemplary compound (M-23), presented below; λmax, 555 nm; width at half height, 87.0
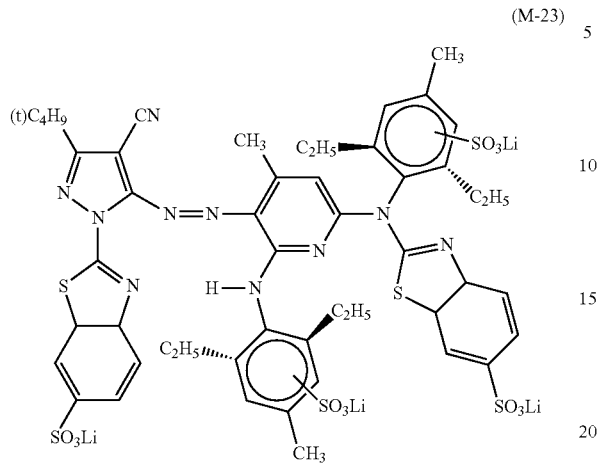
(M-23)
B3: Exemplary compound (M-3), presented below; λmax, 544 nm; width at half height, 85.5
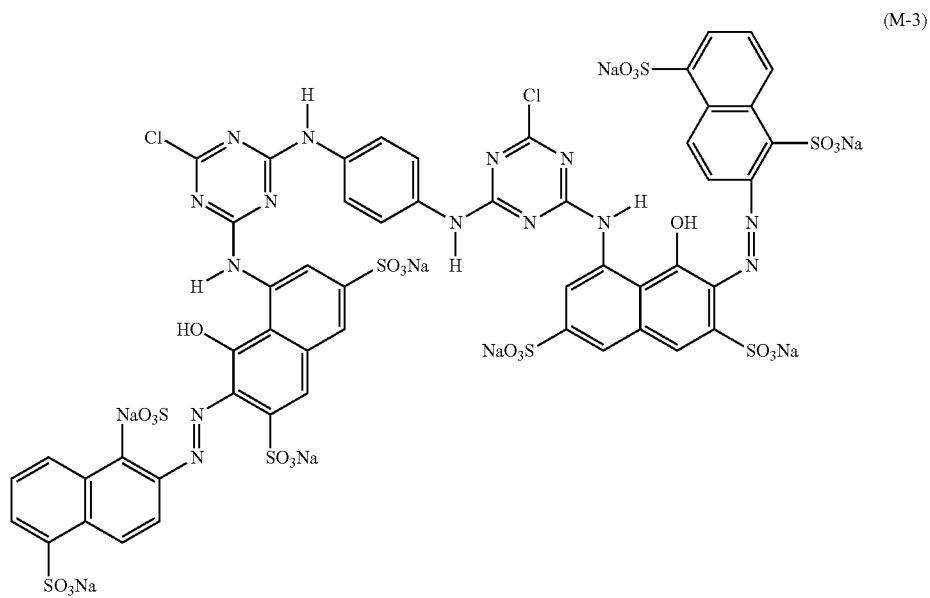
(M-3)
Exemplary compounds (1-20) and (1-27) were synthesized as follows, based on the processes described in paragraphs 0136 to 0161 of JP-A-2016-41801.
Synthesis of Exemplary Compound (1-20)
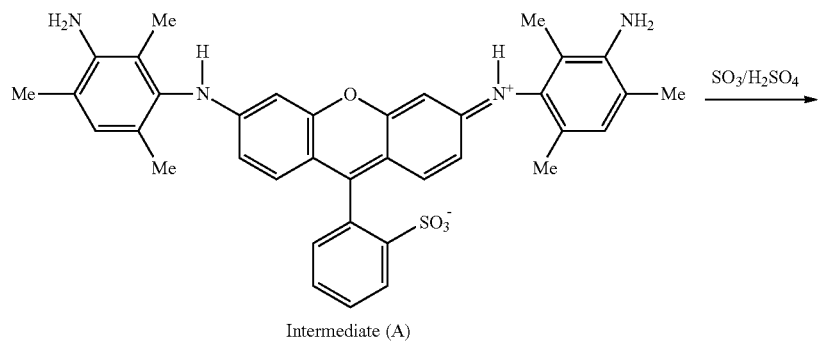
Intermediate (A)

-continued

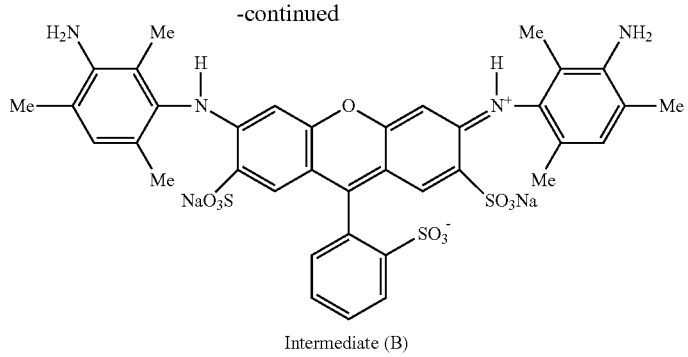

Intermediate (B)

Synthesis of Intermediate (B)

A 23.0-g sample of intermediate (A) (synthesized by the process described in paragraph 0065, page 17, of JP-A-2011-148973) was added to 420 g of 10% fuming sulfuric acid and allowed to react at room temperature for 48 hours. The reaction mixture was poured into a large excess of ethyl acetate, and the resulting crystals were filtered out. The crystals were then dissolved in 500 mL of methanol, the pH was adjusted to 7 with a 28% solution of sodium methoxide in methanol, and the resulting precipitate of sodium sulfate was removed by filtration. The filtrate was concentrated using a rotary evaporator, and the residue was purified by column chromatography (filler, Sephadex LH-20 (Pharmacia); developing solvent, methanol), giving crystals of intermediate (B). Absolute yield, 21.0 g; percentage yield, 68%; MS (m/z)=793 ([M-2Na+H]$^-$, 100%).

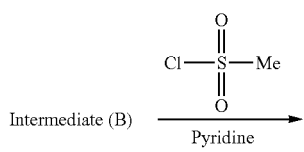

Intermediate (B) → Pyridine

-continued

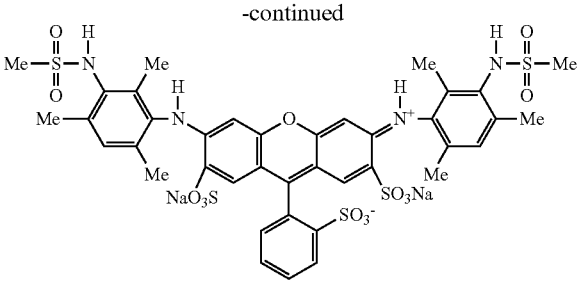

Exemplary compound (1-20)

To 4 g of the resulting intermediate (B) was added 2.0 g of methanesulfonyl chloride, 8 mL of pyridine was added dropwise slowly, and the mixture was allowed to react at room temperature for 3 hours. The reaction mixture was added to a large excess of ethyl acetate, and the resulting crystals were filtered out. The crystals were then dissolved in 50 mL of water, and the pH was adjusted to 7 with a dilute aqueous solution of sodium hydroxide. The resulting aqueous solution was purified by column chromatography (filler, Sephadex LH-20 (Pharmacia); developing solvents, water/methanol), giving green glossy crystals of exemplary compound (1-20). Absolute yield, 3.0 g; percentage yield, 63%. MS (m/z)=993 ([M-1]$^-$, 100%). Exemplary compound (1-20) exhibited a wavelength of absorption maximum of 533 nm in the absorption spectrum measured in a dilute aqueous solution, and a molar absorption coefficient of 54000.

Synthesis of Exemplary Compound (1-27)

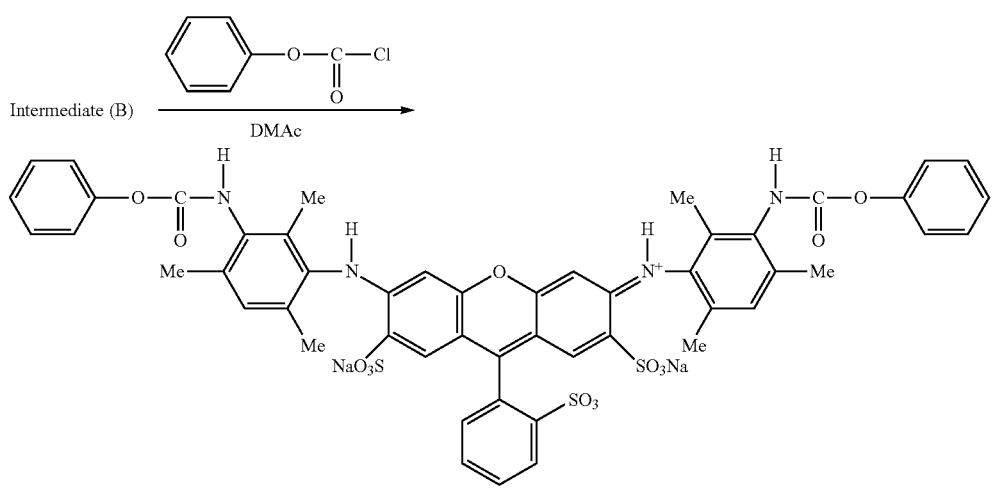

Exemplary compound (1-5)

Twenty grams of intermediate (B) was dissolved in 120 mL of N,N-dimethylacetamide (DMAc), and the resulting solution was cooled until its internal temperature reached 0° C. Ten milliliters of phenyl chloroformate (Tokyo Chemical Industry) was added dropwise with the internal temperature maintained at 5° C. or lower, and the mixture was allowed to react at 0° C. to 5° C. for 90 minutes. The reaction mixture was poured into 1500 mL of ethyl acetate, the resulting crystals were filtered out, and the crystals were dissolved in 200 mL of water. The pH of the solution was adjusted to 7 with a dilute aqueous solution of sodium hydroxide, and the resulting aqueous solution was purified by column chromatography (filler, Sephadex LH-20 (Pharmacia); developing solvents, water/methanol). The eluate was concentrated using a rotary evaporator, the residue was dissolved again in water, and the resulting solution was passed through a strongly acidic ion-exchange resin (Amberlite IR124-H (trade name), Organo). The pH of the eluate was adjusted to 7 with a dilute aqueous solution of sodium hydroxide, and the resulting solution was filtered through a membrane filter to remove dust. The filtered solution was concentrated to dryness using a rotary evaporator, giving green glossy crystals of exemplary compound (1-5). Absolute yield, 24 g; percentage yield, 93%. MS (m/z)=1054 ([M-Na]$^-$, 100%). Exemplary compound (1-5) exhibited a wavelength of absorption maximum of 531 nm in the absorption spectrum measured in a dilute aqueous solution.

(Amberlite IR124-H (trade name), Organo). The pH of the eluate was adjusted to 7 with a dilute aqueous solution of sodium hydroxide, and the resulting solution was filtered through a membrane filter to remove dust. The filtered solution was concentrated to dryness using a rotary evaporator, giving green glossy crystals of exemplary compound (1-27). Absolute yield, 2.5 g; percentage yield, 41%. MS (m/z)=1183 ([M-Na]$^-$, 100%). Exemplary compound (1-27) exhibited a wavelength of absorption maximum of 533 nm in the absorption spectrum measured in a dilute aqueous solution.

Exemplary compounds (M-1), (M-23), and (M-3) were synthesized based on processes described in JP-A-2016-29148.

4.2. Evaluative Testing of Ink Compositions 4.2.1. Evaluation of Color Strength (measurement of OD)

The ink containers of a continuous ink supply system (CISS) ink jet printer (Seiko Epson Corporation, model "EW-M660FT") were loaded with inks, and then a pattern was printed under the following conditions. The OD of the print was measured, and color strength was graded against the criteria below.

Printing Conditions

Recording medium: Seiko Epson Corporation Photo Paper Glossy

Printing resolution: 600×1200 dpi

Environmental conditions: 25° C., 40% RH

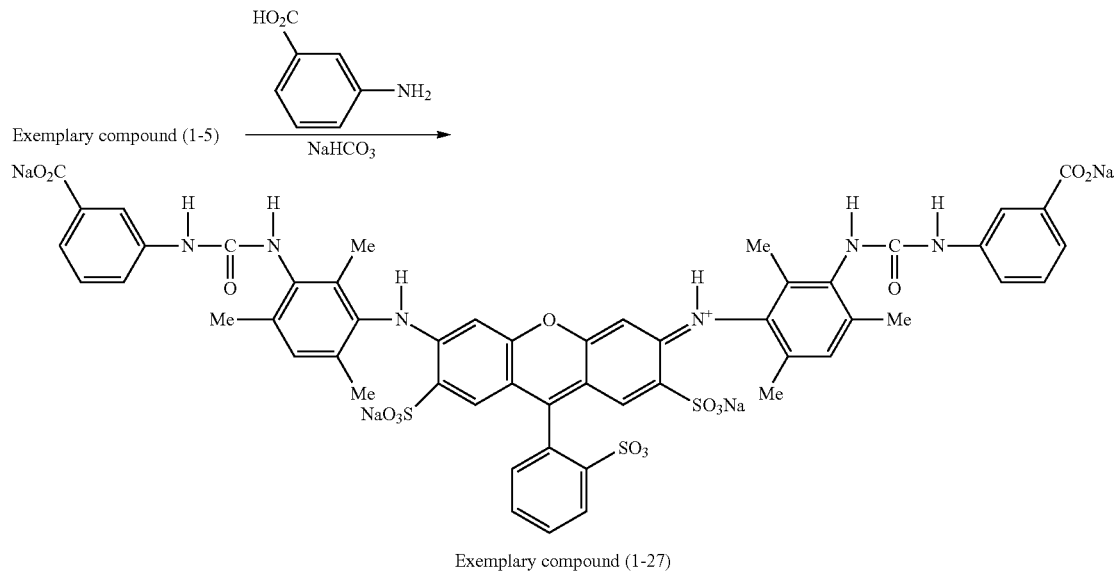

Exemplary compound (1-27)

A 5.4-g sample of exemplary compound (1-5) was dissolved in 20 mL of water and 40 mL of methanol, 2.0 g of m-aminobenzoic acid (Tokyo Chemical Industry) and 2.0 g of sodium bicarbonate were added, and the resulting mixture was allowed to react for 6 hours at an internal temperature of 80° C. The reaction mixture was poured into 500 mL of 2-propanol, the resulting crystals were filtered out, and the crystals were dissolved in 100 mL of water. The pH of the solution was adjusted to 7 with a dilute aqueous solution of sodium hydroxide, and the resulting aqueous solution was purified by column chromatography (filler, Sephadex LH-20 (Pharmacia); developing solvents, water/methanol). The eluate was concentrated using a rotary evaporator, the residue was dissolved again in water, and the resulting solution was passed through a strongly acidic ion-exchange resin Pattern printed: A monochrome solid pattern with 2 mg/cm$^2$ of ink impacted OD measurement: spectrophotometer, X-Rite i1 (X-Rite) without a light-source filter; light source, D50, 2-degree field of view Evaluation Criteria A: OD is 2.2 or more.

B: OD is less than 2.2 and 2.0 or more.

C: OD is less than 2.0 and 1.5 or more.

D: OD is less than 1.5.

4.2.2. Evaluation of Dark Tone Reproduction (graininess)

The magenta column of the ink containers of the CISS ink jet printer was loaded with the ink, and then the cyan and yellow columns with ink C and ink Y specified in Table 5. An 18-level tone pattern was printed under the following conditions, and the image was visually inspected to evaluate dark tone reproduction (graininess) against the criteria below.
Printing Conditions
 Recording medium: Seiko Epson Corporation Photo Paper Glossy
 Printing mode: Standard (600×1200 dpi)
 Environmental conditions: 25° C., 40% RH
Pattern Printed
 18-Level tone pattern: The following 18 combinations of RGB values were input: RGB (255, 0, 255), RGB (240, 0, 240), . . . , RGB (255-15x, 0, 255-15x), RGB (0, 0, 0), where 0≤x≤18
Evaluation Criteria
 A: The image on the print does not look rough when viewed from 30 cm away.
 B: The image on the print does not look rough when viewed from 20 cm away.
 C: The image on the print does not look rough when viewed from 10 cm away.
 D: The image on the print looks rough when viewed from 10 cm away.
 In Table 5, DB199, used as the dye in ink C, stands for C.I. Direct Blue 199, and DY86, used as the dye in ink Y, stands for C.I. Direct Yellow 86.

TABLE 5

|  |  | Ink C | Ink Y |
|---|---|---|---|
| Dyes | DB199 | 4.0 | — |
|  | DY86 | — | 2.5 |
| Surfactants | Surfynol 104PG50 | 0.2 | 0.2 |
|  | Surfynol MD-20 | 0.1 | 0.1 |
|  | OLFINE E1010 | 0.3 | 0.3 |
|  | OLFINE EXP4300 | 0.1 | 0.1 |
| Organic solvents | Triethylene glycol | 10.0 | 10.0 |
|  | Triethylene glycol monobutyl ether | 7.0 | 7.0 |
|  | Glycerol | 10.0 | 10.0 |
|  | Triethanolamine | 0.5 | 0.5 |
| Water |  | Balance | Balance |
| Total |  | 100.0 | 100.0 |

4.2.3. Evaluation of Resistance to Gases
 The inks of Examples were each loaded into the ink containers of the CISS ink jet printer. A pattern was printed under the following conditions, and resistance to gases was evaluated against the criteria below.
Printing Conditions
 Recording medium: Seiko Epson Corporation Photo Paper Glossy
 Printing resolution: 600×1200 dpi
 Environmental conditions: 25° C., 40% RH
 Pattern printed: A monochrome solid pattern with 2 mg/cm$^2$ of ink impacted and a pattern with an OD of approximately 0.5
 OD measurement: spectrophotometer, X-Rite i1 (X-Rite) without a light-source filter; light source, D50, 2-degree field of view
 After 24 hours of drying at normal temperature, the record was exposed to the conditions of 23° C., 50% RH, and 5 ppm ozone for up to 16 hours using an ozone weather meter (trade name "OMS-L," Suga Test Instruments Co., Ltd.). The OD of the record (D) was measured every 4 hours using the spectrophotometer, and the residual optical density (ROD) of the ink was determined according to the equation below. Based on the results, resistance to gases was evaluated against the criteria below.

ROD (%)=(D/D0)×100

Evaluation Criteria
 A: The ROD is 70% or more at 16 hours of exposure for both the solid pattern and the pattern with an OD of 0.5.
 B: The ROD of either the solid pattern or pattern with an OD of 0.5 reaches 70% between 12 and 16 hours of exposure.
 C: The ROD of either the solid pattern or pattern with an OD of 0.5 reaches 70% between 8 and 12 hours of exposure.
 D: The ROD of either the solid pattern or pattern with an OD of 0.5 becomes 70% or less before 8 hours of exposure.
4.2.4. Evaluation of Moisture Resistance
 The ink containers of the CISS ink jet printer were loaded with inks, and a solid pattern was printed on Seiko Epson Corporation Photo Paper Glossy with 6-point white letters. The print was left under the conditions of (40° C., 85% RH)×3 days, and the white letters were visually inspected for bleed. Based on the results, moisture resistance was evaluated against the criteria below.
Evaluation Criteria
 A: The white letters are recognizable with no bleed.
 B: The white letters are recognizable, although with some bleed.
 C: Bleed is observed, but the white letters are narrowly recognizable.
 D: Serious bleed makes the letters unrecognizable.
4.2.5. Evaluation of Ease of Loading
 The ink containers of the CISS ink jet printer was loaded with inks using the printer's standard initial loading sequence. A nozzle-check pattern was then printed, and the success rate in loading (=the number of nozzles successfully loaded with ink/total number of nozzles). Success rates from five measurements were averaged, and the ease of loading was evaluated against the criteria below.
Evaluation Criteria
 A: The success rate is 90% or more.
 B: The success rate is 80% or more and less than 90%.
 C: The success rate is 70% or more and less than 80%.
 D: The success rate is less than 70%.
4.3. Results of the Testing of Ink Compositions
 Referring to Table 4, Comparative Example 1 showed that the ink in which dye A was the only dye was good in color strength and resistance to gases but poor in dark tone reproduction. Comparative Examples 6 and 7 revealed that the inks in which dye B was the only dye were worse in color strength. In dark tone reproduction, too, these inks were inferior to Examples, although not as poor as Comparative Example 1. When Comparative Examples 6 and 7 were compared, Comparative Example 6, containing the reactive dye B1, seemed less resistant to gases, and Comparative Example 7, containing the anthrapyridone dye B3, seemed weaker in color strength, although being more resistant to gases.
 Comparative Example 2, in Table 4, an ink in which dye A was present in an amount of less than 40% by mass of the total mass of dyes in the ink composition, was good in color strength but somewhat weak in dark tone reproduction and poor in resistance to gases. Comparative Examples 3 to 5, in which dye A was present in an amount of more than 90% by mass of the total mass of dyes in the ink composition, were good in color strength and resistance to gases but poor in dark tone reproduction.
 By contrast with Comparative Examples, Examples, specified in Tables 3 and 4, were all satisfactory in color strength, dark tone reproduction, and resistance to gases. Examples 1 to 8, in Table 3, showed that these inks had improved dark tone reproduction and resistance to gases compared with Comparative Examples 1 and 2 by virtue of the amount of dye A relative to the total mass of dyes in the ink composition being 40% by mass or more and 90% by mass or less. Example 5, in which the amount of dye A relative to the total mass of dyes in the ink composition was 60% by mass, achieved superior results, and when Examples 3 and 4 are considered, there was a tendency for color strength to become worse with decreasing percentage of dye A. Among Examples 1 to 8, those in which the total amount of dyes A and B in the ink composition was 0.5% by mass or more and 4.0% by mass or less exhibited improved color strength and dark tone reproduction compared with Examples 3 and 7, in which the total amount of dyes A and B was out of this range. As shown by Example 8, the use of A2 as dye A resulted in good grades in all tests as in Example 5, in which A1 was used.

Examples 9 to 11, in Table 3, employed an azo dye as dye B and had improved dark tone reproduction compared with Comparative Example 4. In particular, Example 10, in which the amount of dye A relative to the total mass of dyes in the ink composition was 60% by mass, achieved superior results. This Example, moreover, was generally more resistant to gases than Examples 1 to 8, which used a reactive dye as dye B, although being somewhat worse in color strength and moisture resistance. Examples 12 to 14, in Table 3, employed an anthrapyridone dye as dye B and exhibited improved dark tone reproduction compared with Comparative Example 5. In particular, Example 13, in which the amount of dye A relative to the total mass of dyes in the ink composition was 60% by mass, achieved superior results. This Example, furthermore, was somewhat more resistant to moisture than Examples 1 to 8, in which dye B was a reactive dye.

Example 15, in Table 4, seemed more resistant to gases than Example 5, although being worse in moisture resistance and stability during continuous printing, by virtue of containing no alkylbetaine as a solvent. Example 16 seemed somewhat low in ease of loading and stability during continuous printing compared with Example 5 by virtue of containing no acetylene glycol surfactant having an HLB of 4 or less. Example 17 appeared to somewhat inferior in ease of loading and stability during continuous printing compared with Example 5 by virtue of containing no alkylene oxide adduct of an acetylene glycol having 10 or more backbone carbon atoms and no acetylene glycol having 12 or more backbone carbon atoms. Example 18, in which two dyes B were used, seemed somewhat less resistant to moisture than Example 5.

Overall, Examples were all good in color strength, dark tone reproduction, and resistance to gases. In the Examples, the ink contained dye A, having the width at half height of the largest peak in the absorption spectrum between 380 nm and 780 nm was 50 nm or less, and dye B, having the width at half height was 70 nm or more, and dye A was present in an amount of 40% by mass or more and 90% by mass or less of the total mass of dyes in the ink composition. Choosing appropriate water-soluble organic solvents and surfactants made the ink more resistant to moisture, easier to load, and more stable during continuous printing.

Subsequently, ink sets were tested.

4.4. Preparation of Ink Compositions

Ink compositions were prepared by blending ingredients to the formula specified in Tables 6 and 7, stirring the blend, and then filtering the mixture through a 10-μm membrane filter under pressure. The values in Tables 6 and 7 represent amounts in the ink (% by mass), and water was added to make the total mass of the ink composition 100% by mass. The amounts of dyes are on a solid basis.

The ingredients in Tables 6 and 7 for which a trade name is used excluding dyes were as specified in Section 4.1. As for dyes, magenta dyes A1, B1, and B2 were as specified in Section 4.1., and cyan dyes C-1, C-2, and C-3 and yellow dyes Y-1 and Y-2 were as defined above. DB199, used as a dye in inks C, stands for C.I. Direct Blue 199, and DY86 and DY132, used as dyes in inks Y, stand for C.I. Direct Yellow 86 and C.I. Direct Yellow 132, respectively.

TABLE 6

| | | Cyan | | | | | | |
|---|---|---|---|---|---|---|---|---|
| | | C-1 | C-2 | C-3 | C-4 | C-5 | C-6 | C-7 |
| Cyan | C-1 | 0.4 | | 0.1 | 4.0 | | | |
| | C-2 | 3.6 | | 0.9 | | 4.0 | | |
| | C-3 | | 2.2 | 4.0 | | | 4.0 | |
| | DB199 | | 2.1 | | | | | 4.0 |
| Surfactants | Surfynol 104PG50 | 0.2 | 0.2 | 0.2 | 0.2 | 0.2 | 0.2 | 0.2 |
| | Surfynol MD-20 | 0.0 | 0.0 | 0.0 | 0.0 | 0.0 | 0.0 | 0.0 |
| | OLFINE E1010 | 0.3 | 0.3 | 0.3 | 0.3 | 0.3 | 0.3 | 0.3 |
| | Triethylene glycol | 10.0 | 10.0 | 10.0 | 10.0 | 10.0 | 10.0 | 10.0 |
| Organic solvents | Triethylene glycol monobutyl ether | 7.0 | 7.0 | 7.0 | 7.0 | 7.0 | 7.0 | 7.0 |
| | Glycerol | 10.0 | 10.0 | 10.0 | 10.0 | 10.0 | 10.0 | 10.0 |
| | Triethanolamine | 0.5 | 0.5 | 0.5 | 0.5 | 0.5 | 0.5 | 0.5 |
| | Purified water | Balance | Balance | Balance | Balance | Balance | Balance | Balance |

TABLE 7

| | | Magenta | | | | Yellow | | | | | | | |
|---|---|---|---|---|---|---|---|---|---|---|---|---|---|
| | | M-1 | M-2 | M-3 | M-4 | Y-1 | Y-2 | Y-3 | Y-4 | Y-5 | Y-6 | Y-7 | Y-8 |
| Magenta | A1 | 1.2 | 1.2 | 2.0 | | | | | | | | | |
| | B1 | 0.8 | 0.4 | | 2.0 | | | | | | | | |
| | B2 | | 0.4 | | | | | | | | | | |

TABLE 7-continued

|  |  | Magenta | | | | Yellow | | | | | | | |
| --- | --- | --- | --- | --- | --- | --- | --- | --- | --- | --- | --- | --- | --- |
|  |  | M-1 | M-2 | M-3 | M-4 | Y-1 | Y-2 | Y-3 | Y-4 | Y-5 | Y-6 | Y-7 | Y-8 |
| Yellow | Y-1 |  |  |  |  |  | 3.0 | 2.0 | 1.0 | 4.0 |  |  |  |
|  | Y-2 |  |  |  |  |  | 2.0 | 1.0 |  |  | 4.0 |  |  |
|  | DY86 |  |  |  |  | 1.5 | 1.0 |  | 2.0 |  |  | 4.0 |  |
|  | DY132 |  |  |  |  | 1.0 |  |  |  |  |  |  | 4.0 |
| Surfactants | Surfynol 104PG50 | 0.2 | 0.2 | 0.2 | 0.2 | 0.2 | 0.2 | 0.2 | 0.2 | 0.2 | 0.2 | 0.2 | 0.2 |
|  | Surfynol MD-20 | 0.1 | 0.1 | 0.1 | 0.1 | 0.0 | 0.0 | 0.0 | 0.0 | 0.0 | 0.0 | 0.0 | 0.0 |
|  | OLFINE E1010 | 0.3 | 0.3 | 0.3 | 0.3 | 0.3 | 0.3 | 0.3 | 0.3 | 0.3 | 0.3 | 0.3 | 0.3 |
|  | Triethylene glycol | 10.0 | 10.0 | 10.0 | 10.0 | 10.0 | 10.0 | 10.0 | 10.0 | 10.0 | 10.0 | 10.0 | 10.0 |
| Organic solvents | Triethylene glycol monobutyl ether | 7.0 | 7.0 | 7.0 | 7.0 | 7.0 | 7.0 | 7.0 | 7.0 | 7.0 | 7.0 | 7.0 | 7.0 |
|  | Glycerol | 10.0 | 10.0 | 10.0 | 10.0 | 10.0 | 10.0 | 10.0 | 10.0 | 10.0 | 10.0 | 10.0 | 10.0 |
|  | Triethanolamine | 0.5 | 0.5 | 0.5 | 0.5 | 0.5 | 0.5 | 0.5 | 0.5 | 0.5 | 0.5 | 0.5 | 0.5 |
|  | Purified water | Balance | Balance | Balance | Balance | Balance | Balance | Balance | Balance | Balance | Balance | Balance | Balance |

4.5. Evaluative Testing of Ink Sets

Ink sets were evaluated for color strength and resistance to gases as in Sections 4.2.1. and 4.2.3. and for dark tone reproduction as follows.

Evaluation of Dark Tone Reproduction

The magenta column of the ink containers of the aforementioned CISS ink jet printer was loaded with the ink, and then the cyan and yellow columns with the inks specified in Tables 6 and 7. Eighteen-level tone patterns were printed under the following conditions, and the images were visually inspected to evaluate dark tone reproduction (graininess) against the criteria below.

Evaluation Criteria

A: The images on the print do not look rough when viewed from 30 cm away.

B: The images on the print do not look rough when viewed from 20 cm away.

C: The images on the print do not look rough when viewed from 10 cm away.

D: The images on the print look rough when viewed from 10 cm away.

4.6. Results of the Testing of Ink Sets

The results of the testing of ink sets are presented in Table 8.

TABLE 8

|  | Example 19 | Example 20 | Example 21 | Example 22 | Example 23 | Example 24 |
| --- | --- | --- | --- | --- | --- | --- |
| Cyan | C-1 | C-2 | C-3 | C-1 | C-1 | C-1 |
| Magenta | M-1 | M-1 | M-1 | M-2 | M-1 | M-1 |
| Yellow | Y-1 | Y-1 | Y-1 | Y-2 | Y-3 | Y-4 |
| Color strength | A | A | A | B | A | A |
| Dark tone reproduction | A | A | A | A | A | A |
| Resistance to gases | B | A | A | B | A | A |

|  | Example 25 | Example 26 | Example 27 | Example 28 | Example 29 | Example 30 |
| --- | --- | --- | --- | --- | --- | --- |
| Cyan | C-3 | C-4 | C-5 | C-6 | C-7 | C-1 |
| Magenta | M-2 | M-1 | M-1 | M-1 | M-1 | M-1 |
| Yellow | Y-3 | Y-1 | Y-1 | Y-1 | Y-1 | Y-5 |
| Color strength | B | B | A | B | C | A |
| Dark tone reproduction | A | B | B | A | C | C |
| Resistance to gases | B | A | A | C | B | A |

|  | Example 31 | Example 32 | Example 33 | Comparative Example 8 | Comparative Example 9 |
| --- | --- | --- | --- | --- | --- |
| Cyan | C-1 | C-1 | C-1 | C-1 | C-1 |
| Magenta | M-1 | M-1 | M-1 | M-3 | M-4 |
| Yellow | Y-6 | Y-7 | Y-8 | Y-1 | Y-1 |
| Color strength | A | B | B | A | B |
| Dark tone reproduction | C | C | C | D | D |
| Resistance to gases | A | B | B | B | D |

Printing Conditions

Recording medium: Seiko Epson Corporation Photo Paper Glossy
Printing mode: Standard (600×1200 dpi)
Environmental conditions: 25° C., 40% RH Patterns Printed Red scale: RGB (255-x, 0, 0), where 0≤x≤18
Blue scale: RGB (0, 0, 255-x), where 0≤x≤18
Green scale: RGB (0, 255-x, 0), where 0≤x≤18
Gray scale: RGB (255-x, 255-x, 255-x), where 0≤x≤18

Comparative Example 8 showed that the ink set including a magenta ink in which dye A was the only dye was good in color strength and resistance to gases but poor in dark tone reproduction. Comparative Example 9 demonstrated that the ink set including a magenta ink in which dye B1 was the only dye was worse in color strength, less resistant to gases than Comparative Example 8, and poor in dark tone reproduction.

By contrast with Comparative Examples, Examples were all satisfactory in color strength, dark tone reproduction, and resistance to gases. In particular, Examples 19 to 25, in which the cyan and yellow inks contained two or more dyes, performed superior as ink sets, achieving better grades in all tests than the other Examples.

Overall, Examples were all good in color strength, dark tone reproduction, and resistance to gases. In the Examples, the magenta ink contained dye A, having the width at half height of the largest peak in the absorption spectrum between 380 nm and 780 nm was 50 nm or less, and dye B, having the width at half height was 70 nm or more, and dye A was present in an amount of 40% by mass or more and 90% by mass or less of the total mass of dyes in the ink composition. The use of cyan and yellow inks containing two or more dyes provided a further improvement in color strength, dark tone reproduction, and resistance to gases.

The invention is not limited to the above embodiments, and many variations are possible. For example, the invention embraces configurations substantially identical to those described in the embodiments (e.g., configurations identical in function, methodology, and results to or having the same goal and offering the same advantages as the described ones). The invention also includes configurations created by changing any nonessential part of those described in the above embodiments. Furthermore, the invention encompasses configurations identical in operation and effect to or capable of fulfilling the same purposes as those described in the above embodiments. Configurations obtained by adding any known technology to those described in the embodiments are also part of the invention.

The entire disclosures of Japanese Patent Application Nos. 2017-139310 filed Jul. 18, 2017 and 2018-060503 filed Mar. 27, 2018 are expressly incorporated by reference herein.

What is claimed is:

1. An ink composition comprising:
dye A having a width at a half height of a largest peak in an absorption spectrum between 380 nm and 780 nm that is 50 nm or less; and
at least one dye B having a corresponding width at the half height that is 70 nm or more,
wherein dye A is present in an amount of 40% by mass or more and 90% by mass or less of a total mass of the dye A plus the dye B, and
wherein dye A is a compound represented by general formula (1):

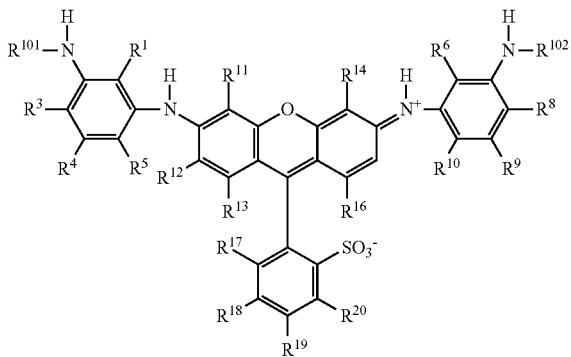

(1)

where $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or substituent, and $R^{101}$ and $R^{102}$ each independently represent a substituted or unsubstituted alkyl group, substituted or unsubstituted aryl group, substituted or unsubstituted heterocyclic group, substituted or unsubstituted alkylsulfonyl group, substituted or unsubstituted arylsulfonyl group, substituted or unsubstituted alkoxycarbonyl group, substituted or unsubstituted aryloxycarbonyl group, substituted or unsubstituted carbamoyl group, substituted or unsubstituted monoalkylaminocarbonyl group, substituted or unsubstituted dialkylaminocarbonyl group, substituted or unsubstituted monoarylaminocarbonyl group, substituted or unsubstituted diarylaminocarbonyl group, or substituted or unsubstituted alkylarylaminocarbonyl group.

2. The ink composition according to claim 1, wherein dyes A and B have a highest absorbance wavelength of the largest peak between 500 nm and 600 nm.

3. The ink composition according to claim 1, wherein $R^1$, $R^3$, $R^5$, $R^6$, $R^8$, and $R^{10}$ in the compound each independently represent an alkyl group having one to six carbon atoms.

4. The ink composition according to claim 1, wherein the at least one dye B is at least one dye selected from anthrapyridone dyes, reactive dyes, azo dyes, and combinations thereof.

5. The ink composition according to claim 1, further comprising a water-soluble organic solvent, at least one surfactant, and water.

6. The ink composition according to claim 5, wherein the water-soluble organic solvent is an alkylbetaine present in an amount of 0.1% by mass or more and 3.0% by mass or less of a total mass of the ink.

7. The ink composition according to claim 5, wherein the surfactant is an acetylene glycol surfactant having an HLB of 4 or less.

8. The ink composition according to claim 5, further comprising, as the at least one surfactant, at least one glycol selected from alkylene oxide adducts of acetylene glycols having 12 of more backbone carbon atoms and acetylene glycols having 10 or more backbone carbon atoms.

9. The ink composition according to claim 1, wherein dyes A and B are present in the ink composition in a total amount of 0.5% by mass or more and 4.0% by mass or less.

10. A recording method comprising:
ejecting an ink composition according to claim 1 from a printhead; and
making an image by applying the ink composition to a recording medium.

11. An ink jet recording apparatus comprising:
an ink container configured to contain an ink composition according to claim 1;
a printhead that ejects the ink composition; and
an ink supply channel through which the ink composition is supplied from the ink container to the printhead.

12. An ink set comprising:

a cyan ink;

a magenta ink; and a yellow ink, wherein the cyan ink contains one or more dyes selected from a first cyan dye represented by general formula (C-1), a second cyan dye represented by general formula (C-2), a third cyan dye represented by general formula (C-3), C.I. Direct Blue 199, and C.I. Direct Blue 86;

the magenta ink is an ink composition comprising:

dye A having a width at a half height of a largest peak in an absorption spectrum between 380 nm and 780 nm that is 50 nm or less; and at least one dye B having a corresponding width at the half height that is 70 nm or more, wherein dye A is present in an amount of 40% by mass or more and 90% by mass or less of a total mass of the dye A plus the dye B;

dye A is a compound represented by general formula (1):

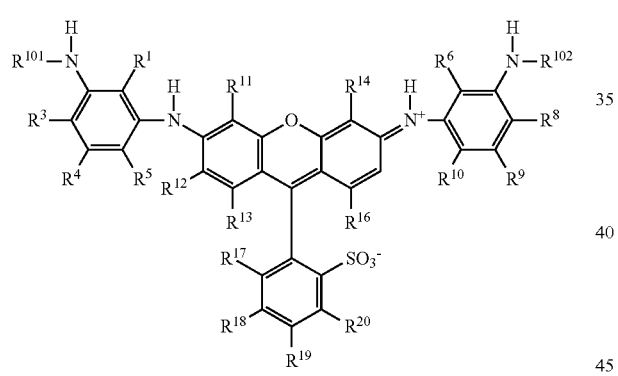

(1)

where $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or substituent, and $R^{101}$ and $R^{102}$ each independently represent a substituted or unsubstituted alkyl group, substituted or unsubstituted aryl group, substituted or unsubstituted heterocyclic group, substituted or unsubstituted alkylsulfonyl group, substituted or unsubstituted arylsulfonyl group, substituted or unsubstituted alkoxycarbonyl group, substituted or unsubstituted aryloxycarbonyl group, substituted or unsubstituted carbamoyl group, substituted or unsubstituted monoalkylaminocarbonyl group, substituted or unsubstituted dialkylaminocarbonyl group, substituted or unsubstituted monoarylaminocarbonyl group, substituted or unsubstituted diarylaminocarbonyl group, or substituted or unsubstituted alkylarylaminocarbonyl group; and the yellow ink contains one or more dyes selected from a first yellow dye represented by general formula (Y-1), a second yellow dye represented by general formula (Y-2), C.I. Direct Yellow 86, and C.I. Direct Yellow 132:

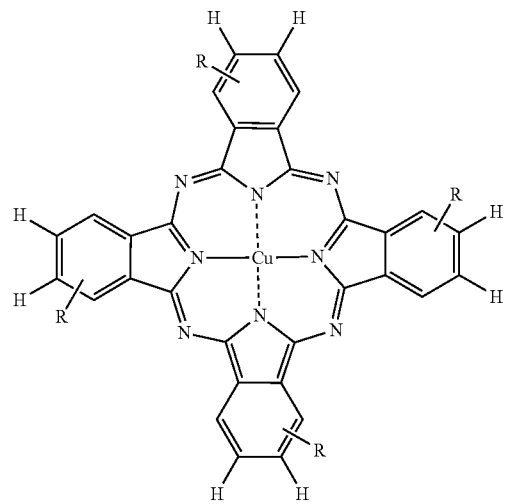

(C-1)

where R represents $SO_2(CH_2)_3SO_3Na$;

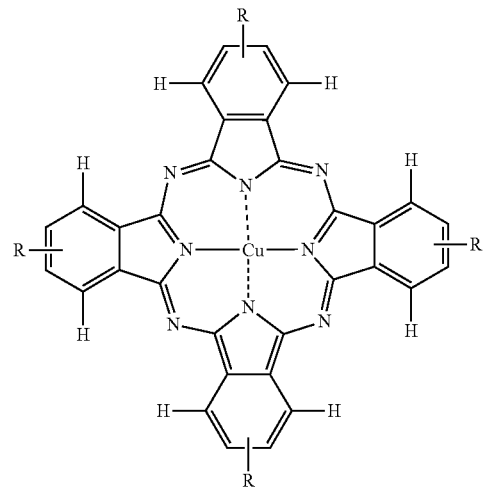

(C-2)

where two Rs represent $SO_2(CH_2)_3SO_3Li$, and other two represent $SO_2(CH_2)_3SO_2NHCH_2(OH)CH_3$;

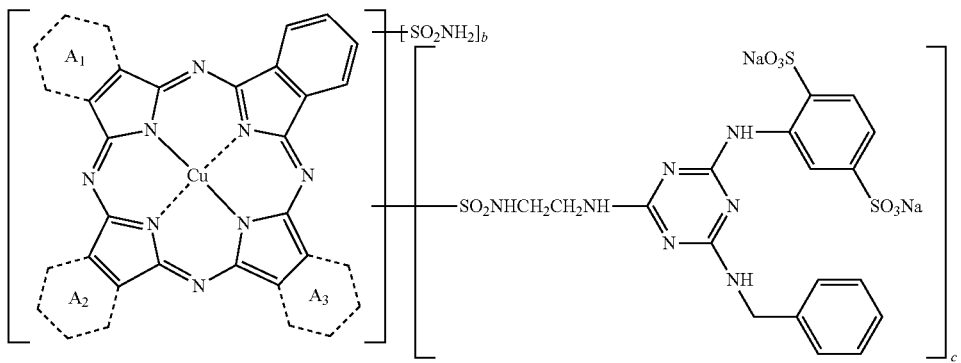

(C-3)

where rings $A_1$ to $A_3$ each independently represent a benzene ring or six-membered nitrogen-containing aromatic heterocycle condensed to a porphyrazine ring, a number of nitrogen-containing aromatic heterocycles averaging more than 0.00 and 3.00 or less, and a remainder being a benzene ring or rings;

b averages 0.00 or more and less than 3.90;
c averages 0.10 or more and less than 4.00; and
b plus c averages 1.00 or more and less than 4.00

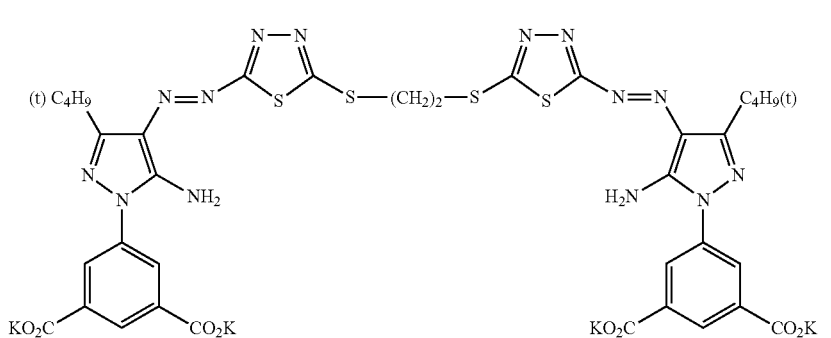

(Y-1)

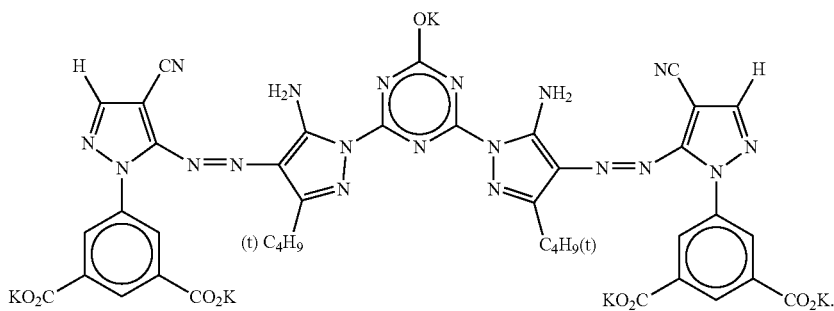

(Y-2)

* * * * *